(12) United States Patent
Wilkins

(10) Patent No.: US 8,746,188 B2
(45) Date of Patent: Jun. 10, 2014

(54) INTERNAL COMBUSTION ENGINE WITH HYDRAULICALLY-AFFECTED STROKE

(76) Inventor: Larry C. Wilkins, Ft. Lauderdale, FL (US)

( * ) Notice: Subject to any disclaimer, the term of this patent is extended or adjusted under 35 U.S.C. 154(b) by 246 days.

(21) Appl. No.: 13/049,396

(22) Filed: Mar. 16, 2011

(65) Prior Publication Data

US 2011/0226220 A1    Sep. 22, 2011

Related U.S. Application Data

(60) Provisional application No. 61/314,863, filed on Mar. 17, 2010.

(51) Int. Cl.
*F02B 75/04* (2006.01)
*F02D 15/02* (2006.01)

(52) U.S. Cl.
USPC .. 123/48 B; 123/48 R; 123/48 A; 123/78 BA; 123/78 B; 123/78 E

(58) Field of Classification Search
USPC ...... 123/48 R–48 B, 78 R, 78 B, 78 BA, 78 E
See application file for complete search history.

(56) References Cited

U.S. PATENT DOCUMENTS

| | | | |
|---|---|---|---|
| 1,574,573 A | 2/1926 | Hale | |
| 1,875,180 A | 8/1932 | Rider | |
| 2,217,721 A * | 10/1940 | Anthony | 123/78 E |
| 4,085,628 A | 4/1978 | McWhorter | |
| 4,152,955 A | 5/1979 | McWhorter | |
| 4,301,695 A | 11/1981 | Reiher | |
| 4,469,055 A * | 9/1984 | Caswell | 123/78 B |
| 5,190,077 A * | 3/1993 | Pawelzik et al. | 137/625.46 |
| 5,711,267 A | 1/1998 | Williams | |
| 5,979,375 A | 11/1999 | Ballardini | |
| 6,202,622 B1 * | 3/2001 | Raquiza, Jr. | 123/197.4 |
| 6,349,684 B1 | 2/2002 | de Gooijer | |
| 6,510,831 B2 | 1/2003 | Wiseman | |

(Continued)

FOREIGN PATENT DOCUMENTS

| | | |
|---|---|---|
| DE | 103 09 650 A1 | 9/2004 |
| WO | WO 88/07620 A1 | 10/1988 |
| WO | WO 00/08325 A1 | 2/2000 |
| WO | WO 2004/053345 A1 | 6/2004 |

OTHER PUBLICATIONS

Co-pending U.S. Appl. No. 13/187,947, filed Jul. 21, 2011.

(Continued)

*Primary Examiner* — Lindsay Low
*Assistant Examiner* — Kevin Lathers
(74) *Attorney, Agent, or Firm* — Finnegan, Henderson, Farabow, Garrett & Dunner, L.L.P.

(57) ABSTRACT

An internal combustion engine may include a cylinder block defining a cylinder and a crankshaft having a crankpin. The crankshaft is rotatably received by the cylinder block and rotates along a longitudinal axis, and the crankpin defines a longitudinal axis parallel to and offset by a distance with respect to the longitudinal axis along which the crankshaft rotates. The engine may further include a piston configured to reciprocate within the cylinder and a connecting rod operably coupled to the piston and the crankpin. At least one of the piston and the connecting rod is configured such that a distance between a cross-sectional center of the crankpin and an upper surface of the piston is variable via hydraulic operation.

47 Claims, 69 Drawing Sheets

(56) References Cited

U.S. PATENT DOCUMENTS

| | | |
|---|---|---|
| 6,581,552 B2 | 6/2003 | Kreuter |
| 7,028,647 B2 | 4/2006 | Styron |
| 2008/0115769 A1 | 5/2008 | Mason |
| 2008/0184966 A1 | 8/2008 | Marchisseau |
| 2010/0012095 A1 | 1/2010 | Wilkins |
| 2011/0030650 A1 | 2/2011 | Wilkins |

OTHER PUBLICATIONS

International Search Report issued Sep. 30, 2009, in PCT Application No. PCT/US2009/050493.

Written Opinion issued Sep. 30, 2009, in PCT Application No. PCT/US2009/050493.

* cited by examiner

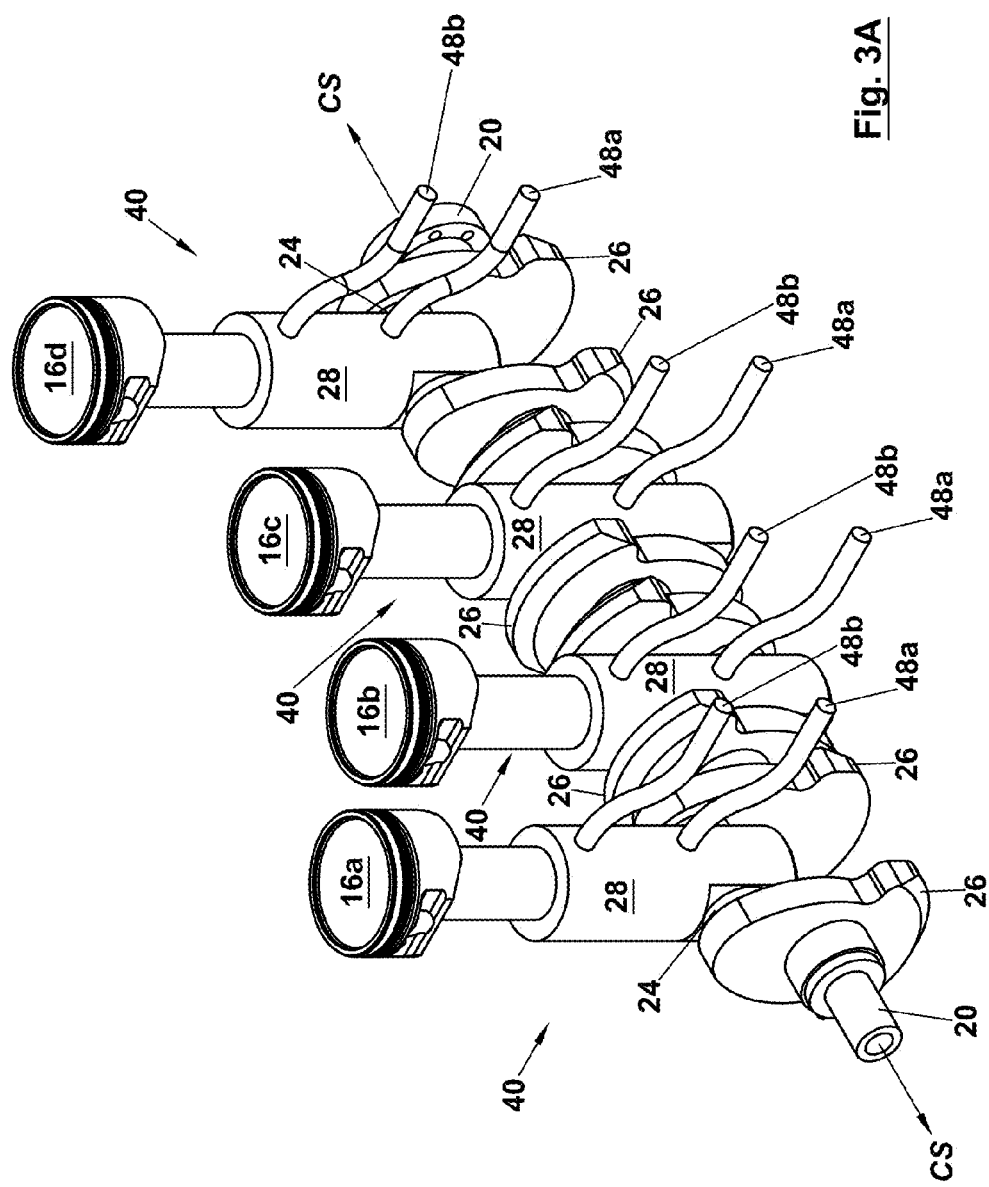

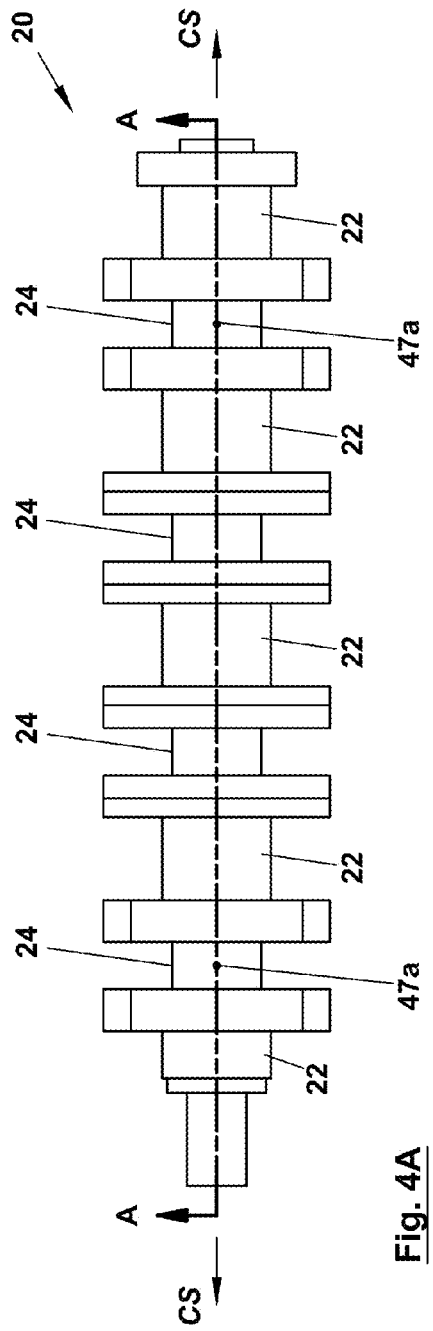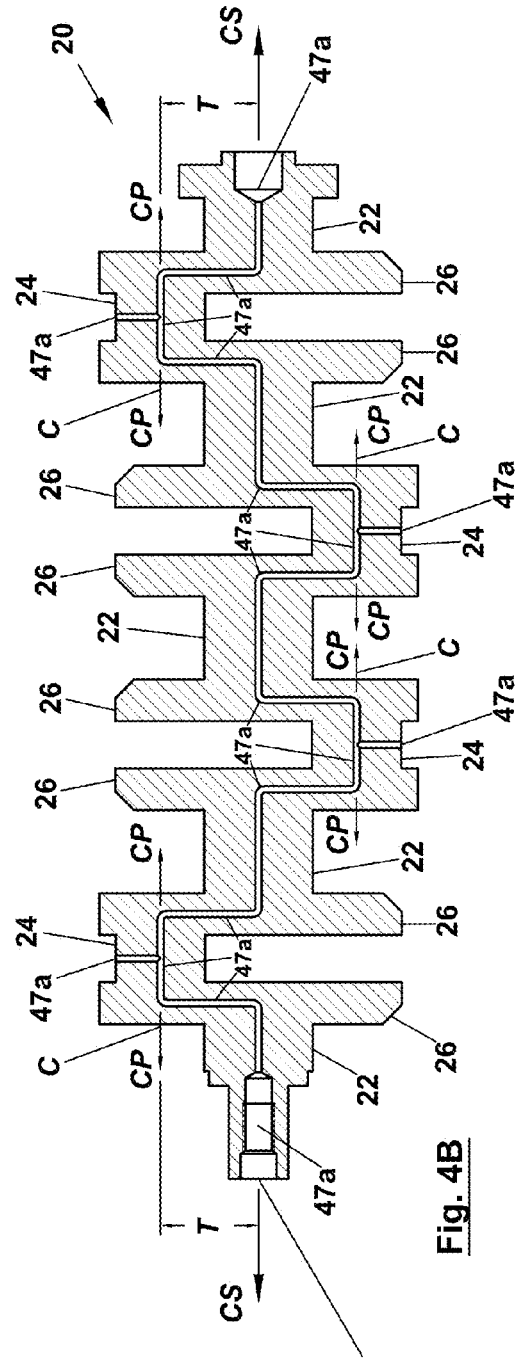
Fig. 4A
Fig. 4B

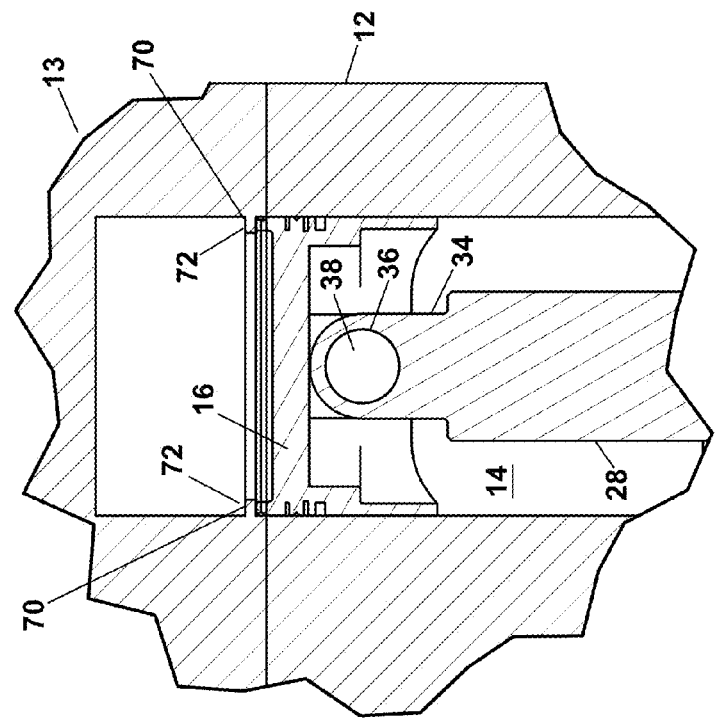
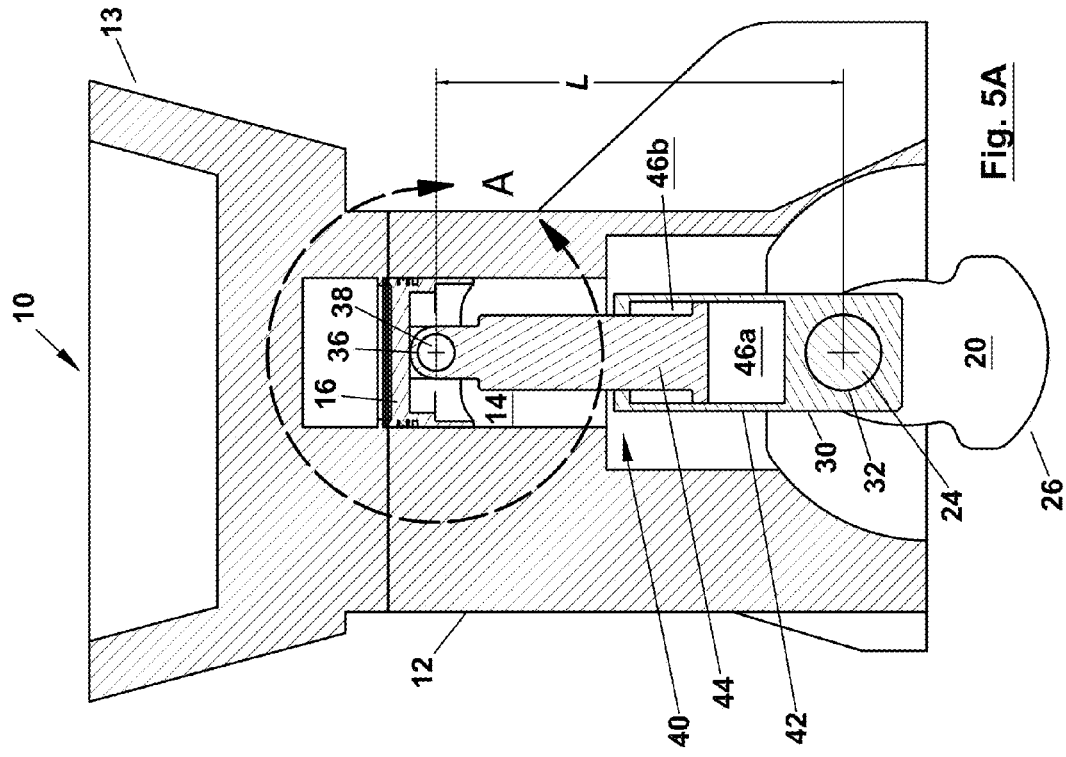
Fig. 5B
Fig. 5A

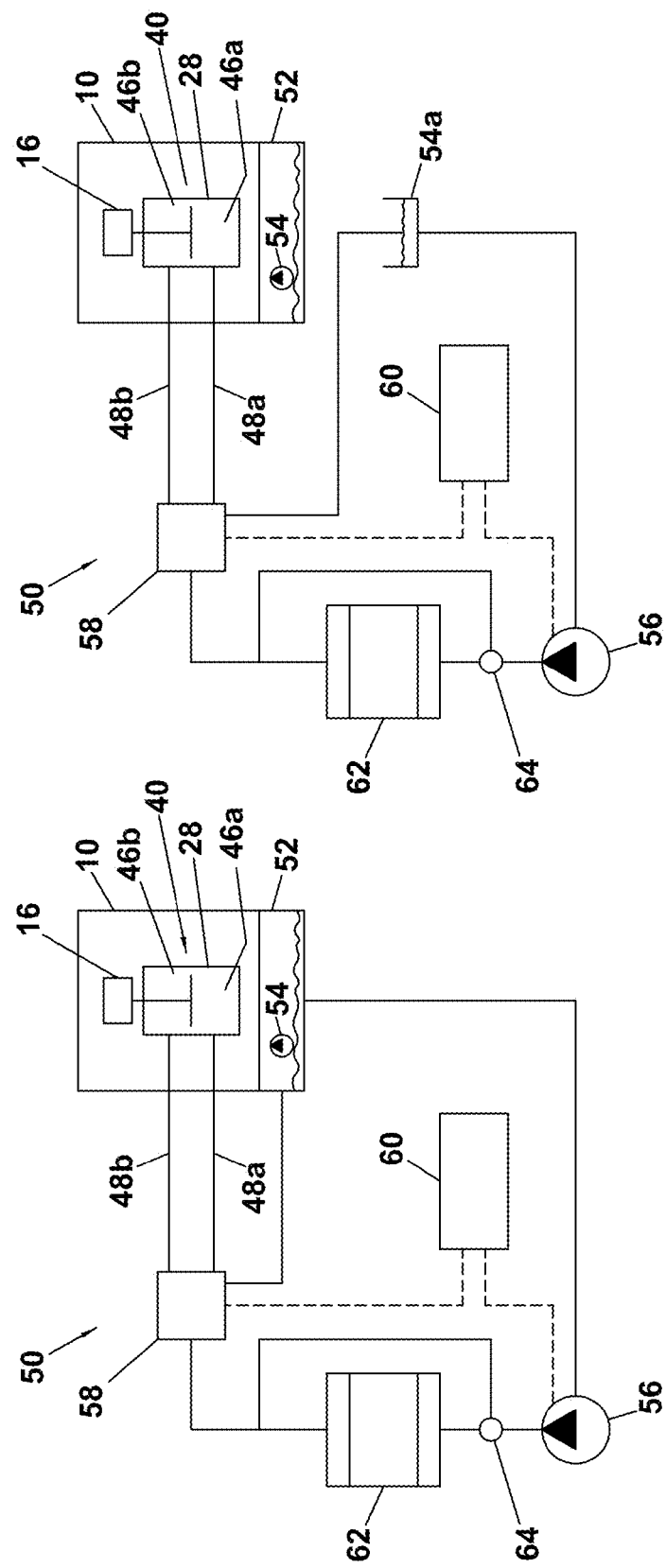

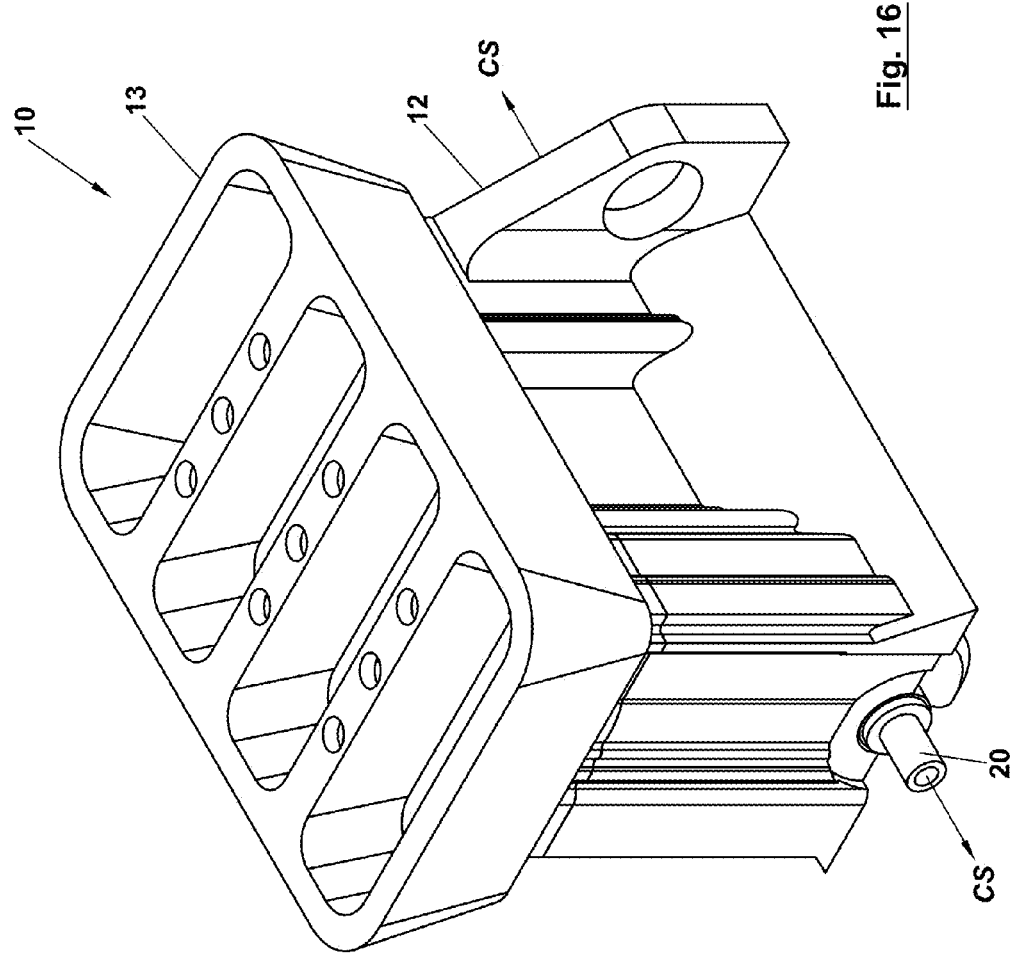

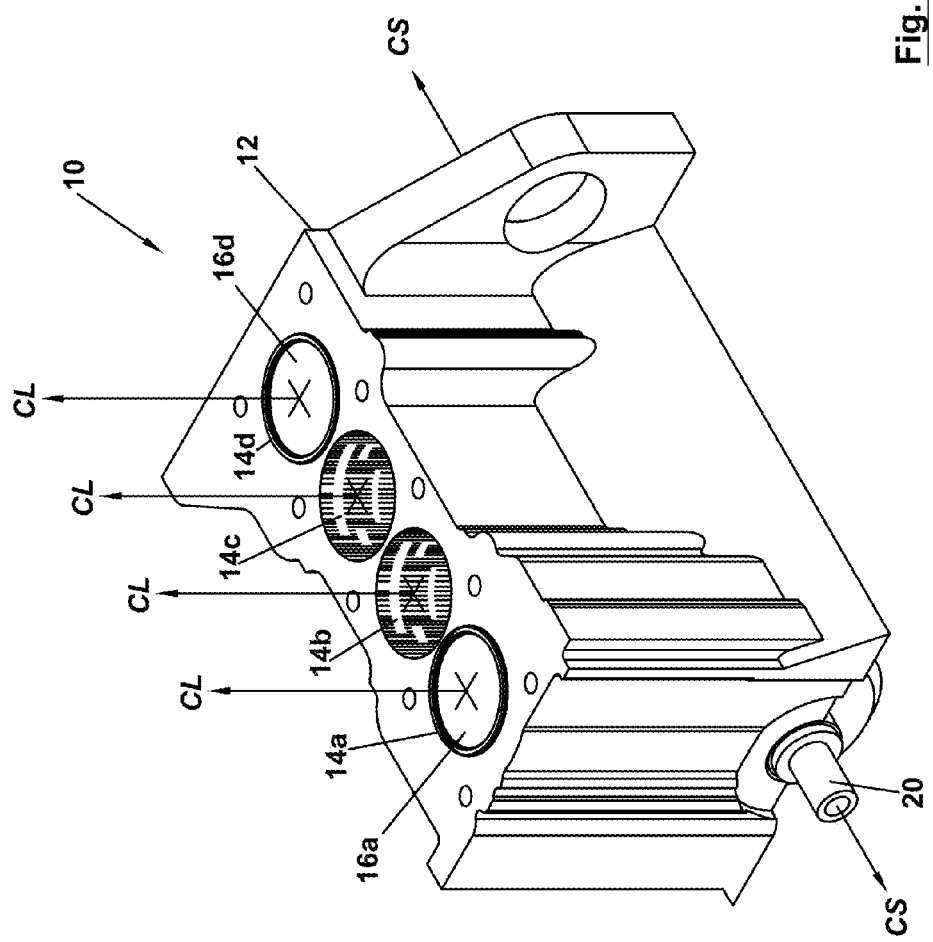

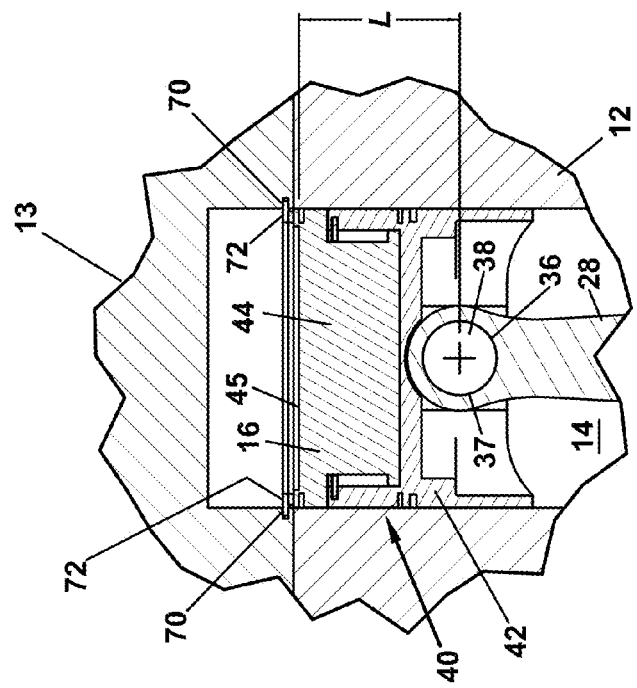
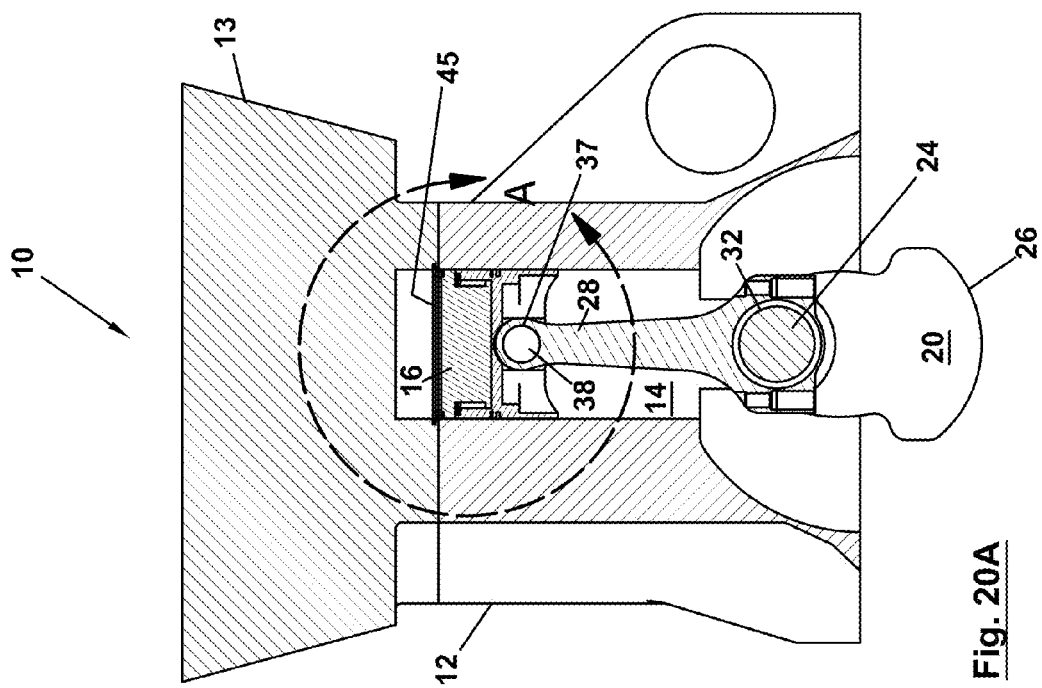

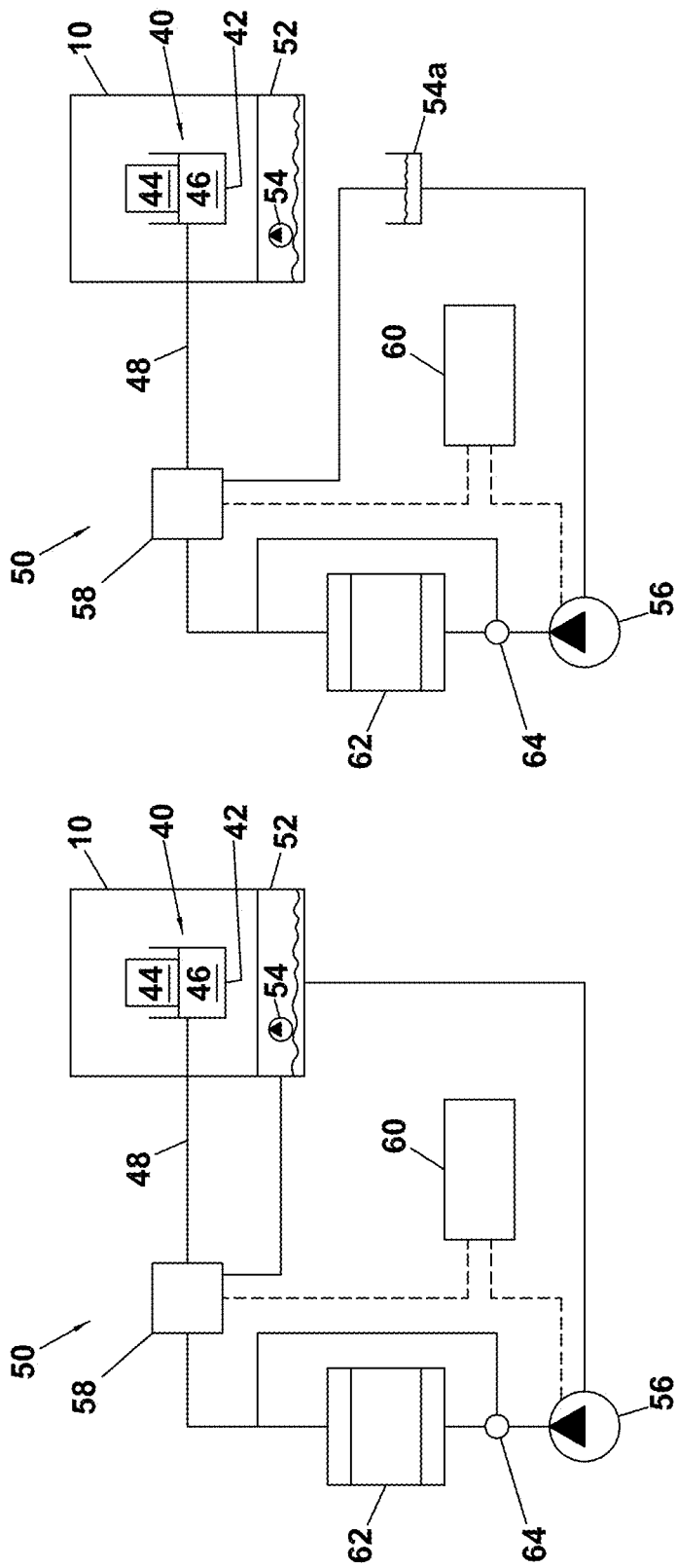

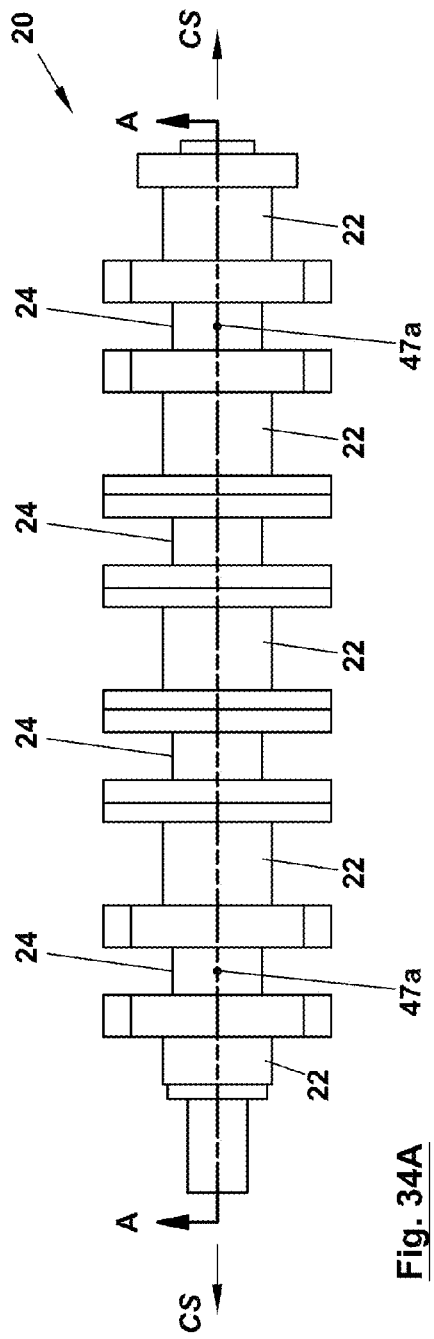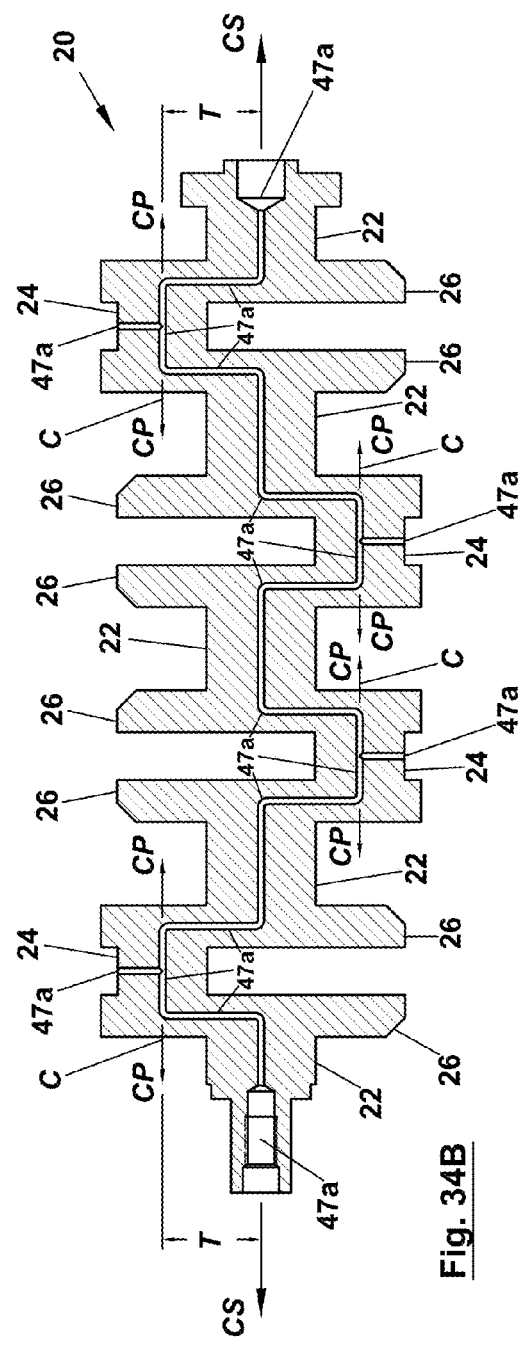

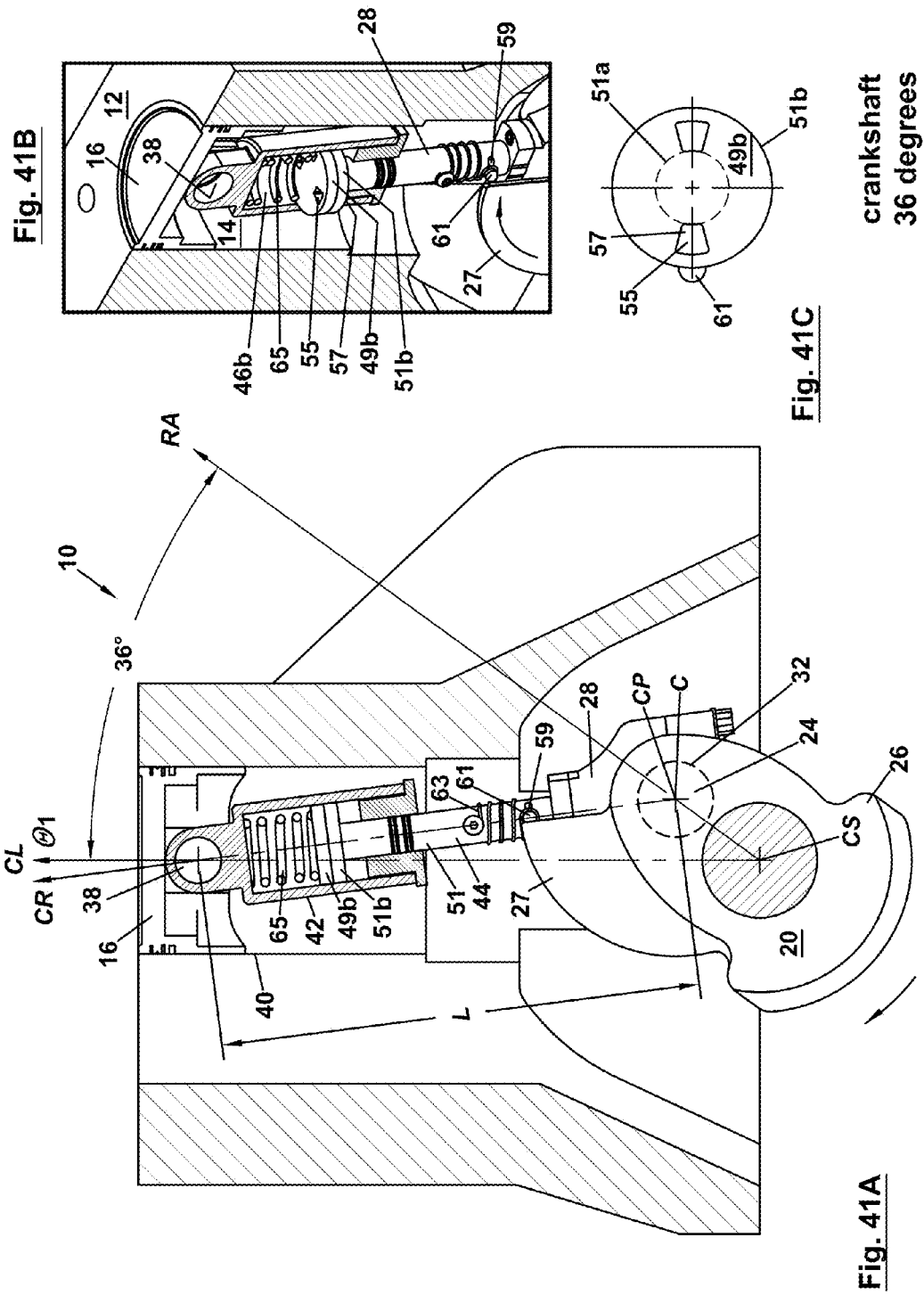

crankshaft 40 degrees

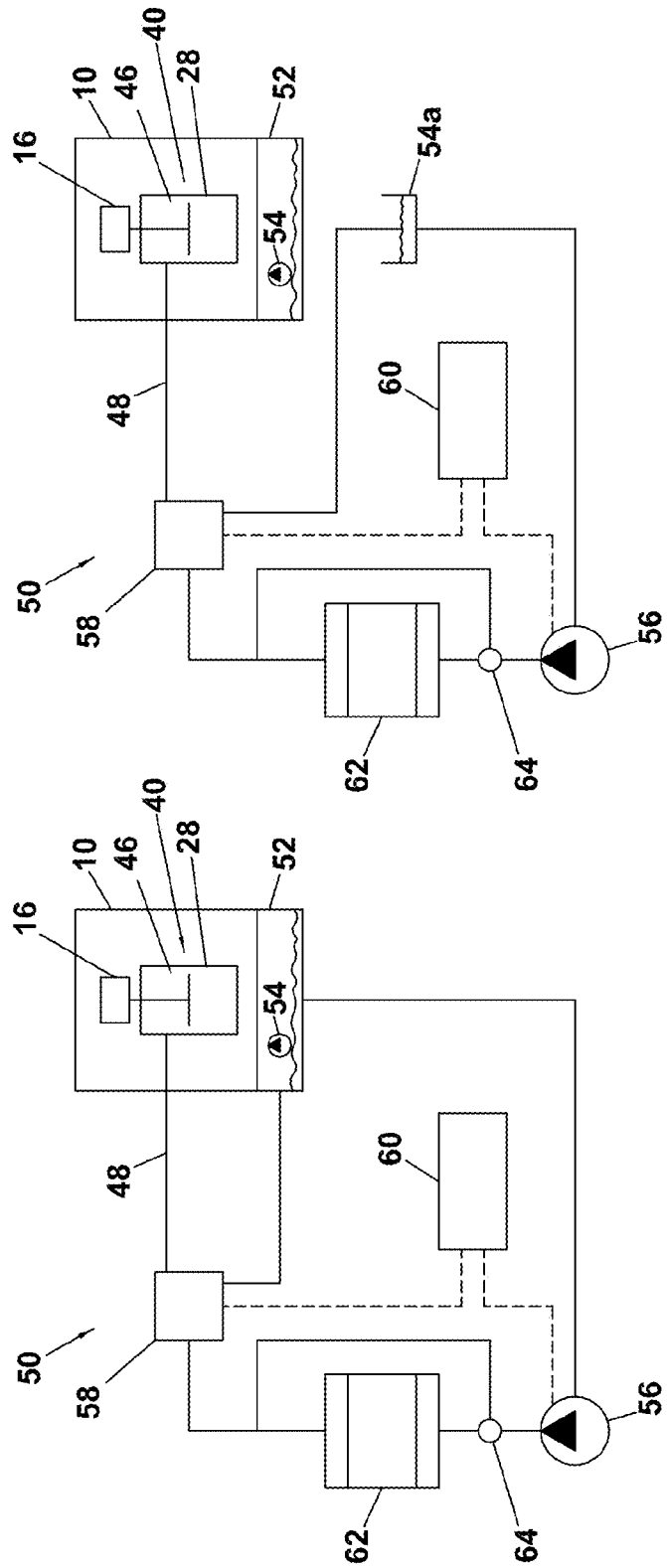

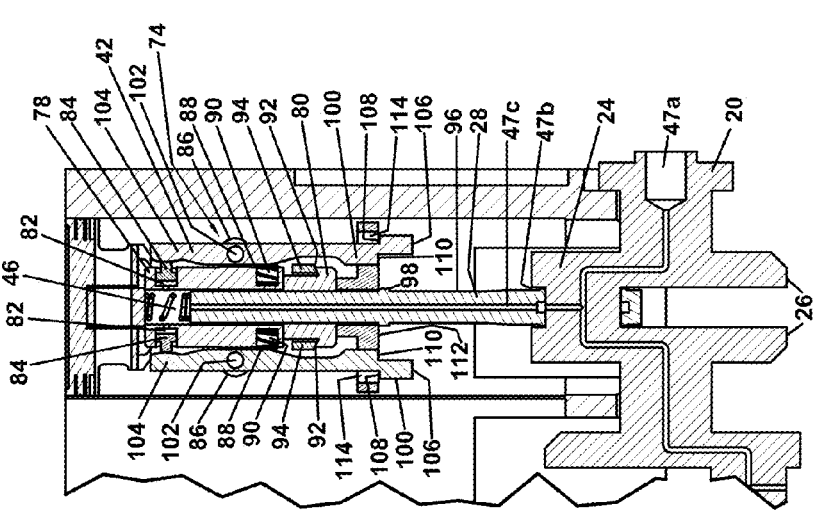
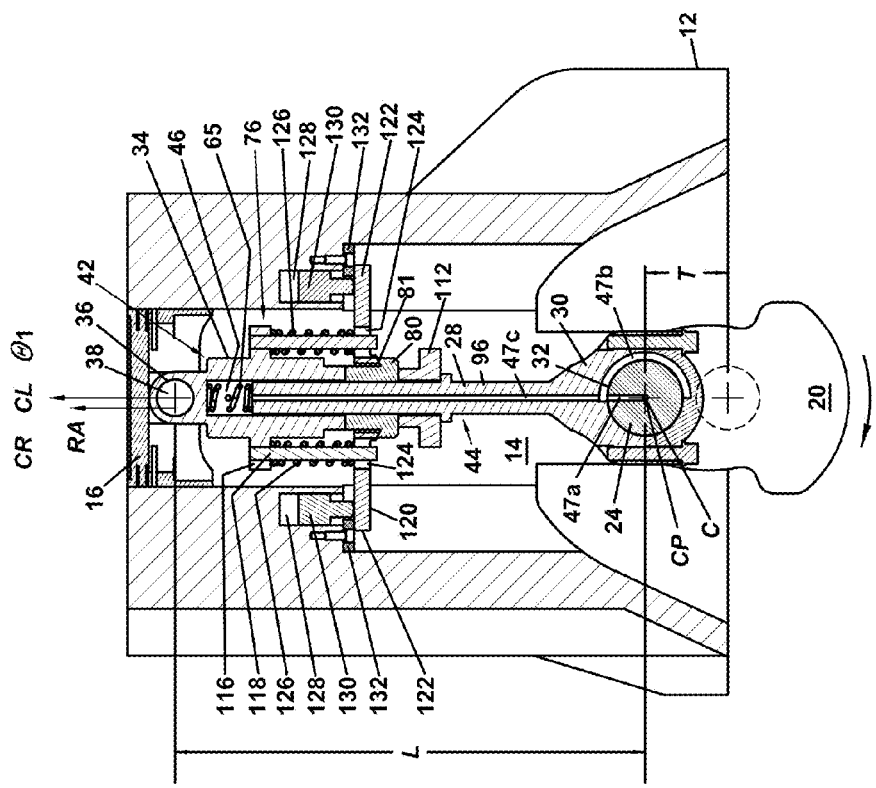
SECTION B-B
Fig. 53B
crankshaft zero degrees
SECTION A-A
Fig. 53A

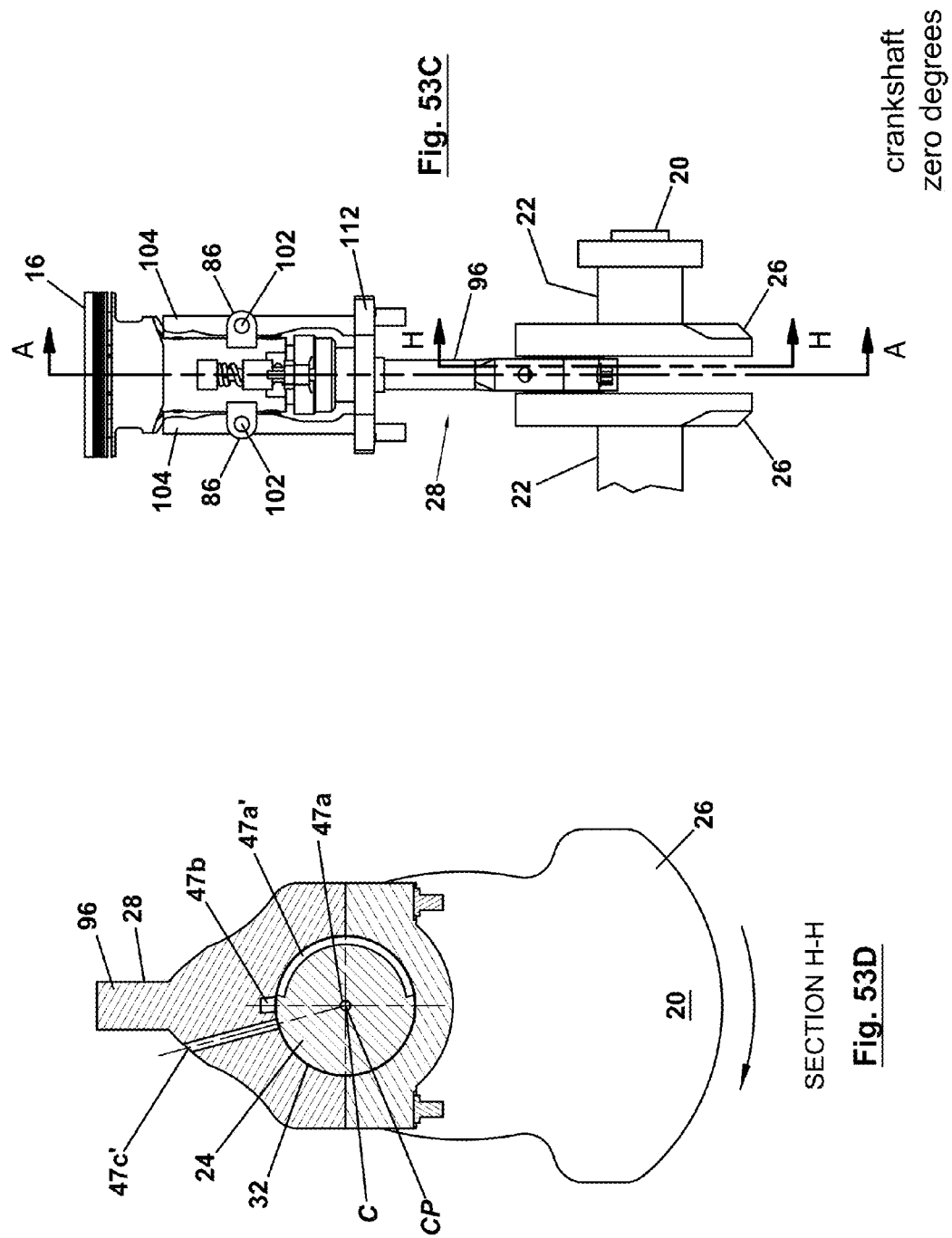

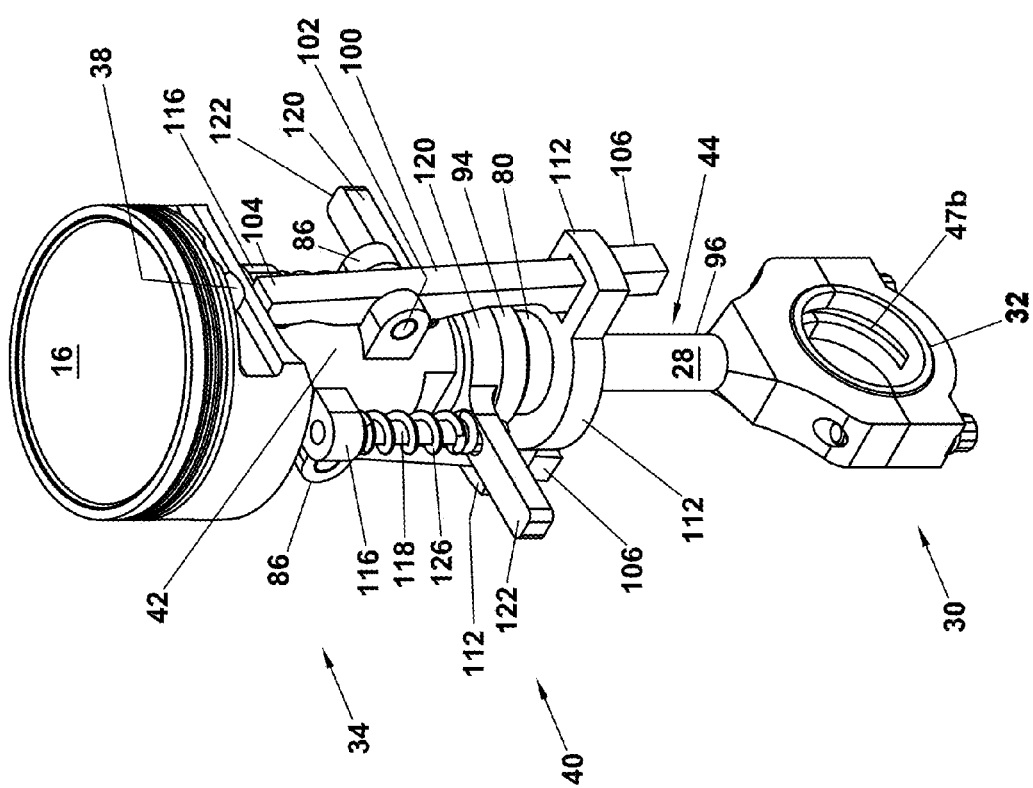

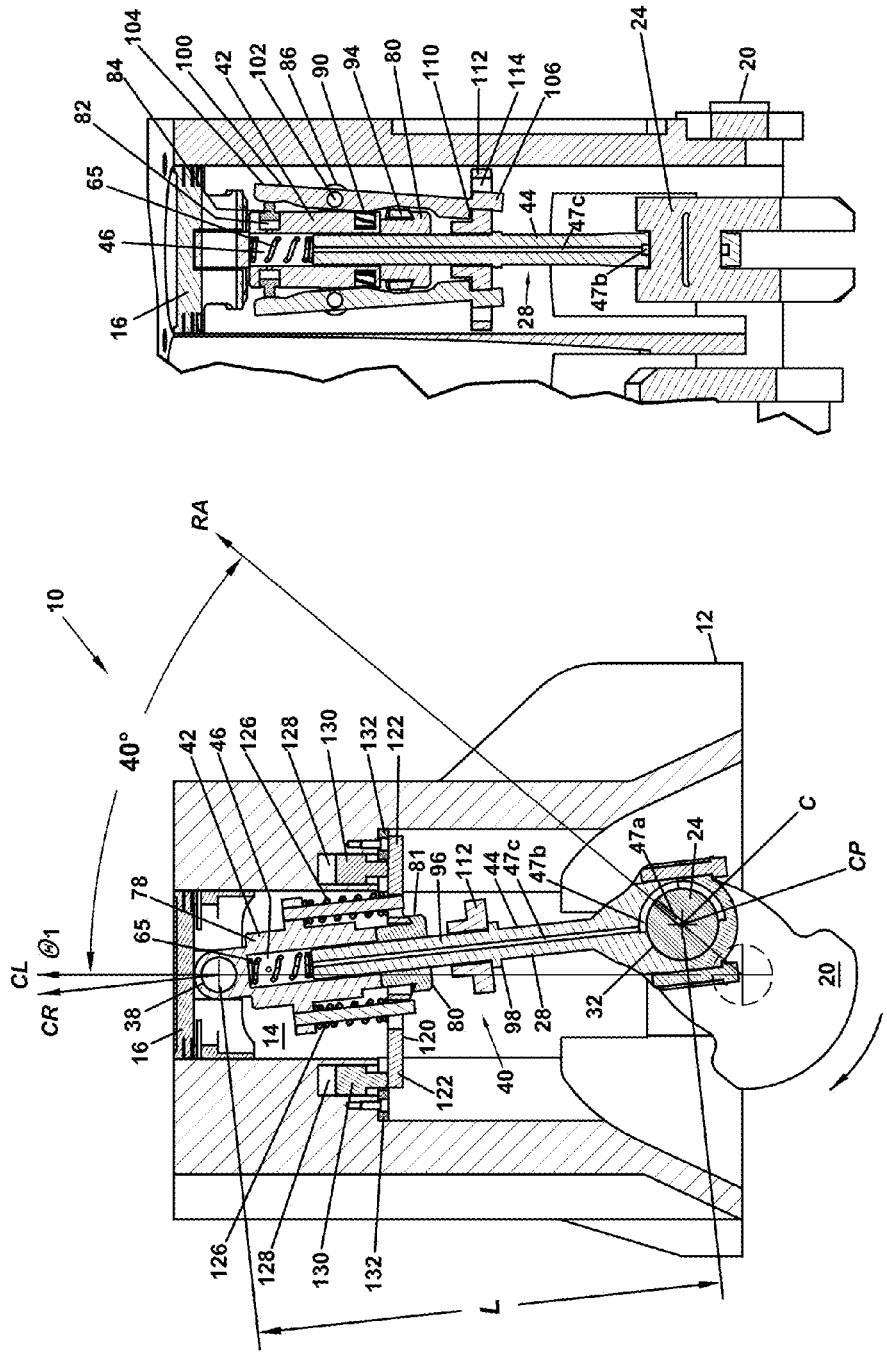

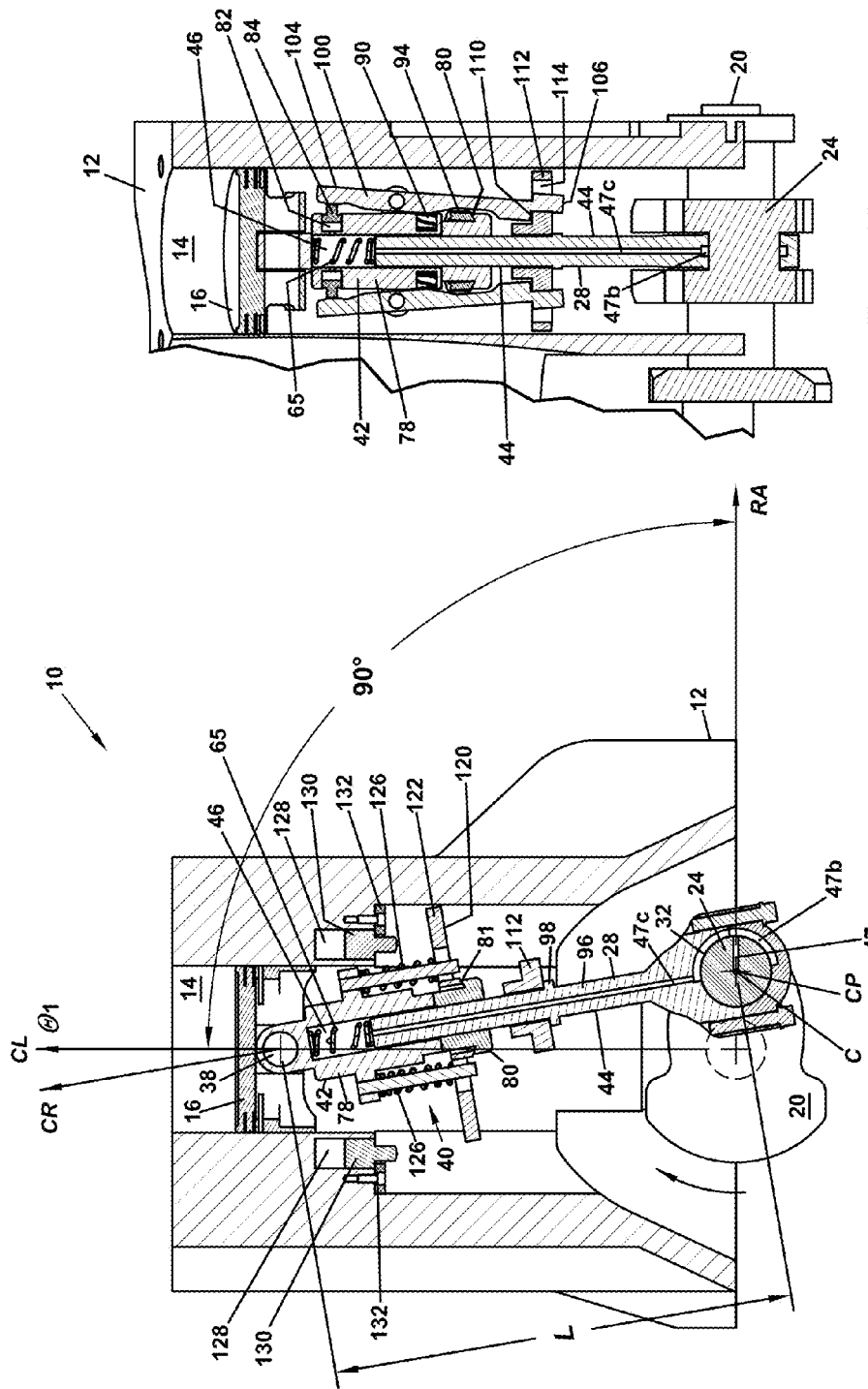

crankshaft 160 degrees

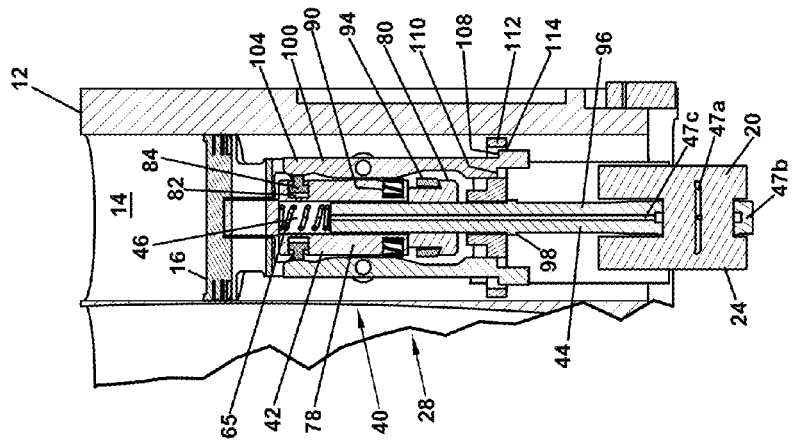
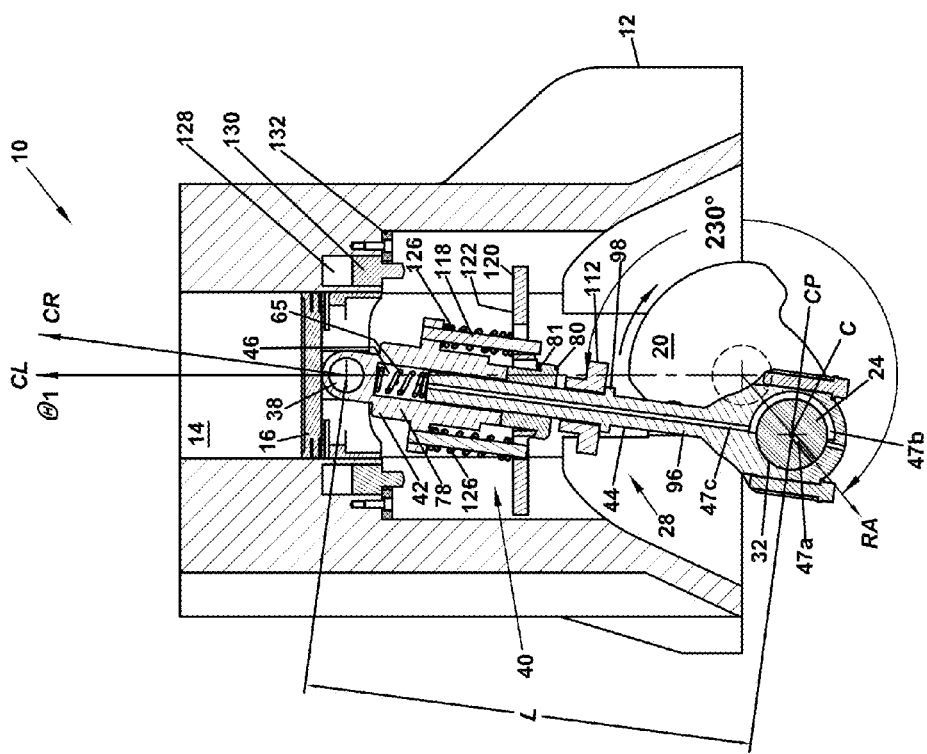
Fig. 59A
Fig. 59B
crankshaft 230 degrees

SECTION H-H crankshaft 320 degrees

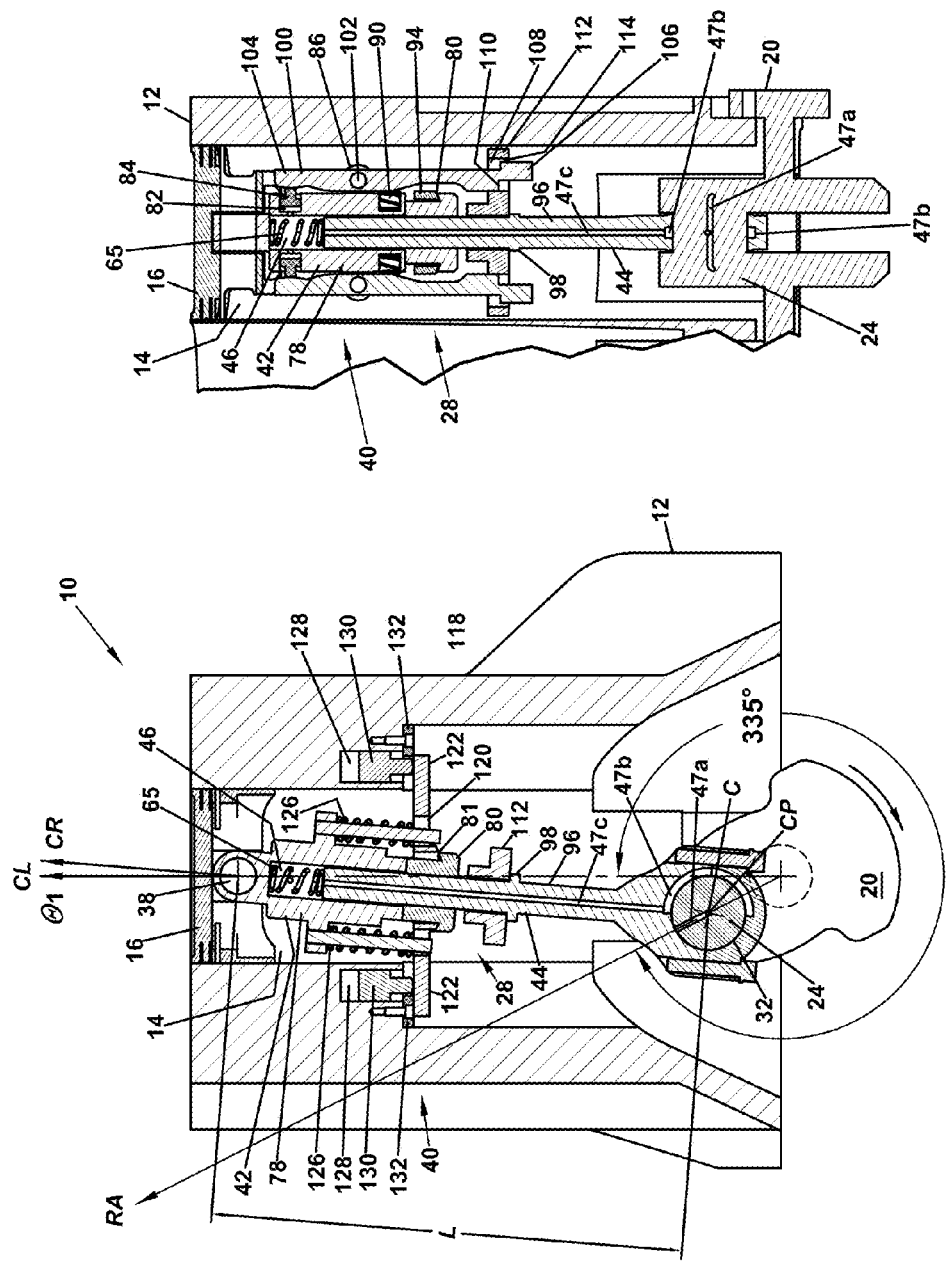

crankshaft 360 degrees

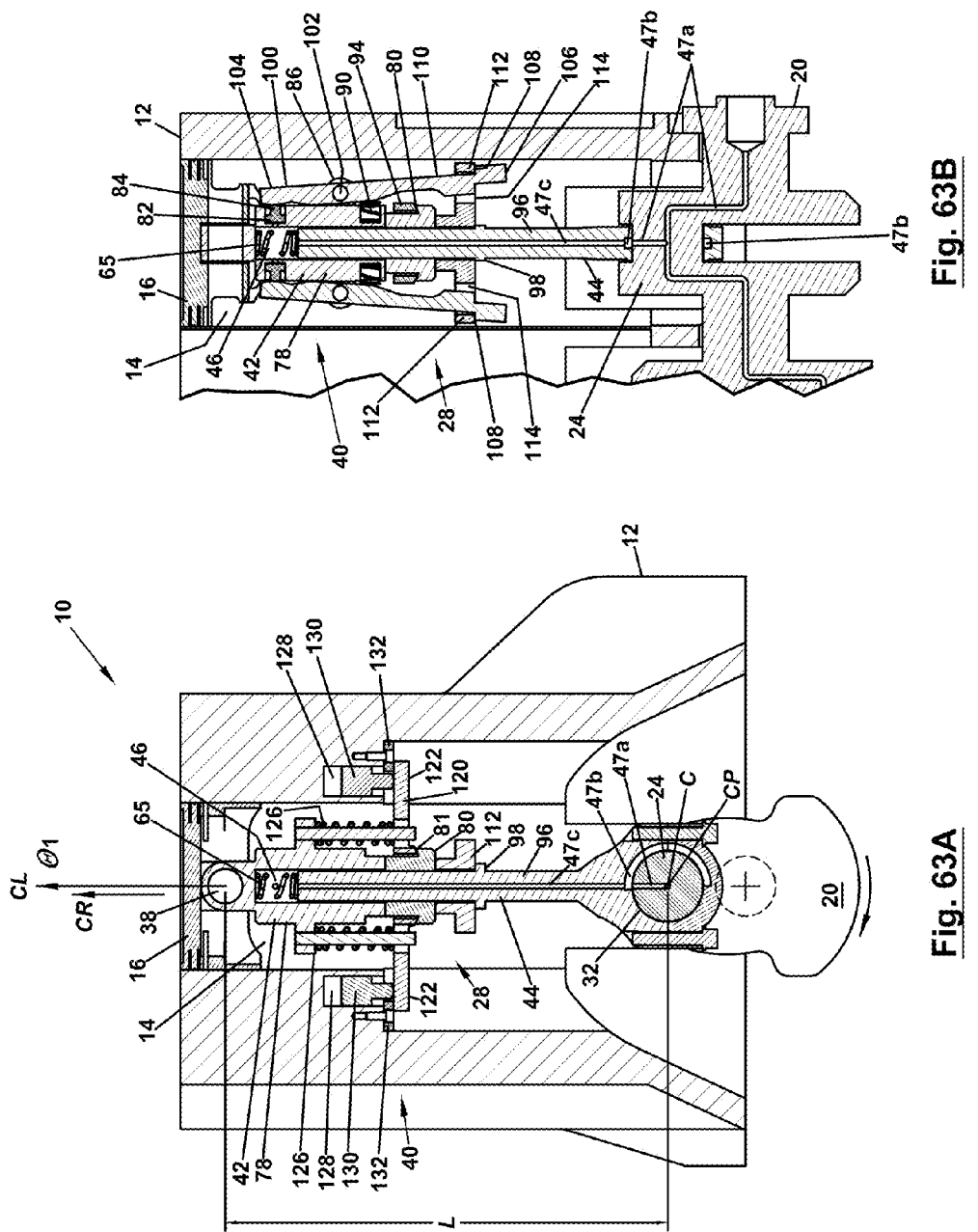

INTERNAL COMBUSTION ENGINE WITH HYDRAULICALLY-AFFECTED STROKE

RELATED APPLICATION

This application claims the benefit of priority under 35 U.S.C. §119(e) of U.S. Provisional Application No. 61/314,863, filed Mar. 17, 2010, the disclosure of which is incorporated herein by reference.

FIELD OF THE DISCLOSURE

The present disclosure relates to internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is operably coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston, the cylinder, and a cylinder head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) created between the axis connecting rod and the radial axis. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process may be less than desired.

Thus, it may be desirable to provide an internal combustion engine with a configuration that improves the efficiency of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to an internal combustion engine. The internal combustion engine may include a cylinder block defining a cylinder and a crankshaft having a crankpin. The crankshaft is rotatably received by the cylinder block and rotates along a longitudinal axis, and the crankpin defines a longitudinal axis parallel to and offset by a distance with respect to the longitudinal axis along which the crankshaft rotates. The engine may further include a piston configured to reciprocate within the cylinder and a connecting rod operably coupled to the piston and the crankpin. At least one of the piston and the connecting rod is configured such that a distance between a cross-sectional center of the crankpin and an upper surface of the piston is variable via hydraulic operation.

According to another aspect, an internal combustion engine may include a cylinder block defining a cylinder and a crankshaft defining a crankpin. The crankshaft is rotatably received by the cylinder block and rotates along a longitudinal axis, and the crankpin defines a longitudinal axis parallel to and offset by a distance with respect to the longitudinal axis along which the crankshaft rotates. The engine may further include a piston configured to reciprocate within the cylinder, the piston defining a longitudinal length between a proximal end and a distal end. The engine may also include a connecting rod operably coupled to the piston and the crankpin, the connecting rod having a proximal aperture receiving the crankpin and a distal aperture operably coupled to the piston. The connecting rod defines a longitudinal length between a center of the proximal aperture and a center of the distal aperture, wherein the longitudinal length of at least one of the piston and the connecting rod is variable via hydraulic operation.

According to still a further aspect, an internal combustion engine may include a cylinder block defining a cylinder and a crankshaft defining a crankpin, wherein the crankshaft is rotatably received by the cylinder block and rotates along a longitudinal axis. The crankpin defines a longitudinal axis parallel to and offset by a distance with respect to the longitudinal axis along which the crankshaft rotates. The engine may further include a piston configured to reciprocate within the cylinder between spaced stroke termination points defining a stroke of the piston. The engine may also include a connecting rod operably coupled to the piston and the crankpin, wherein a line extending between the longitudinal axis along which the crankshaft rotates and the longitudinal axis of the crankpin defines a radial axis of the crankshaft. The engine may be configured such that as the crankshaft rotates, reversal of the direction of travel of the piston within the cylinder is delayed via hydraulic operation after the piston reaches at least one of the stroke termination points.

According to yet another aspect, an internal combustion engine may include a cylinder block defining a cylinder and a crankshaft having a crankpin, wherein the crankshaft is rotatably received by the cylinder block and rotates along a longitudinal axis. The crankpin defines a longitudinal axis parallel to and offset by a distance with respect to the longitudinal axis along which the crankshaft rotates. The engine may further include a piston configured to reciprocate within the cylinder and a connecting rod operably coupled to the piston and the crankpin, wherein at least one of the piston and the connecting rod is configured such that a distance between a cross-sectional center of the crankpin and an upper surface of the piston is variable. A line extending between the longitudinal axis along which the crankshaft rotates and the longitudinal axis of the crankpin defines a radial axis of the crankshaft. The engine may be configured to selectively operate in two modes, including a first mode, wherein the distance between the cross-sectional center of the crankpin and the upper surface of the piston is fixed regardless of a radial position of the radial axis of the crankshaft, and a second mode, wherein the distance between the cross-sectional center of the crankpin and the upper surface of the piston is varied based on the radial position of the radial axis of the crankshaft.

According to yet further aspect, a connecting rod for an engine may include a hydraulic cylinder, including a piston portion and a cylinder portion, wherein at least one of the piston portion and the cylinder portion comprises a first aperture configured to couple the hydraulic cylinder to a crankshaft, and wherein the other of the piston portion and the cylinder portion comprises a second aperture configured to couple the hydraulic cylinder to a piston. The hydraulic cylinder may be configured to lengthen and shorten the connecting rod via operation of the hydraulic cylinder.

According to still a further aspect, a piston for an engine may include a hydraulic cylinder, including a piston portion and a cylinder portion, wherein at least one of the piston portion and the cylinder portion comprises an aperture configured to couple the hydraulic cylinder to a connecting rod. The hydraulic cylinder may be configured to lengthen and shorten a distance between the aperture and an upper surface of the piston via operation of the hydraulic cylinder.

Additional objects and advantages of the disclosure will be set forth in part in the description which follows, and in part will be obvious from the description, or may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

FIG. 3A is a schematic partial perspective view of an exemplary embodiment of a portion of the exemplary embodiment shown in FIG. 1;

FIG. 4A is a schematic top view of an exemplary embodiment of a crankshaft for the exemplary embodiment shown in FIG. 1;

FIG. 4B is a schematic side section view the exemplary crankshaft shown in FIG. 4A;

FIG. 5A is a schematic end section view taken along line A-A of FIG. 7 of the exemplary embodiment shown in FIG. 1 with the radial axis angle of the crankshaft shown at 0 degrees;

FIG. 5B is a schematic detail view of FIG. 5A;

FIG. 6A is a schematic diagram of an exemplary embodiment of a fluid circuit for the exemplary embodiment shown in FIG. 1;

FIG. 6B is a schematic diagram of another exemplary embodiment of a fluid circuit for the exemplary embodiment shown in FIG. 1;

FIG. 16 is a schematic partial perspective view of another exemplary embodiment of an internal combustion engine;

FIG. 17 is a schematic partial perspective view of a portion of the exemplary embodiment shown in FIG. 16;

FIG. 20A is a schematic end section view taken along line A-A of FIG. 22 with the radial axis angle of the crankshaft shown at 0 degrees;

FIG. 20B is a schematic detail view of FIG. 20A;

FIG. 21A is a schematic diagram of an exemplary embodiment of a fluid circuit for the exemplary embodiment shown in FIG. 16;

FIG. 21B is a schematic diagram of another exemplary embodiment of a fluid circuit for the exemplary embodiment shown in FIG. 16;

FIG. 34A is a schematic top view of an exemplary embodiment of a crankshaft for the exemplary embodiment shown in FIG. 16;

FIG. 34B is a schematic side section view the exemplary crankshaft shown in FIG. 34A;

FIG. 41A is a schematic end section view of the exemplary embodiment shown in FIG. 31 with the radial axis angle of the crankshaft shown at 36 degrees;

FIG. 41B is a schematic perspective detail section view of FIG. 41A;

FIG. 41C is a schematic, detail top view of an exemplary portion of the detail shown in FIG. 41B;

FIG. 51A is a schematic diagram of an exemplary embodiment of a fluid circuit for the exemplary embodiment shown in FIG. 48;

FIG. 51B is a schematic diagram of another exemplary embodiment of a fluid circuit for the exemplary embodiment shown in FIG. 48;

FIG. 53A is a schematic end section view taken along line A-A of FIG. 52 with the radial axis angle of the crankshaft shown at 0 degrees;

FIG. 53B is a schematic side section view taken along line B-B of FIG. 52 with the radial axis angle of the crankshaft shown at 0 degrees;

FIG. 53C is a schematic side view of a portion of the exemplary embodiment shown in FIG. 53A;

FIG. 53D is a schematic end section view taken along line H-H of FIG. 53C with the radial axis angle of the crankshaft shown at 0 degrees;

FIG. 54A is a schematic partial perspective view of a portion of the exemplary embodiment shown in FIG. 49;

FIG. 55A is a schematic end section view taken along line A-A of FIG. 53 with the radial axis angle of the crankshaft shown at 40 degrees;

FIG. 55B is a schematic side section view taken along line B-B of FIG. 53 with the radial axis angle of the crankshaft shown at 40 degrees;

FIG. 56A is a schematic end section view taken along line A-A of FIG. 53 with the radial axis angle of the crankshaft shown at 90 degrees;

FIG. 56B is a schematic side section view taken along line B-B of FIG. 53 with the radial axis angle of the crankshaft shown at 90 degrees;

FIG. 59A is a schematic end section view taken along line A-A of FIG. 53 with the radial axis angle of the crankshaft shown at 230 degrees;

FIG. 59B is a schematic side section view taken along line B-B of FIG. 53 with the radial axis angle of the crankshaft shown at 230 degrees;

FIG. 61A is a schematic end section view taken along line A-A of FIG. 53 with the radial axis angle of the crankshaft shown at 335 degrees;

FIG. 61B is a schematic side section view taken along line B-B of FIG. 53 with the radial axis angle of the crankshaft shown at 335 degrees;

FIG. 63A is a schematic end section view taken along line A-A of FIG. 53 with the radial axis angle of the crankshaft shown at 0 degrees and with the exemplary engine shown in FIG. 48 in an exemplary mode of operation; and FIG. 63B is a schematic side section view taken along line B-B of FIG. 53 with the radial axis angle of the crankshaft shown at 0 degrees in the exemplary mode of operation shown in FIG. 63A.

DESCRIPTION OF EXEMPLARY EMBODIMENTS

Figure 1:
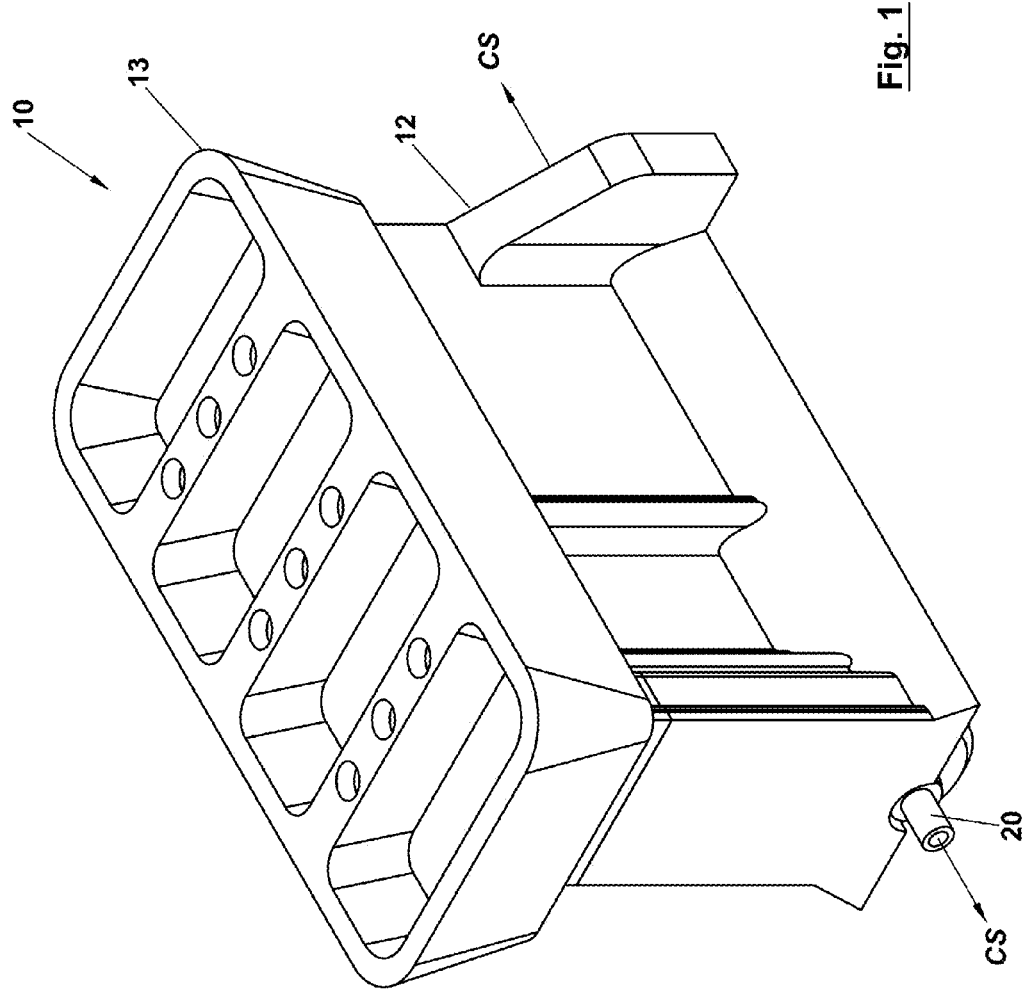
FIG. 1 is a schematic partial perspective view of an exemplary embodiment of an internal combustion engine.

Reference will now be made in detail to exemplary embodiments. Wherever possible, the same reference numbers are used in the drawings and the description to refer to the same or like parts.

FIGS. 1-15 schematically illustrate a first exemplary embodiment of an engine 10. Other exemplary embodiments are described with respect to FIGS. 16-63B.

Figure 2:
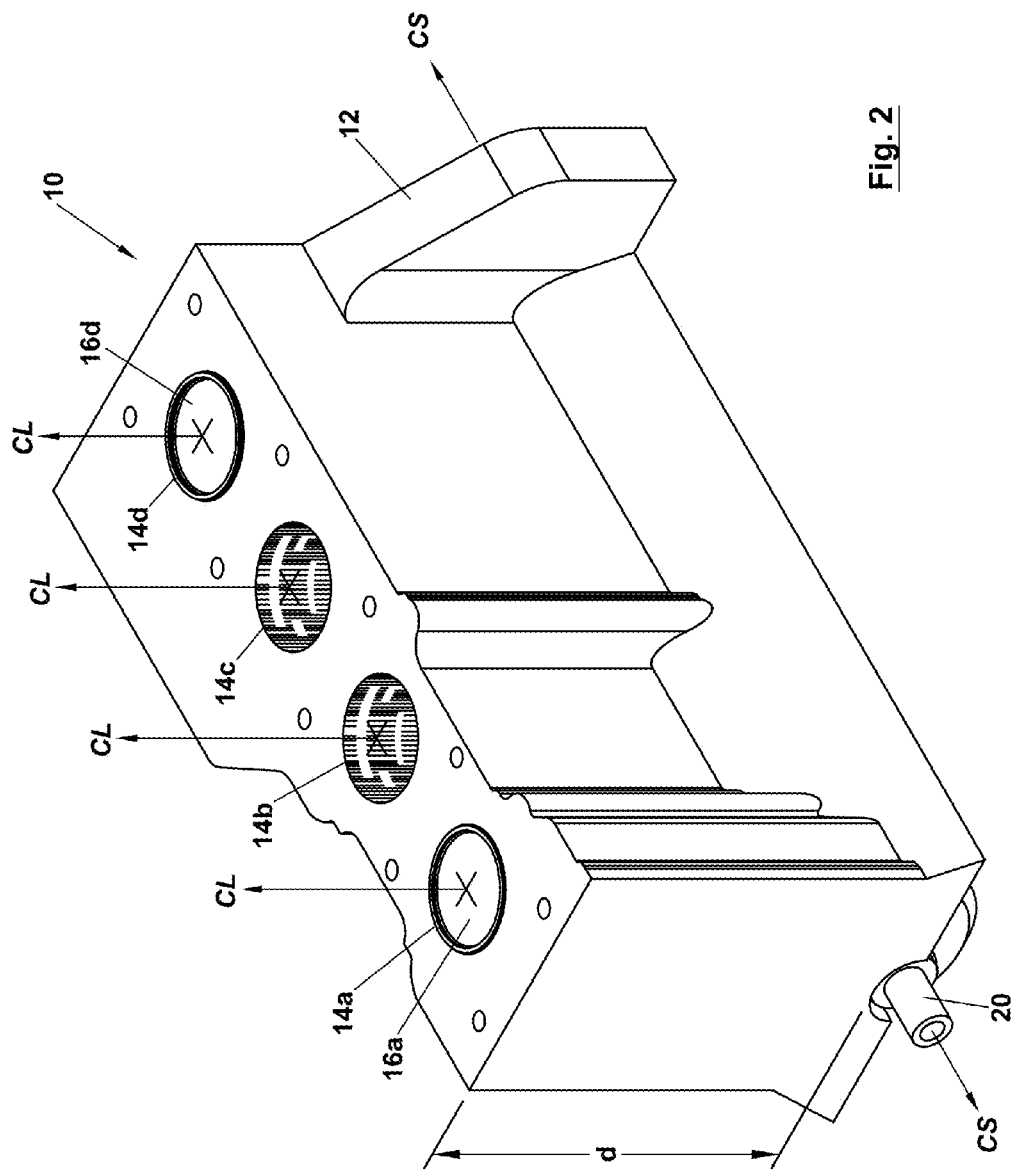
FIG. 2 is a schematic partial perspective view of a portion of the exemplary embodiment shown in FIG. 1.

In the first exemplary embodiment, exemplary engine 10 is a reciprocating-piston internal combustion engine. As shown in FIGS. 1 and 2, engine 10 includes a cylinder block 12 and a cylinder head 13. Referring to FIG. 2, cylinder block 12 defines a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 3B:
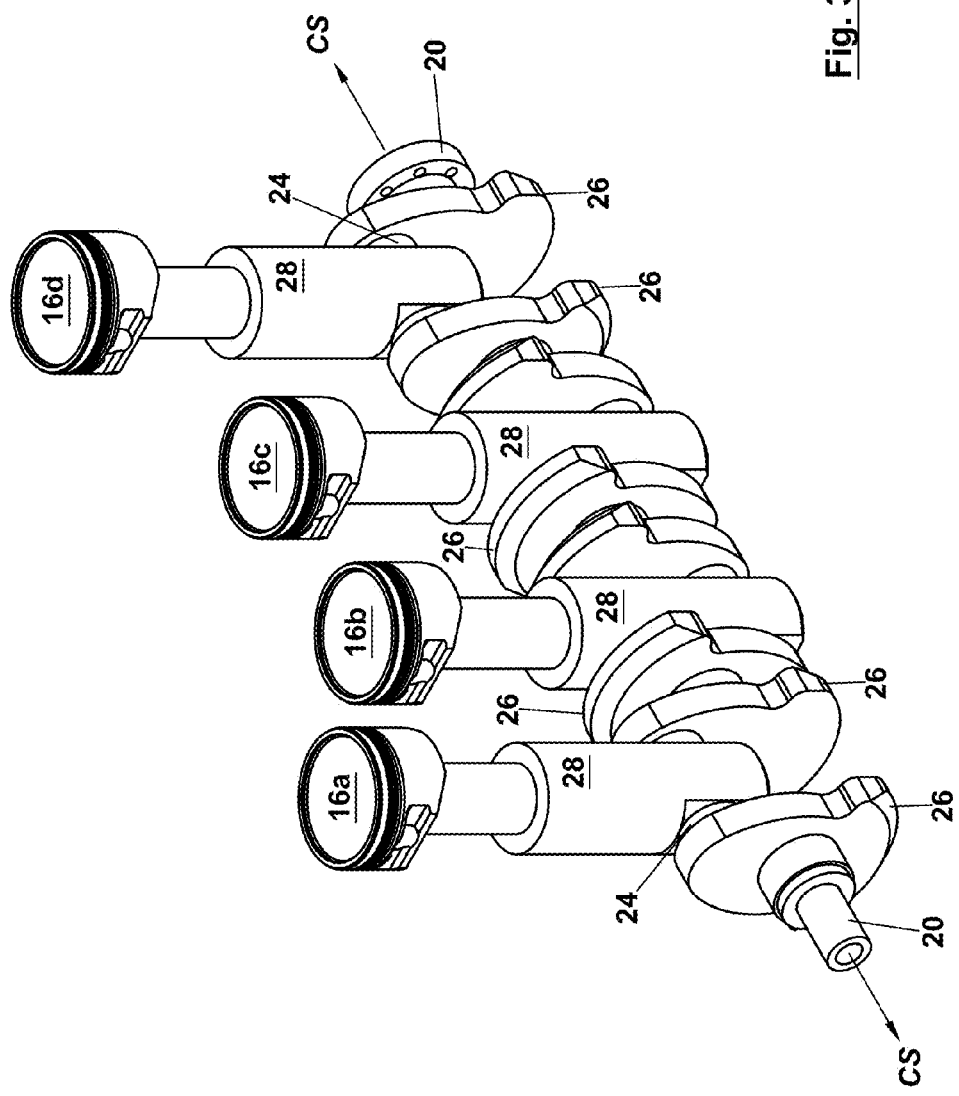
FIG. 3B is a schematic partial perspective view of an exemplary embodiment of a portion of the exemplary embodiment shown in FIG. 1.
Figure 7:
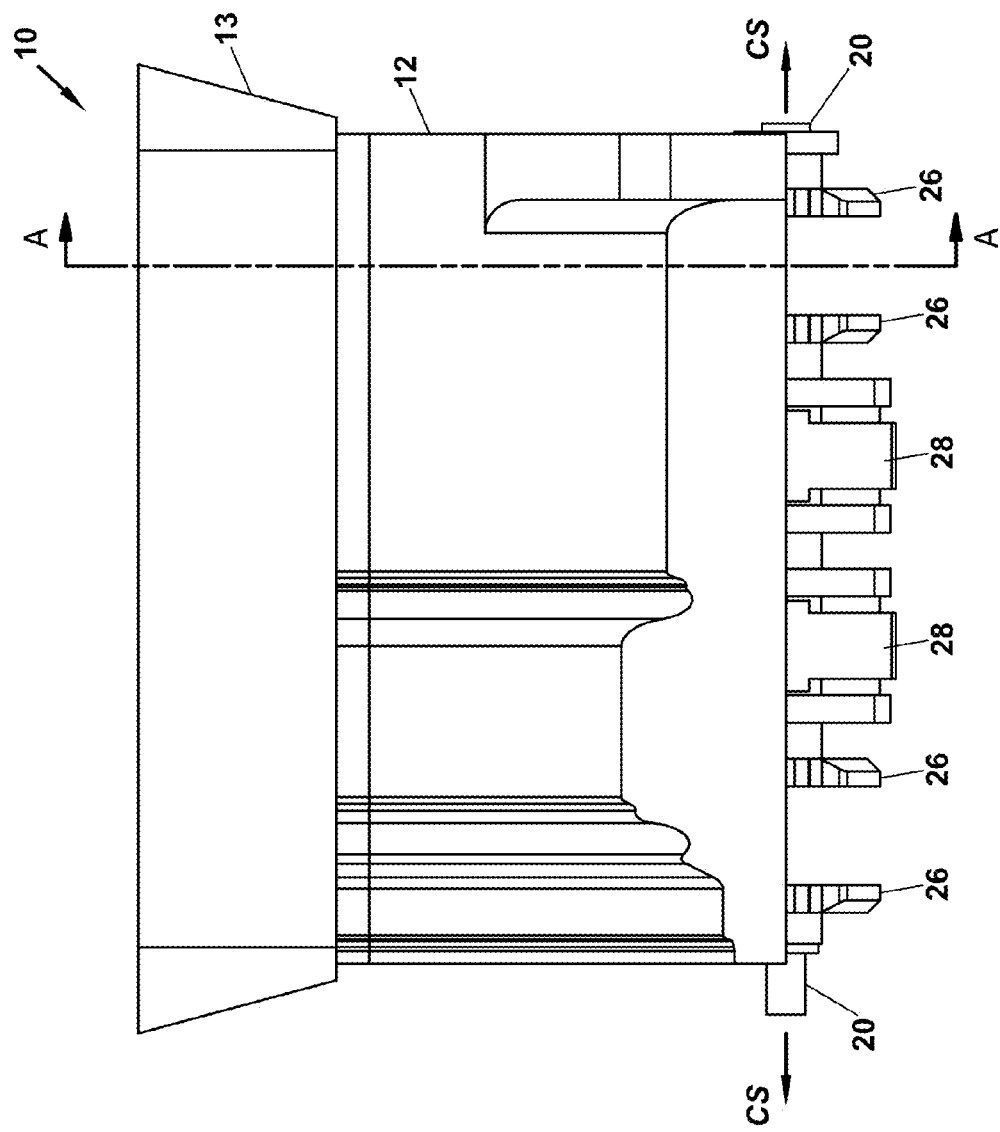
FIG. 7 is a schematic side view of the exemplary embodiment shown in FIG. 1.

As shown in FIGS. 2, 3A, and 3B, exemplary engine 10 includes pistons 16 corresponding to cylinders 14, for example, four pistons 16a, 16b, 16c, and 16d (FIGS. 3A and 3B). As shown in FIG. 2, pistons 16a and 16d are positioned in the upper end (i.e., "upper" being relative to the orientation of engine 10 shown in FIG. 2) of cylinders 14a and 14d, respectively, while pistons 16b and 16c are not visible in FIG. 2 due to being positioned lower in cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIGS. 4A and 4B, crankshaft 20 defines a number of journals 22 corresponding to the number of bearings defined by cylinder block 12, and journals 22 are received by bearings, such that crankshaft 20 may rotate along longitudinal axis CS.

Exemplary crankshaft 20 (see FIGS. 4A and 4B) also defines a number of crankpins 24 corresponding to the number of pistons 16. Crankpins 24 are circular in cross section, and the respective circular cross-sections define a center C (see, e.g., FIG. 4B), which, in turn, defines a longitudinal crankpin axis CP extending in a perpendicular manner through center C of the cross-section of the respective crankpin 24, such that crankpin axis CP is parallel and offset with respect to crankshaft axis CS. In particular, crankpin axis CP is spaced a distance T (see FIG. 4B) from the longitudinal axis CS of crankshaft 20. Crankshaft 20 may also include a number of counterbalance weights 26 for providing (or improving) rotational balance of crankshaft 20 when assembled with pistons 14 and connecting rods.

Referring to FIGS. 3A and 3B, for example, pistons 16 are operably coupled to crankpins 24 via a number of connecting rods 28 corresponding to the number of pistons 16. In particular, exemplary connecting rods 28 (see, e.g., FIGS. 5A and 5B) include a proximal end 30 having a first aperture 32 configured to receive crankpin 24, and a distal end 34 having a second aperture 36 for operably coupling connecting rod 28 to piston 16 via, for example, a pin 38.

According to the exemplary engine 10 shown in FIGS. 1-15, exemplary connecting rod 28 is configured to have a variable length. In particular, exemplary connecting rod 28 defines a longitudinal length L between the center of first aperture 32 and the center of second aperture 36, or a longitudinal length between the center of first aperture 32 and an upper surface of piston 16. The longitudinal length L of connecting rod 28 may be selectively altered via, for example, hydraulic operation. For example, exemplary connecting rod 28 includes a hydraulic cylinder 40 including a cylinder portion 42 and a piston portion 44. In the example shown in FIGS. 5A and 5B, cylinder portion 42 includes first aperture 32 for receiving crankpin 24, and piston portion 44 includes second aperture 36 for receiving pin 38, which couples connecting rod 28 to piston 16. Cylinder portion 42 and piston portion 44 define two fluid receiving chambers 46a and 46b.

By selectively supplying fluid (e.g., hydraulic fluid such as oil) to one or more of fluid receiving chambers 46a and 46b, the longitudinal length L of connecting rod 28 may be selectively varied. For example, as shown in FIG. 3A, a first fluid line 48a is operably coupled to fluid receiving chamber 46a to provide flow communication between fluid chamber 46a and a fluid circuit 50 (see FIGS. 6A and 6B), and a second fluid line 48b is operably coupled to fluid receiving chamber 46b to provide flow communication between fluid chamber 46b and fluid circuit 50. Fluid lines 48a and 48b may be, for example, flexible high-pressure tubing known to those skilled in the art.

According to some embodiments, hydraulic cylinder 40 may be a double-acting cylinder (i.e., a hydraulic cylinder, which receives pressurized fluid in both fluid receiving chambers) configured such that fluid may be supplied under pressure to either fluid chamber 46a or fluid chamber 46b, depending on the desired operation of hydraulic cylinder 40. Alternatively, hydraulic cylinder 40 may be a single-acting cylinder (i.e., a hydraulic cylinder, which receives pressurized fluid in only a single fluid receiving chamber) configured such that fluid may be supplied under pressure to only one of fluid chambers 46a and 46b (e.g., fluid chamber 46a), depending on the desired operation of hydraulic cylinder 40. For such a single-acting arrangement, the other fluid chamber (e.g., fluid chamber 46b) merely drains or draws-in fluid based on the pressurized fluid supplied to the other fluid chamber (e.g., fluid chamber 46a).

According to some embodiments, fluid may be supplied to hydraulic cylinder 40 under pressure via one or more fluid passages in one or more of crankshaft 20, crankpin 24, and connecting rod 28. For example, as shown in FIG. 4B, exemplary crankshaft 20 includes fluid passages 47 which may be configured to supply pressurized fluid to the surface of crankpins 24, which may, in turn, supply pressurized fluid to connecting rods 28 (see, e.g., FIGS. 51A and 51B, which show an example of how fluid passages 47a in crankshaft 20 supply fluid to fluid passages 47b and 47c in connecting rods 28). Fluid may be supplied to fluid passages 47a of crankshaft 20 via fluid line 48. Exemplary passages 47a may be configured in crankpins 24 such that fluid is supplied to connecting rods 28 based on the relative radial position of first aperture 32 with respect to crankpin 24.

Referring to FIGS. 6A and 6B, exemplary engine 10 shown in FIGS. 1-15 includes a fluid circuit 50 for supplying and receiving hydraulic fluid to and from hydraulic cylinder 40. For example, as shown in FIG. 6A, exemplary fluid circuit 50 uses oil or other suitable lubricant for lubricating engine 10 as a source of fluid for operating hydraulic cylinder 40. For example, engine 10 includes a sump 52 for containing oil and a first oil pump 54 in flow communication with sump 52 for distributing the oil throughout engine 10. Exemplary fluid circuit 50 also includes a second oil pump 56 (e.g., a high-pressure oil pump of either fixed or variable capacity) in flow communication with sump 52 for supplying fluid to hydraulic cylinder 40 under pressure via lines 48a and/or 48b, as explained in more detail below. Exemplary fluid circuit 50 further includes one or more valves 58 to control the flow of fluid to hydraulic cylinder 40. For example, if hydraulic cylinder 40 is a single-acting cylinder, fluid circuit 50 may include a valve 58, and if hydraulic cylinder 40 is a double-acting cylinder, fluid circuit 50 may include a number of valves 58. Valve(s) 58 may include any suitable valves known to those skilled in the art, such as, for example, flow control valves, flow dividing valves, directional control valves, proportional directional control valves, and/or electro-hydraulic servo valves.

Exemplary fluid circuit 50 also includes a controller 60 configured to control operation of pump 56 and/or valve(s) 58. Exemplary controller 60 may be a microprocessor-based controller, such as, for example, a programmable or pre-programmed controller that operates digitally according to logic and/or algorithms stored either within controller 60 or downloaded remotely via physical connection and/or wireless communication link. Exemplary controller 60 may be integrated as part of, for example, an engine control module (not shown). Alternatively, exemplary controller 60 may be separate from an engine control module and/or may be operated in concert with engine control module. Exemplary controller 60 may be configured (e.g., provided with programming) to provide control signals to pump 56 and/or valve(s) 58, such that hydraulic cylinder 40 is operated in a manner described below.

Exemplary fluid circuit 50 shown in FIG. 6A also includes a fluid cooler 62 configured to cool the oil in fluid circuit 50. Fluid cooler 62 may be any type of fluid cooler known to those skilled in the art, and fluid cooler 62 may be either integrated as a part of the customary cooling system of engine 10 or it may be separate from the customary cooling system of engine 10. Further, exemplary fluid circuit 50 includes a thermostat or other temperature regulating device 64 for generally maintaining the temperature of the fluid in a desired operating range once the fluid temperature reaches the desired operating temperature. According to some embodiments, temperature regulating device 64 may be controlled via controller 60.

The exemplary embodiment of fluid circuit 50 shown in FIG. 6B does not use the lubricant for lubricating engine 10 as a source of fluid for operating hydraulic cylinders 40. Rather, exemplary fluid circuit shown in FIG. 6B is self-contained and uses fluid that remains separate from the lubricant of engine 10. As shown in FIG. 6B, fluid circuit 50 includes a sump 54a that is not in flow communication with sump 52. Exemplary fluid circuit 50 shown in FIG. 6B may include one or more of the attributes of the exemplary fluid circuit shown in FIG. 6A.

During operation of exemplary engine 10, as crankshaft 20 rotates, crankpins 24 revolve around crankshaft longitudinal axis CS, such that crankpin centers C define a circular path having a radius defined by the distance T defined along a radial axis RA (see FIGS. 8-15) extending between the longitudinal axis CS of crankshaft 20 and the longitudinal axis CP of the respective crankpins 24. Thus, first apertures 32 of proximal end 30 of connecting rod 28, which are rotatably coupled with respect to crankpins 24, also revolve about the crankshaft axis CS. Distal end 34 of connecting rod 28 is constrained to move in a reciprocating and linear manner due to being operably coupled to piston 16, which is likewise constrained to move in a reciprocating and linear manner within respective cylinder 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS (as affected according to the exemplary operation described below).

During operation of a conventional engine, a piston reciprocates within the cylinder, such that during a power stroke of the internal combustion engine, combustion of an air/fuel mixture within a combustion chamber defined by the piston, cylinder, and cylinder-head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process in a conventional internal combustion engine may be less than desired.

Exemplary engine 10 is configured to employ a strategy that delays any substantial movement of piston 16 toward crankshaft 20 during the power stroke, until crankshaft 20 has rotated to point at which there is a more effective moment arm between connecting rod axis CR and radial axis RA extending between crankshaft axis CS and a respective crankpin axis CP. The timing of initiation of combustion may be correspondingly delayed. As a result, a greater amount of the energy of the combustion event may be captured because the maximum force acting on piston 16 coincides with a greater moment arm, thereby resulting in more torque at crankshaft 20 during the power stroke.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

FIGS. 8-15 schematically illustrate exemplary operation of engine 10 having exemplary connecting rod 28, which serves to delay piston 16's travel at the beginning of the power stroke of exemplary engine 10. In particular, by selectively activating hydraulic cylinder 40 of connecting rod 28, such that the distance between the center CP of crankpin 24 and the center of pin 38 (i.e., the effective length L of connecting rod 28) may be selectively and/or dynamically varied. Such an exemplary embodiment renders it possible to effectively hold piston 16 in cylinder 14 at a substantially fixed position for a short period of time, even as crankpin 24 continues to revolve around crankshaft 20's axis CS as crankshaft 20 rotates. As a result, it is possible to hold piston 16 at the point of highest compression in the combustion chamber while crankpin 24 revolves to a position, which results in an increased moment arm defined by the radial axis RA extending between the center of crankshaft 20 and the center C of crankpin 24 and the axis CR of connecting rod 28. This results in relatively more torque being applied to crankshaft 20 as combustion begins with piston 16 still remaining at a point of farthest from the center of crankshaft 20 (i.e., at the end of its upward stroke as shown). In this exemplary manner, the delaying strategy outlined below may be implemented.

Figure 8:
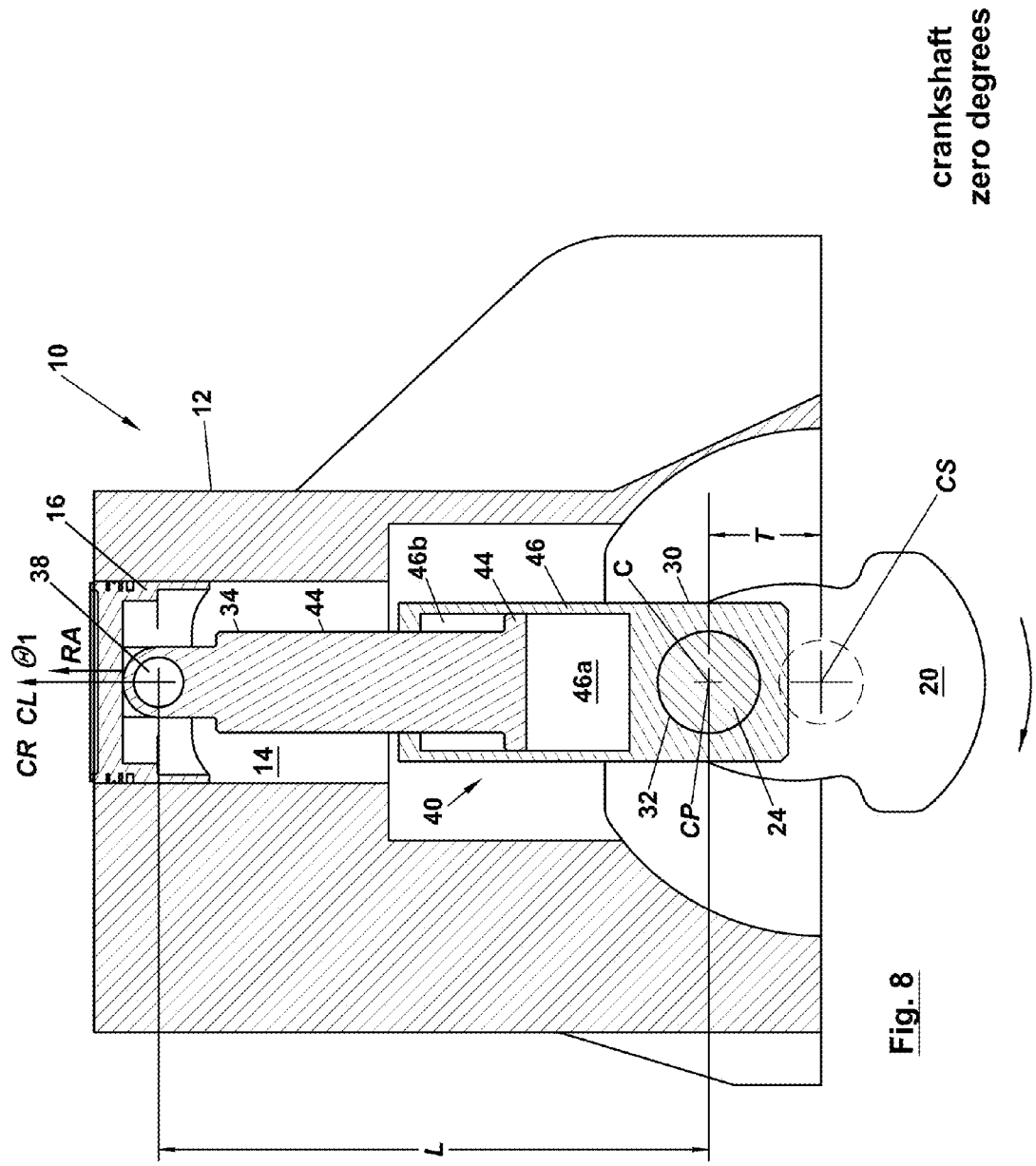
FIG. 8 is a schematic partial end section view taken along line A-A of FIG. 6 with the radial axis angle of the crankshaft shown at 0 degrees.

For example, as shown in FIG. 8. (a section view taken along line A-A of FIG. 7), crankshaft 20 is oriented such that radial axis RA defined by the center of crankshaft 20 and the center of crankpin 24 is oriented at zero degrees, which corresponds generally a first stroke termination angle $\theta_1$, which generally coincides with the end of the compression stroke of exemplary engine 10. Thus, with radial axis RA in this orientation, piston 16 is at its upper position within cylinder 14.

During exemplary operation of engine 10, crankshaft 20 rotates in the clockwise direction as shown. Hydraulic cylinder 40 is in a configuration such that piston 16 is at the top of its stroke while the radial axis RA of crankshaft 20 is substantially aligned with the longitudinal axis CR of connecting rod 28. In particular, piston portion 44 of hydraulic cylinder 40 is in a position relative to cylinder portion 42, such that piston 16 is at the top of its stroke.

Figure 9:
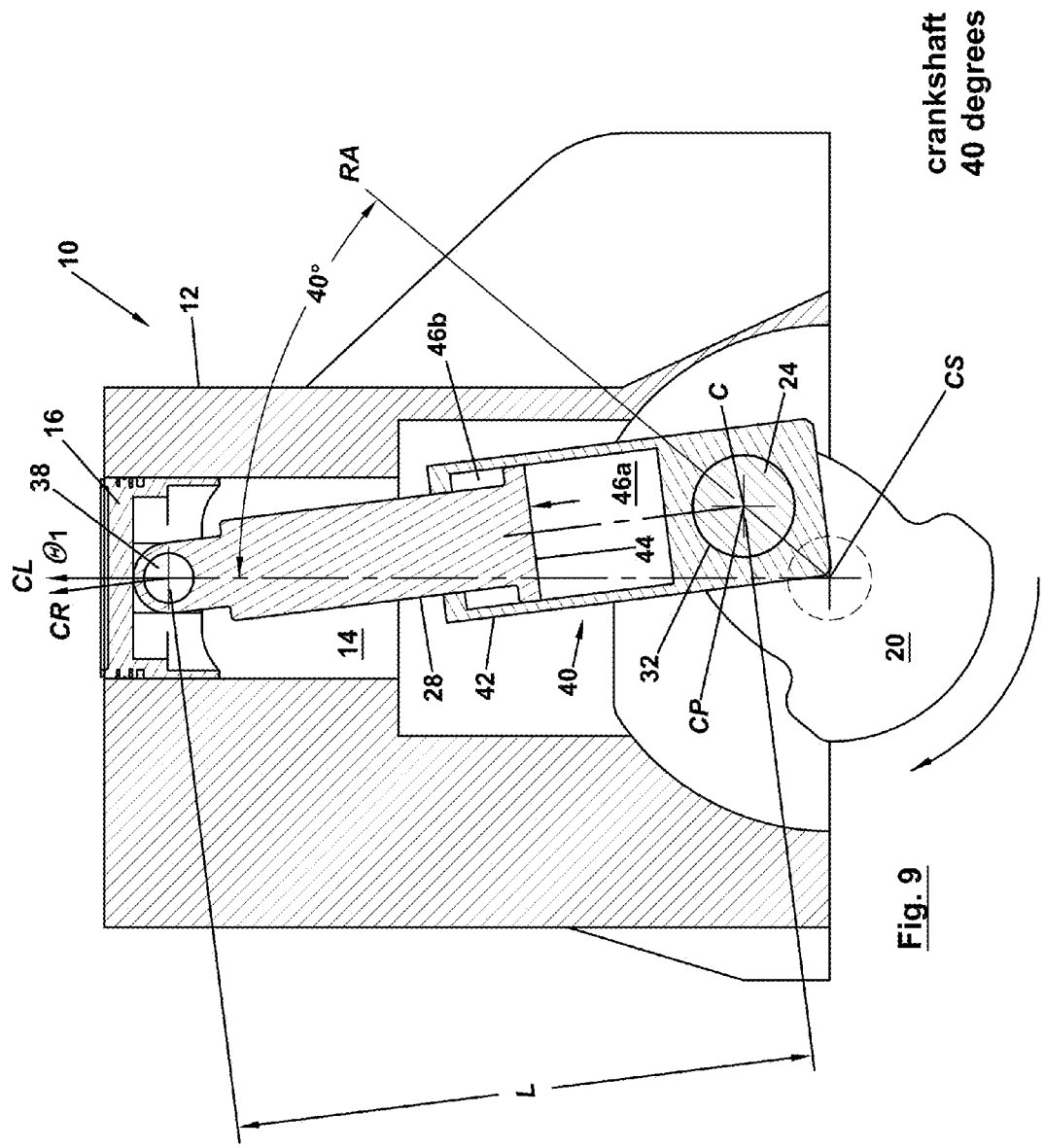
FIG. 9 is a schematic end section view of the exemplary embodiment shown in FIG. 1 with the radial axis angle of the crankshaft shown at 40 degrees.

FIG. 9 shows crankshaft 20 in an orientation where radial axis RA has rotated 40 degrees past first stroke termination angle $\theta_1$. In a conventional engine, piston 16 would have traveled a significant distance toward crankshaft axis CS. In contrast, according to exemplary engine 10, piston 16 has not yet started its downward travel toward crankshaft axis CS. Instead, piston portion 44 of hydraulic cylinder 40 has increased its extension from cylinder portion 42, thus increasing the effective length L of connecting rod 28. As a result of the increase in effective length L, piston 16 has not traveled down cylinder 14 (as shown), even though crankpin 24 has rotated clockwise relative to the center C of crankshaft 20, such that the center of crankpin 24 is farther from the top of cylinder 14. (See Table I below showing an exemplary relationship for exemplary engine 10 between radial axis RA's angle and piston 16's displacement relative to the first stroke termination angle $\theta_1$.)

TABLE I

RADIAL AXIS RA ANGLE VS. PISTON DISPLACEMENT
RELATIVE TO ZERO DEGREES FOR FIGS. 1-15

| Crank Angle | Piston Depth |
|---|---|
| 0 | 0.000 |
| 4 | 0.000 |
| 8 | 0.000 |
| 12 | 0.000 |
| 16 | 0.000 |
| 20 | 0.000 |
| 24 | 0.000 |
| 28 | 0.000 |
| 32 | 0.000 |
| 36 | 0.000 |
| 40 | 0.000 |
| 44 | 0.104 |
| 48 | 0.215 |
| 52 | 0.333 |
| 56 | 0.455 |
| 60 | 0.583 |
| 64 | 0.714 |
| 68 | 0.848 |
| 72 | 0.984 |
| 76 | 1.122 |
| 80 | 1.261 |
| 84 | 1.399 |
| 88 | 1.537 |
| 92 | 1.637 |
| 96 | 1.807 |
| 100 | 1.938 |
| 104 | 2.065 |
| 108 | 2.189 |
| 112 | 2.308 |
| 116 | 2.422 |
| 120 | 2.531 |
| 124 | 2.635 |
| 128 | 2.732 |
| 132 | 2.832 |
| 136 | 2.908 |
| 140 | 2.986 |
| 144 | 3.057 |
| 148 | 3.120 |
| 152 | 3.177 |
| 156 | 3.226 |
| 160 | 3.268 |
| 164 | 3.302 |
| 168 | 3.329 |
| 172 | 3.348 |
| 176 | 3.360 |
| 180 | 3.364 |

The change in relative position between piston portion 44 and cylinder portion 42 of hydraulic cylinder may be achieved by supplying hydraulic fluid under pressure to chamber 46a of hydraulic cylinder 40 in a controlled manner. In addition, hydraulic fluid is forced from chamber 46b. This may be accomplished, for example, by one of the exemplary fluid circuits 50 shown in FIGS. 6A and 6B. For example, controller 60 sends one or more signals to valve(s) 58 and/or pump 56, such that hydraulic fluid is supplied to chamber 46a and drained from chamber 46b in a controlled manner such that piston portion 44 of hydraulic cylinder 40 extends further out of cylinder portion 42, thereby increasing the effective length L of connecting rod 28, as shown in FIG. 9. Such exemplary operation results in an exemplary delay of the initiation of the power stroke of piston 16.

Exemplary controller 60 may be configured to receive signals that provide it with an indication regarding the radial position of radial axis RA. Controller 60 may be implemented or programmed to determine, based on such signals, timing for extending and/or retracting piston portion 44 of hydraulic cylinder 40 relative to cylinder portion 42 of hydraulic cylinder 40 according to the exemplary manner described herein.

For example, upon receipt of signals indicating the radial position of radial axis RA, controller 60 may electronically perform an algorithm that results in sending signals to valve(s) 58 and/or pump 56, such that they are operated in a manner resulting in the exemplary operation of hydraulic cylinder 40 described herein.

Figure 10:
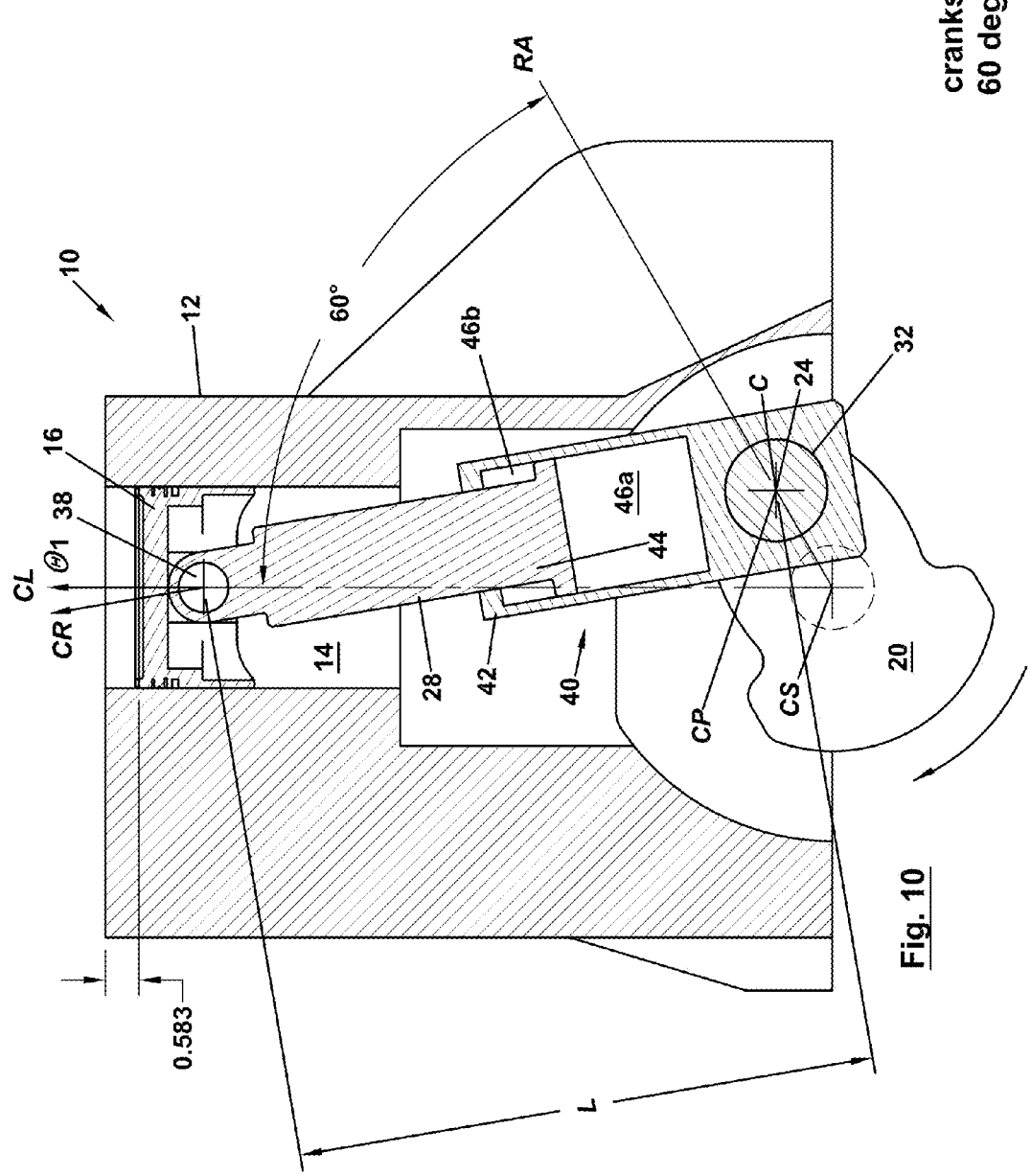
FIG. 10 is a schematic end section view of the exemplary embodiment shown in FIG. 1 with the radial axis angle of the crankshaft shown at 60 degrees.

As shown in FIG. 10, radial axis RA has rotated 60 degrees from first stroke termination angle $\theta_1$. Between 40 and 60 degrees past first stroke termination angle $\theta_1$ (e.g., 59 degrees, 55 degrees, 50 degrees, 45 degrees, or 41 degrees), piston portion 44 ceases to extend farther out of cylinder portion 42 of hydraulic cylinder 40, and piston 16 begins to travel down cylinder 14. According to some exemplary embodiments, the radial position at which the piston portion 44 ceases to extend farther out of cylinder portion 42 may be adjusted during operation according to predetermined criteria in order to tailor operation of engine 10. In the exemplary embodiment shown in FIG. 10, when the radial axis RA has rotated to 60 degrees past the first stroke termination angle $\theta_1$, the piston has traveled 0.583 inch down cylinder 14 relative to its point of maximum extension from crankshaft axis CR.

Figure 11:
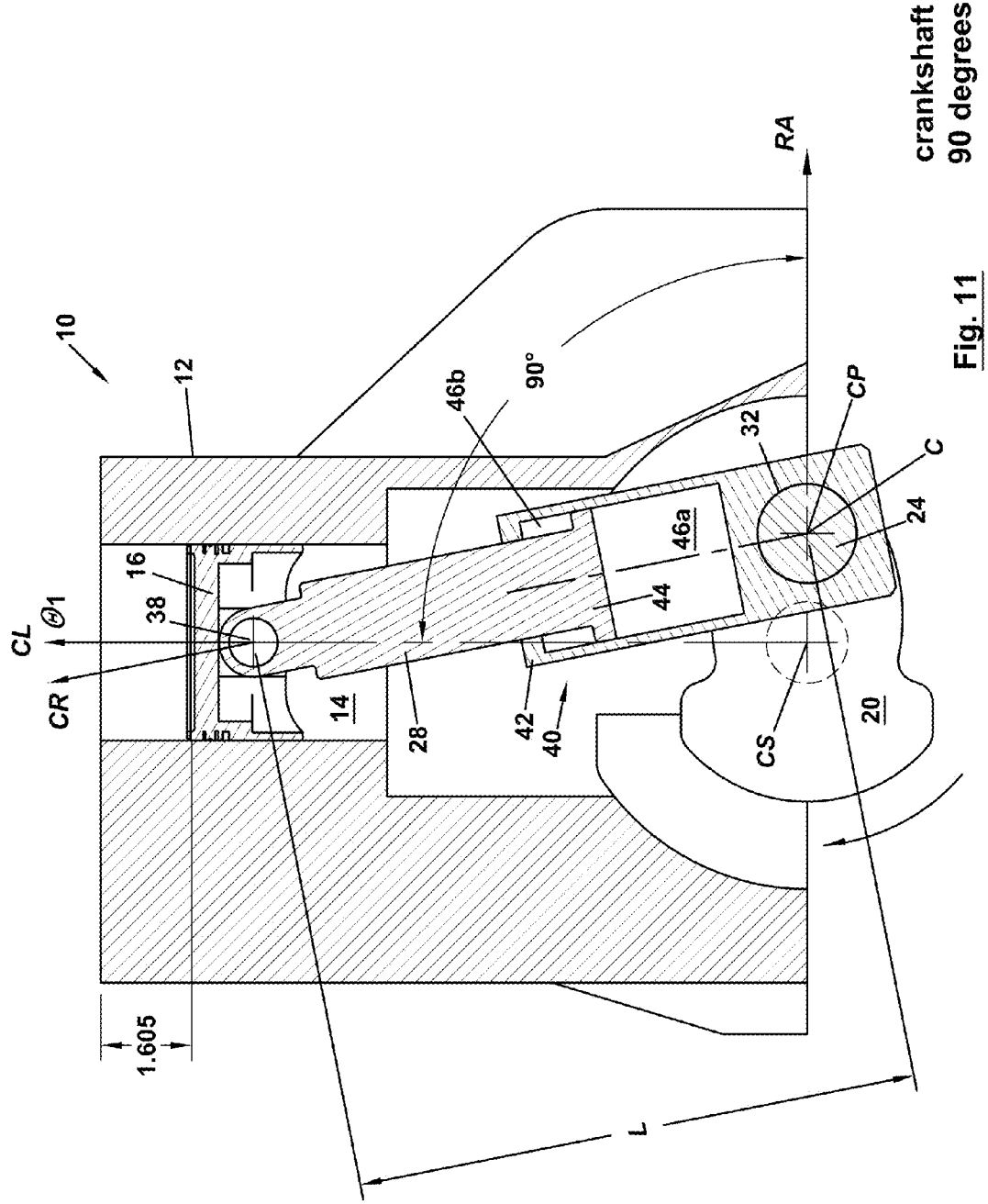
FIG. 11 is a schematic end section view of the exemplary embodiment shown in FIG. 1 with the radial axis angle of the crankshaft shown at 90 degrees.

Referring to FIG. 11, radial axis RA has rotated 90 degrees past first stroke termination angle $\theta_1$. Piston portion 44 and cylinder portion 42 of hydraulic cylinder 40 have maintained the relative positions shown in FIG. 10. Thus, the effective length L of connecting rod 28 has remained the same as shown in FIG. 10. As a result, piston 16 has continued to travel down cylinder 14, such that piston 16 has traveled 1.605 inches down cylinder 14 relative to its point of maximum extension from crankshaft axis CR. Thus, whereas during the first 40 degrees of rotation of radial axis RA past first stroke termination angle $\theta_1$, piston 16 did not travel downward, during the next 50 degrees of rotation of radial axis RA, piston 16 has traveled 1.605 inches down cylinder 14.

Figure 12:
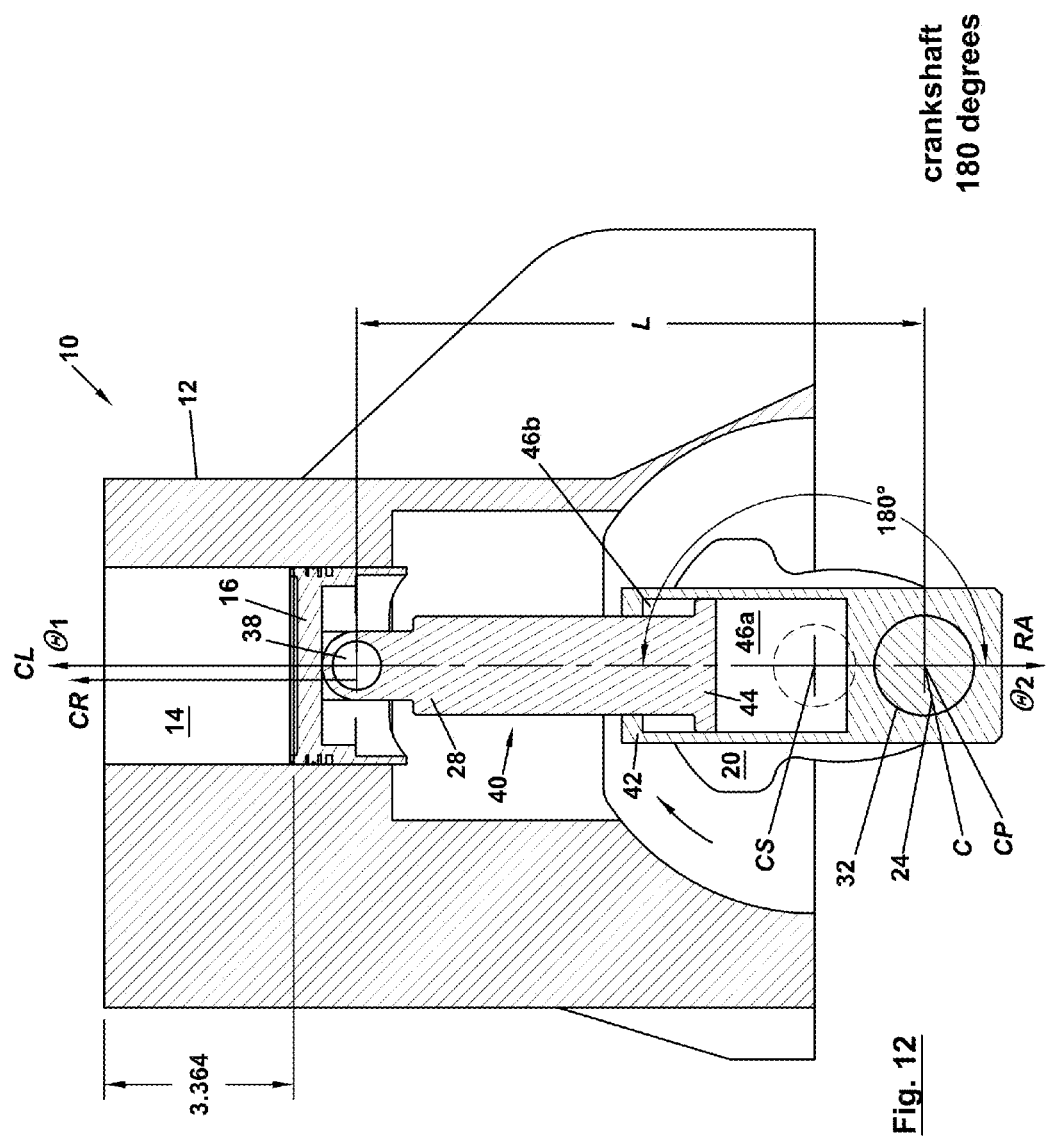
FIG. 12 is a schematic end section view of the exemplary embodiment shown in FIG. 1 with the radial axis angle of the crankshaft shown at 180 degrees.

Referring to FIG. 12, radial axis RA has rotated 180 degrees past first stroke termination angle $\theta_1$ (i.e., at a second stroke termination angle $\theta_2$, which corresponds to the end of the power stroke). Piston portion 44 and cylinder portion 42 of hydraulic cylinder 40 have maintained the relative positions shown in FIGS. 10 and 11. Thus, the effective length L of connecting rod 28 has remained the same as shown in FIGS. 10 and 11. As a result, piston 16 has continued to travel down cylinder 14, such that piston 16 has traveled 3.364 inches down cylinder 14 relative to its point of maximum extension from crankshaft axis CR.

Figure 13:
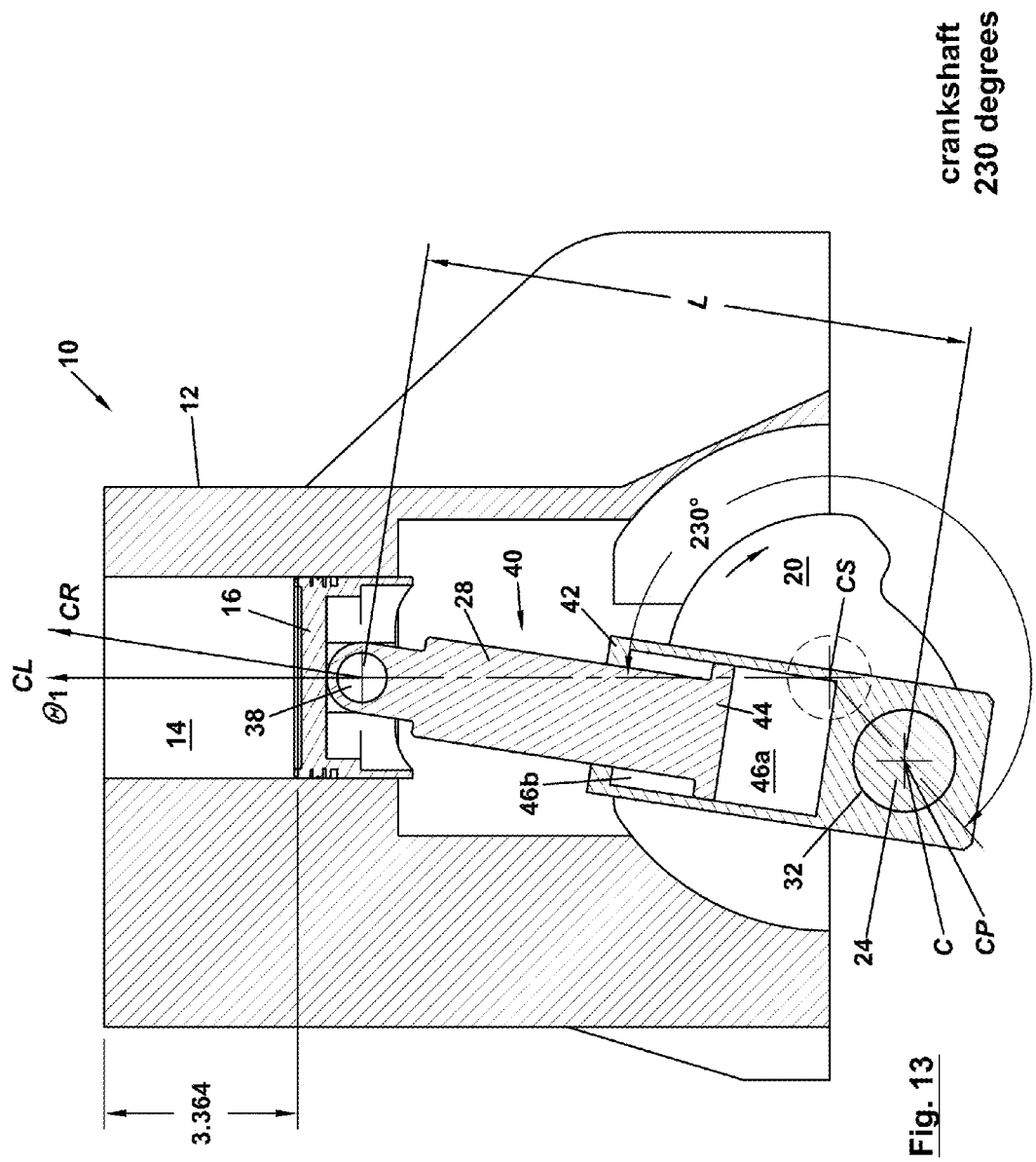
FIG. 13 is a schematic end section view of the exemplary embodiment shown in FIG. 1 with the radial axis angle of the crankshaft shown at 230 degrees.

Referring to FIG. 13, radial axis RA has rotated 230 degrees past first stroke termination angle $\theta_1$. Thus, crankpin 24's center C has reversed direction such that it is moving closer to cylinder 14. However, piston 16 has not started to travel up cylinder 14 because the effective length L of connecting rod 28 has shortened to offset upward movement of crankpin 24's center C. The shortening of the effective length L may occur by operation of fluid circuit 50, which may supply pressurized hydraulic fluid to chamber 46b of hydraulic cylinder 40, thereby causing piston portion 44 of hydraulic cylinder 40 to retract into cylinder portion 42. As fluid is supplied to chamber 46b, fluid is evacuated from chamber 46a. Alternatively, fluid may be evacuated from chamber 46a without supplying fluid under pressure to chamber 46b, and shortening of the effective length L of connecting rod 28 may be accomplished passively due to inherent resistance within cylinder 14 during piston 16's travel back up cylinder 14. According to some embodiments, shortening of the effective length L may be completed when the radial axis RA reaches a radial position of 360 degrees (see, e.g., FIGS. 5A, 5B, and 15), and piston 16 abuts a bumper 70 associated with cylinder head 13, as explained in more detail with respect to FIG. 15.

As a result of the shortening of the effective length L of connecting rod 28, piston 16 may remain in substantially the same position within cylinder 14 as the position shown in FIG. 12 (e.g., at 3.364 inches from its point of maximum extension from crankshaft axis CR) when the radial position of the radial axis RA was at the second stroke termination angle $\theta_2$ (i.e., at 180 degrees past first stroke termination angle $\theta_1$).

Figure 14:
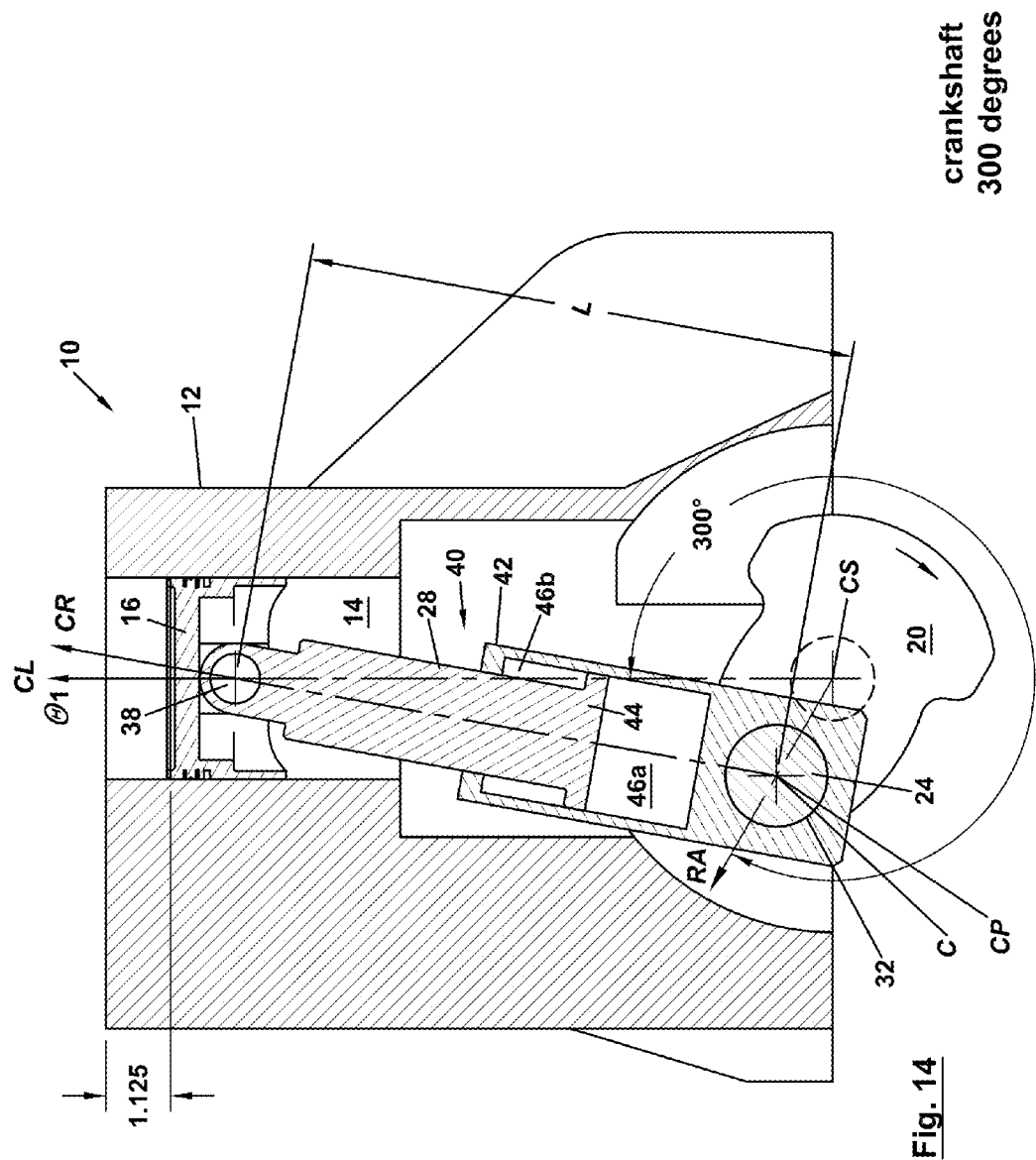
FIG. 14 is a schematic end section view of the exemplary embodiment shown in FIG. 1 with the radial axis angle of the crankshaft shown at 300 degrees.

Referring to FIG. 14, radial axis RA has rotated 300 degrees past first stroke termination angle $\theta_1$. In the exemplary embodiment shown, piston portion 44 and cylinder portion 42 of hydraulic cylinder 40 have maintained the relative positions shown in FIG. 13. Thus, the effective length L of connecting rod 28 has remained the same as shown in FIG. 13. As a result, piston 16 has traveled up cylinder 14 to a point 1.125 inches from the end of its point of maximum upward travel relative to crankshaft axis CR. Thus, whereas during the first 50 degrees of rotation of radial axis RA past second stroke termination angle $\theta_2$, piston 16 did not travel upward, during the next 70 degrees of rotation of radial axis RA, piston 16 has traveled 2.239 inches up within cylinder 14.

Figure 15:
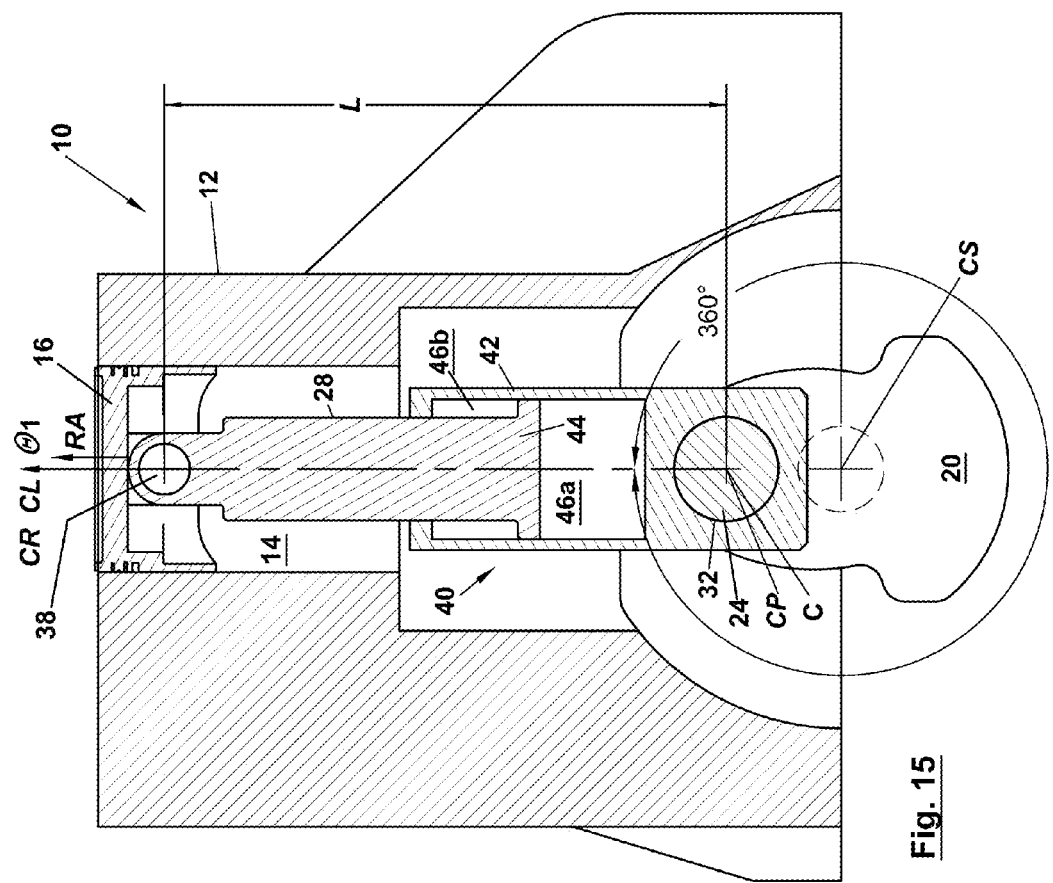
FIG. 15 is a schematic end section view of the exemplary embodiment shown in FIG. 1 with the radial axis angle of the crankshaft shown at 0/360 degrees.

Referring to FIG. 15, radial axis RA has rotated 360 degrees past first stroke termination angle $\theta_1$, thus completing a full revolution, such that radial axis RA is aligned with cylinder axis CL in the exemplary embodiment shown. Piston portion 44 and cylinder portion 42 of hydraulic cylinder 40 have maintained the relative positions shown in FIGS. 13 and 14. Thus, the effective length L of connecting rod 28 has remained the same as shown in FIGS. 13 and 14. As a result, piston 16 has continued to travel up cylinder 14 to its point of maximum upward travel relative to crankshaft axis CR (i.e., its upper position within cylinder 14).

As mentioned above, according to some embodiments, shortening of the effective length L of connecting rod 28 may be completed as the radial axis RA approaches the radial position shown in FIG. 15, and an upper surface of piston 16 abuts a damper 70 associated with cylinder head 13, thereby compressing piston portion 44 of hydraulic cylinder 40 into cylinder portion 42. Referring to FIGS. 5A and 5B, cylinder head 13 may include damper 70 which make take the form of, for example, an internally-extending flange 72 formed of an energy absorbing structure. For example, flange 72 may be formed from an impact-resistant material, such as high-strength, impact-resistant tool steel, or any other suitable material known to those skilled in the art. Alternatively, or in addition, damper 70 may take the form of a shock absorber-type structure (not shown).

According to some embodiments, cylinder block 12 may have a greater distance d (e.g., see FIG. 2) between the bearings that support crankshaft 20 and the upper (or remote) end of cylinders 14 relative to a conventional cylinder block of corresponding configuration. As crankshaft 20 rotates through positions that result in crankpin 24 being laterally offset from the axis CL of cylinder 14, connecting rod 28 is subjected to increased bending stress. By increasing the distance d, the magnitude of the bending stress on connecting rods 28 may be reduced as crankshaft 20 rotates through positions resulting in bending stress in connecting rod 28. This may serve to increase the durability and/or service life of hydraulic cylinders 40.

In the exemplary manner explained above, the effective length L of connecting rod 28 is variable, such that the distance between the center of pin 38, which operably couples connecting rod 28 to piston 16, and the center C of crankpin 24 is variable. More specifically, the distance between first aperture 32 and the center of second aperture 36 is variable (see, e.g., FIGS. 8-15), the variability of the effective length L being facilitated in this exemplary embodiment by virtue of controlled extension and retraction of piston portion 44 of hydraulic cylinder 40 relative to cylinder portion 42. As radial axis RA rotates between first stroke termination angle $\theta_1$ and 180 degrees past first stroke termination angle $\theta_1$ (i.e., to second stroke termination angle $\theta_2$), the effective length initially increases, thereby delaying initiation of the power stroke, for example, until radial axis RA reaches a point, for example, at least 40 degrees past first stroke termination angle $\theta_1$ in the exemplary embodiment shown. Thereafter, the effective length L remains substantially constant as radial axis RA continues to rotate toward an orientation 180 degrees past first stroke termination angle $\theta_1$. As the radial axis RA rotates between 180 and 360 degrees past first stroke termination angle $\theta_1$, the effective length L is reduced as piston portion 44 retracts into cylinder portion 42 of hydraulic cylinder 40.

According to some embodiments, the exemplary configuration and/or interaction can be tailored to achieve desired performance characteristics of exemplary engine 10, such as, for example, improved efficiency, improved power output, improved responsiveness, and/or improved torque. For example, the extension and retraction of piston portion 44 relative to cylinder portion 42 of connecting rod 28 can be controlled to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10. Timing of the initiation of combustion may be tailored to take advantage of the delayed stroke.

According to some embodiments, engine 10 may be configured to selectively operate in at least two modes, for example, a fixed-length mode and a variable-length mode. For example, in a first mode of operation (i.e., a fixed-length mode), hydraulic cylinder 40 may be operated such that the effective length L is fixed regardless of the radial position of radial axis RA. More specifically, hydraulic cylinder 40 may be operated such that the minimum effective length L is fixed such that there is substantially no delay in the downward travel of piston 16 as radial axis RA travels from first stroke termination angle $\theta_1$ to 90 degrees, resulting in operation similar to a conventional engine of corresponding configuration. Effectively fixing the effective length L of connecting rod 28 may permit engine 10 to operate at relatively higher engine speeds when compared to operation in a mode in which the effective length L of connecting rod 28 is varied as described above with reference to FIGS. 8-15. Thus, operating according to the fixed-length mode may be desirable when it is anticipated that the rotational speed of crankshaft 20 will be relatively high and/or it is desirable to operate engine 10 at a higher power output than would be achievable in variable-length mode.

According to a second mode of operation, a variable-length mode of operation, the effective length L of connecting rod 28 may be varied, for example, as explained with respect to FIGS. 8-15 above. It may be desirable to operate engine 10 according to the variable-length mode of operation to achieve greater efficiency relative to the fixed-length mode of operation.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

FIGS. 16-30 schematically illustrate a second exemplary embodiment of engine 10. The exemplary embodiment shown in FIGS. 16-30 includes some features that are similar to the features of exemplary engine 10 shown in FIGS. 1-15. Unlike the exemplary engine 10 shown in FIGS. 1-15, however, exemplary engine 10 shown in FIGS. 16-30 includes a piston, as opposed to a connecting rod, that is configured to affect the length of the stroke of engine 10 via hydraulic operation.

Exemplary engine 10 shown in FIGS. 16-30 is a reciprocating-piston internal combustion engine. As shown in FIGS. 16 and 17, engine 10 includes a cylinder block 12 and a cylinder head 13. Referring to FIG. 17, cylinder block 12 defines a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 18A:
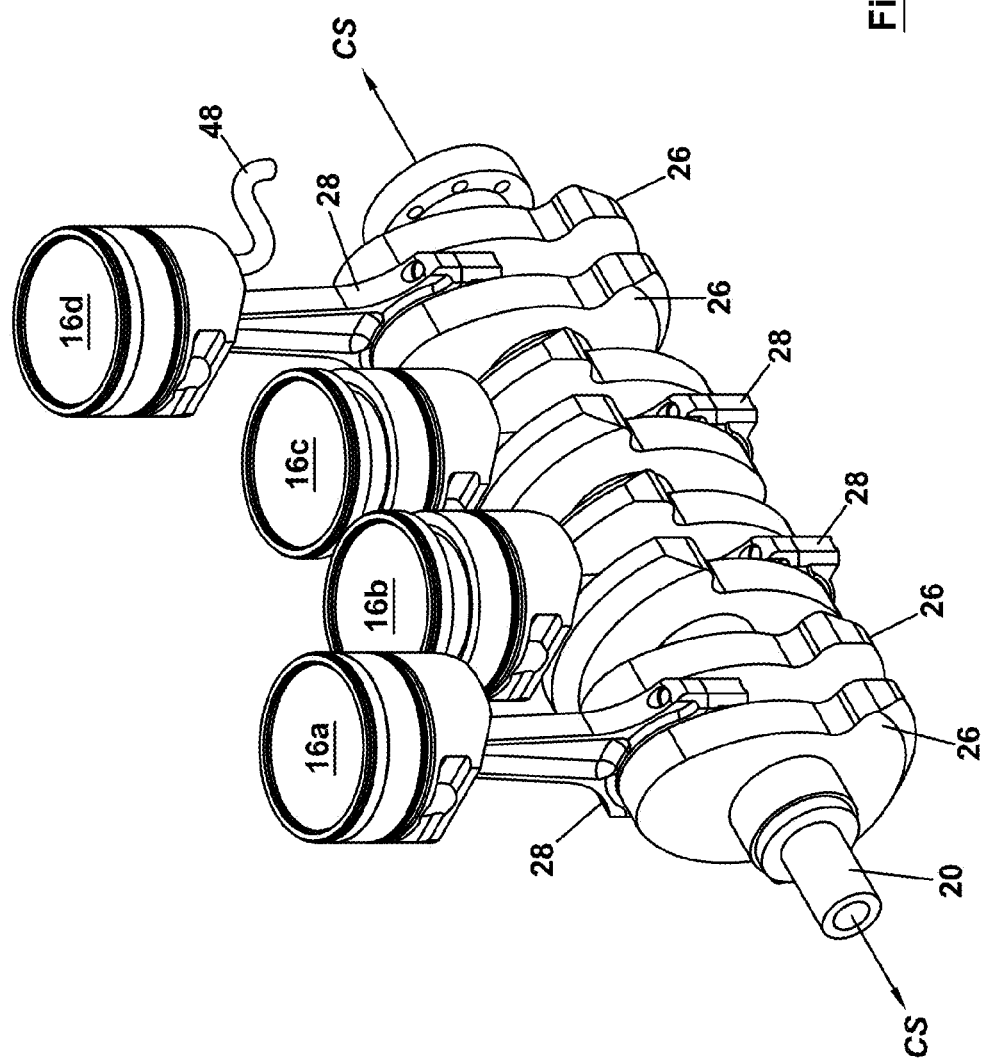
FIG. 18A is a schematic partial perspective view of an exemplary portion of the exemplary embodiment shown in FIG. 16.
Figure 18B:
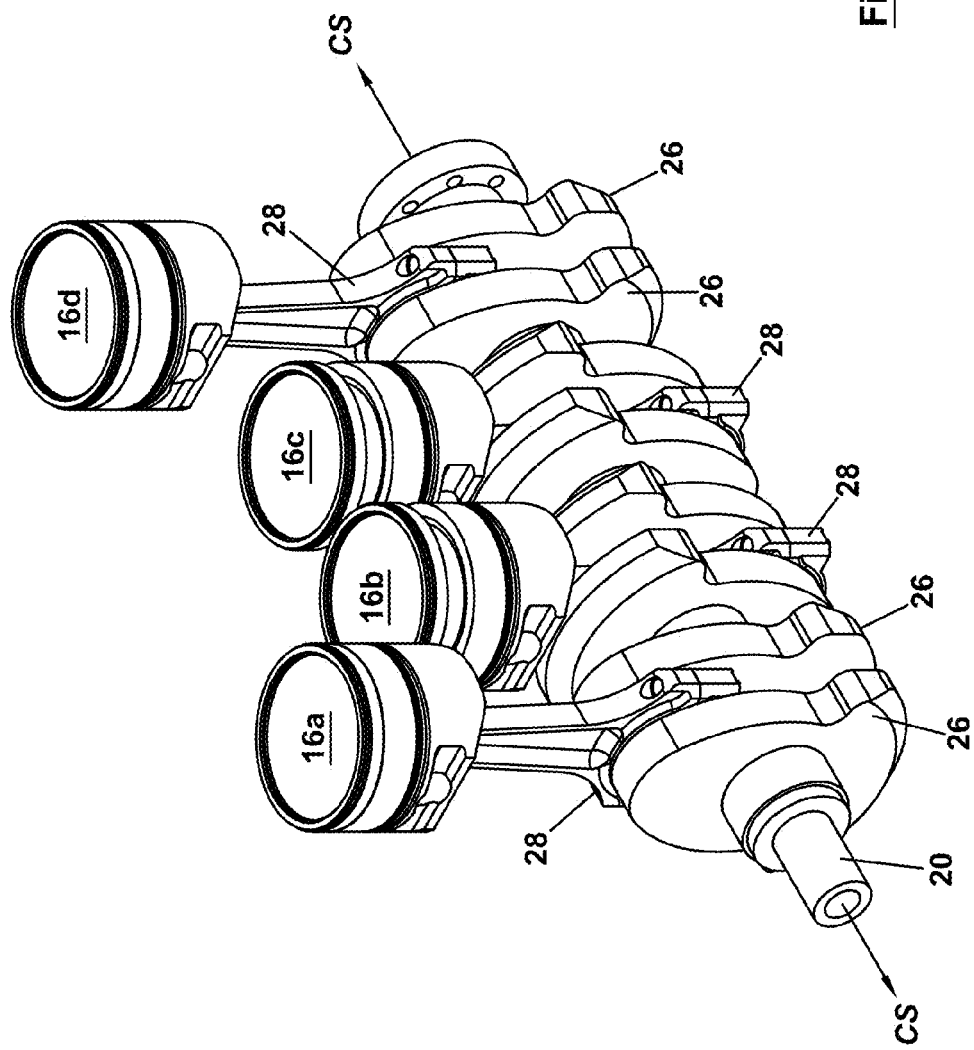
FIG. 18B is a schematic partial perspective view of an exemplary portion of the exemplary embodiment shown in FIG. 16.

As shown in FIGS. 17, 18A, and 18B, exemplary engine 10 includes pistons 16 corresponding to cylinders 14, for example, four pistons 16a, 16b, 16c, and 16d (see FIGS. 18A and 18B). As shown in FIG. 2, pistons 16a and 16d are positioned in the upper end (i.e., "upper" being relative to the orientation of engine 10 shown in FIG. 17) of cylinders 14a and 14d, respectively, while pistons 16b and 16c are not visible in FIG. 17 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Figure 19A:
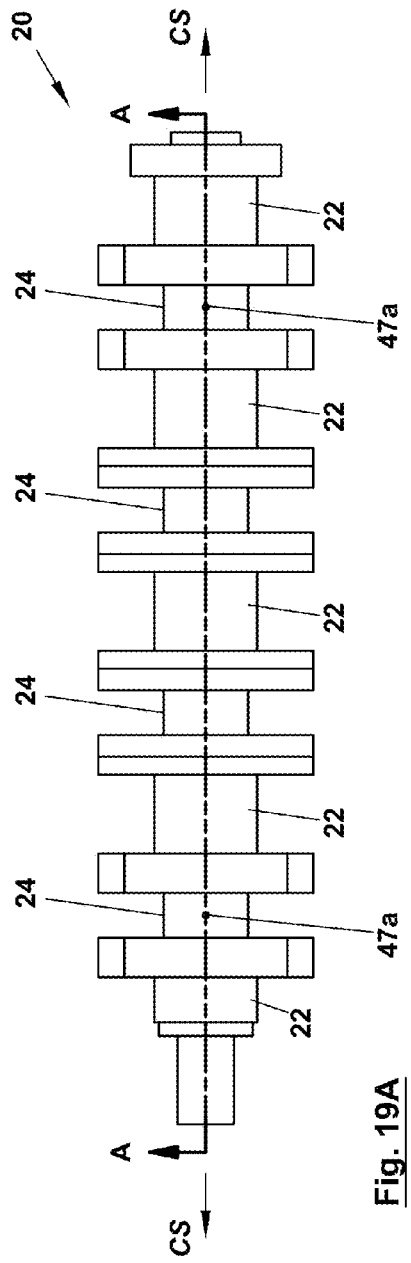
FIG. 19A is a schematic top view of an exemplary embodiment of a crankshaft for the exemplary embodiment shown in FIG. 16.
Figure 19B:
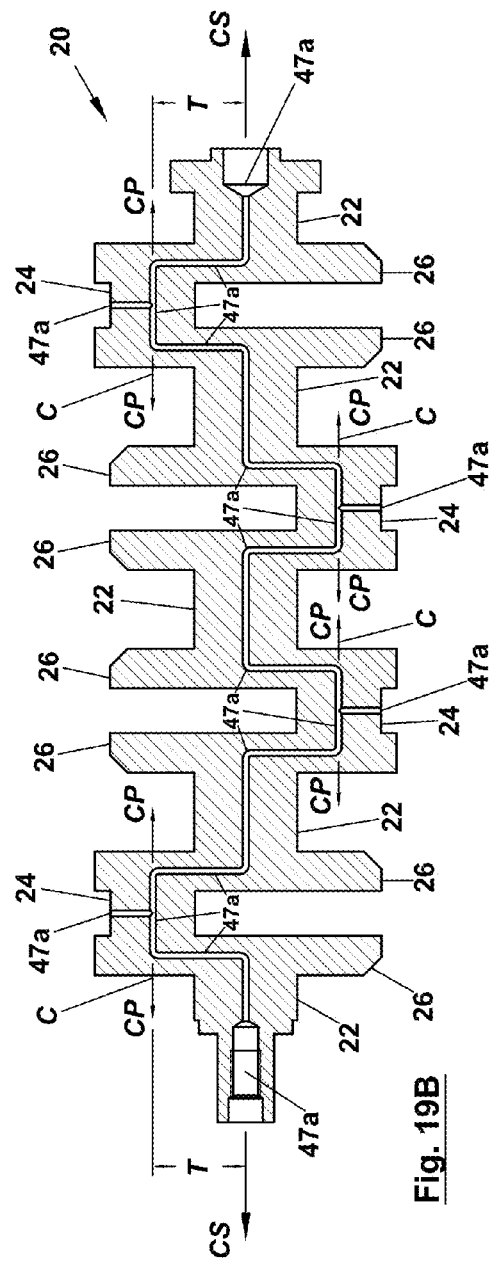
FIG. 19B is a schematic side section view the exemplary crankshaft shown in FIG. 19A.
Figure 22:
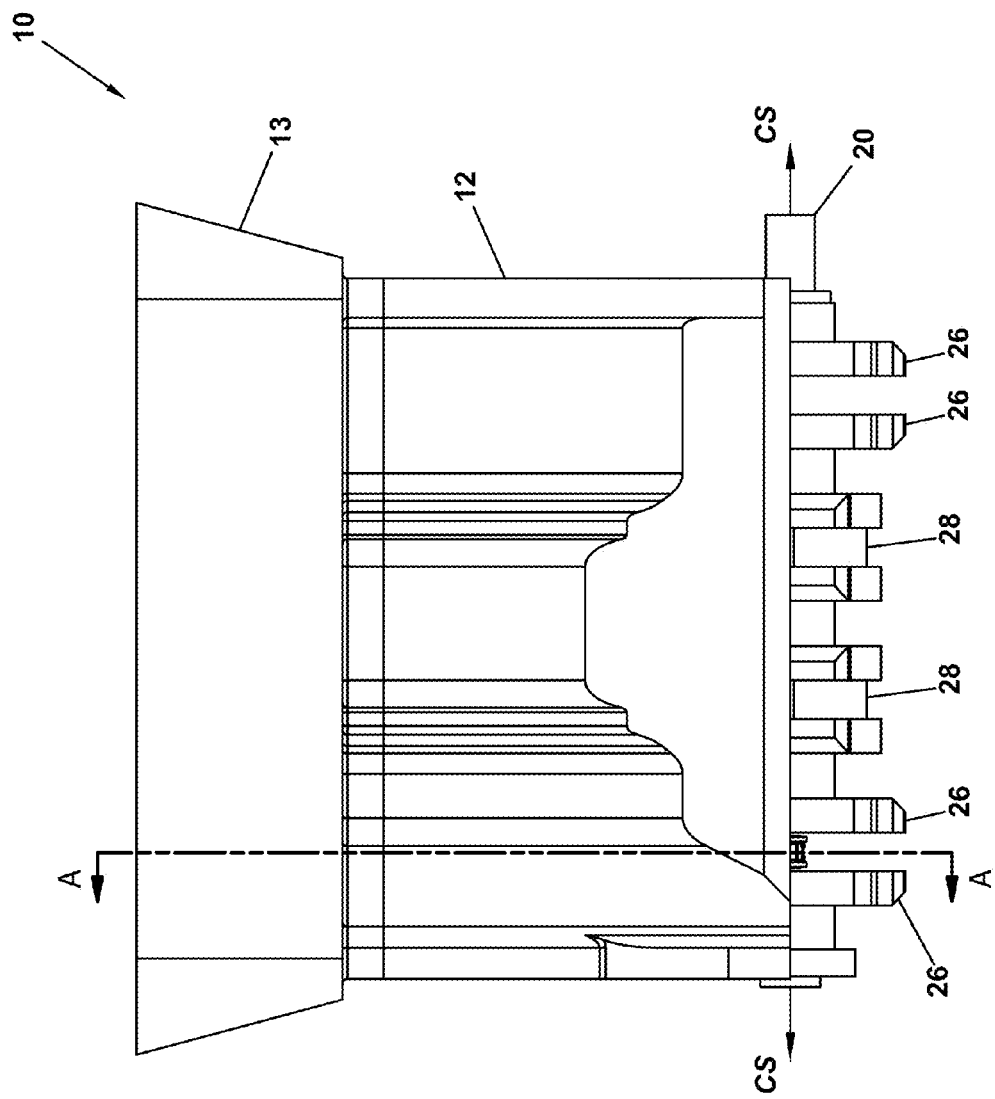
FIG. 22 is a schematic side view of the exemplary embodiment shown in FIG. 16.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIGS. 19A and 19B, crankshaft 20 defines a number of journals 22 corresponding to the number of bearings defined by cylinder block 12, and journals 22 are received by bearings, such that crankshaft 20 may rotate about longitudinal axis CS.

Exemplary crankshaft 20 (see FIGS. 19A and 19B) also defines a number of crankpins 24 corresponding to the number of pistons 16. Crankpins 24 are circular in cross section, and the respective circular cross-sections define a center C (see, e.g., FIG. 19B), which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T (see FIG. 19B) from the longitudinal axis CS of crankshaft 20. Crankshaft 20 may also include a number of counterbalance weights 26 for providing (or improving) rotational balance of crankshaft 20 when assembled with pistons 14 and connecting rods.

Referring to FIGS. 18A and 18B, for example, pistons 16 are operably coupled to crankpins 24 via a number of connecting rods 28 corresponding to the number of pistons 16. In particular, exemplary connecting rods 28 (see, e.g., FIGS. 20A and 20B) include a proximal end 30 having a first aperture 32 configured to receive crankpin 24, and a distal end 34 having a second aperture 36 for operably coupling connecting rod 28 to piston 16 via, for example, a pin 38 extending through a piston aperture 37 configured to receive pin 38.

According to the exemplary engine 10 shown in FIGS. 16-30, exemplary piston 16 is configured to have a variable length L between the center of piston aperture 37 and an upper surface 45 (e.g., at the center) of piston 16. In particular, the length L may be selectively altered via, for example, hydraulic operation. For example, exemplary piston 16 includes a hydraulic cylinder 40 including a cylinder portion 42 and a piston portion 44. In the example shown in FIGS. 20A and 20B, cylinder portion 42 includes piston aperture 37 for receiving pin 38 for coupling cylinder portion 42 to connecting rod 28 via pin 38, and piston portion 44 defines upper surface 45 of piston 16 having a geometric center (e.g., a geometric center of the cross-section of piston 16). Cylinder portion 42 and piston portion 44 define a fluid receiving chamber 46 (see FIG. 24).

By selectively supplying fluid (e.g., hydraulic fluid such as oil) to fluid receiving chamber 46, the length L associated with piston 16 may be selectively varied. For example, as shown in FIG. 18A, a fluid line 48 is operably coupled to fluid receiving chamber 46 to provide flow communication between fluid chamber 46 and a fluid circuit 50 (see FIGS.

21A and 21B). (Fluid line 48 is shown in FIG. 18A in association with only piston 16d for the sake of clarity. However, additional fluid lines 48 would normally be associated with each piston 16 of engine 10.) Fluid line 48 may be, for example, flexible high-pressure tubing known to those skilled in the art.

According to some embodiments, hydraulic cylinder 40 may be a single-acting cylinder (i.e., a hydraulic cylinder, which receives pressurized fluid in only a single fluid receiving chamber) configured such that fluid may be supplied under pressure to fluid receiving chamber 46, depending on the desired operation of hydraulic cylinder 40. According to some embodiments, fluid may be supplied to hydraulic cylinder 40 under pressure via one or more fluid passages in one or more of crankshaft 20, crankpin 24, and connecting rod 28. For example, as shown in FIG. 19B, exemplary crankshaft 20 includes fluid passages 47a, which may be configured to supply pressurized fluid to the surface of crankpins 24, which may, in turn, supply pressurized fluid to connecting rods 28. Fluid may be supplied to fluid passage 47a of crankshaft 20 via fluid line 48. Exemplary passages 47a may be configured in crankpins 24 such that fluid is supplied to connecting rods 28 based on the relative radial position of first aperture 32 with respect to crankpin 24, and then on to pistons 16 via passages providing flow communication between passages in connecting rod 28 and piston 16. (See, e.g., FIGS. 51A and 51B, which show an example of how fluid passages 47a-47c supply fluid from fluid circuit 50 to fluid passages in crankshaft 20, crankpin 24, and connecting rod 28. Fluid supplied via a passage in connecting rod 28 could be used to supply fluid to chamber 46 of piston 16 shown in FIGS. 23-30).

Referring to FIGS. 21A and 21B, exemplary engine 10 shown in FIGS. 16-30 includes a fluid circuit 50 for supplying and receiving hydraulic fluid to and from hydraulic cylinder 40 of piston 16. For example, as shown in FIG. 21A, exemplary fluid circuit 50 uses oil or other suitable lubricant for lubricating engine 10 as a source of fluid for operating hydraulic cylinder 40. For example, engine 10 includes a sump 52 for containing oil and a first oil pump 54 in flow communication with sump 52 for distributing the lubricant throughout engine 10. Exemplary fluid circuit 50 also includes a second oil pump 56 (e.g., a high-pressure oil pump of either fixed or variable capacity) in flow communication with sump 52 for supplying fluid to hydraulic cylinder 40 under pressure via fluid line 48, as explained in more detail below. Exemplary fluid circuit 50 further includes one or more valves 58 to control the flow of fluid to hydraulic cylinder 40. For example, exemplary hydraulic cylinder 40 may be a single-acting cylinder, and fluid circuit 50 may include a single valve 58. Valve 58 may be any suitable valves known to those skilled in the art, such as, for example, flow control valves, directional control valves, proportional directional control valves, and/or electro-hydraulic servo valves.

Exemplary fluid circuit 50 also includes a controller 60 configured to control operation of pump 56 and/or valve 58. Exemplary controller 60 may be a microprocessor-based controller, such as, for example, a programmable or pre-programmed controller that operates digitally according to logic and/or algorithms stored either within controller 60 or downloaded remotely via physical connection and/or wireless communication link. Exemplary controller 60 may be integrated as part of, for example, an engine control module (not shown). Alternatively, exemplary controller 60 may be separate from an engine control module and/or may be operated in concert with an engine control module. Exemplary controller 60 may be configured (e.g., provided with programming) to provide control signals to pump 56 and/or valve 58, such that hydraulic cylinder 40 of piston 16 is operated in a manner described below.

Exemplary fluid circuit 50 shown in FIG. 21A also includes a fluid cooler 62 configured to cool the oil in fluid circuit 50. Fluid cooler 62 may be any type of fluid cooler known to those skilled in the art, and fluid cooler 62 may be either a part of the customary cooling system of engine 10 or it may be separate from the customary cooling system of engine 10. Further, exemplary fluid circuit 50 includes a thermostat or other temperature regulating device 64 for generally maintaining the temperature of the fluid in a desired operating range once the fluid temperature reaches the desired operating temperature. According to some embodiments, temperature regulating device 64 may be controlled via controller 60.

Referring to FIG. 21B, fluid circuit 50 does not use the lubricant for lubricating engine 10 as a source of fluid for operating hydraulic cylinder 40. Rather, exemplary fluid circuit shown in FIG. 21B is self-contained and uses fluid that remains separate from the lubricant of engine 10. As shown in FIG. 21B, fluid circuit 50 includes a sump 54b that is not in flow communication with sump 52. Exemplary fluid circuit 50 shown in FIG. 21B may include one or more of the exemplary attributes of the exemplary fluid circuit shown in FIG. 21A.

During operation of exemplary engine 10, as crankshaft 20 rotates, crankpins 24 revolve around crankshaft longitudinal axis CS, such that crankpin centers C define a circular path having a radius defined by the distance T defined along a radial axis RA (see FIGS. 23-30) extending between the longitudinal axis CS of crankshaft 20 and the longitudinal axis CP of the respective crankpins 24. Thus, first apertures 32 of proximal end 30 of connecting rod 28, which are rotatably coupled with respect to crankpins 24, also revolve about the crankshaft axis CS. Distal end 34 of connecting rod 28 is constrained to move in a reciprocating and linear manner due to being operably coupled to piston 16, which is likewise constrained to move in a reciprocating and linear manner within respective cylinder 14 defined by cylinder block 12. As a result, as crankshaft 20 rotates, pistons 16 reciprocate within respective cylinders 14, defining a piston stroke generally corresponding to twice the distance T (see FIG. 23) between the crankpin axis CP and the crankshaft axis CS (as affected according to the exemplary operation described below).

During operation of a conventional engine, a piston reciprocates within the cylinder, such that during a power stroke of the internal combustion engine, combustion of an air/fuel mixture within a combustion chamber defined by the piston, the cylinder, and cylinder-head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process in a conventional internal combustion engine may be less than desired.

Exemplary engine 10 is configured to employ a strategy that delays any substantial movement of piston 16 toward crankshaft 20 during the power stroke, until crankshaft 20 has rotated to point at which there is a more effective moment arm between connecting rod axis CR and radial axis RA extending between crankshaft axis CS and a respective crankpin axis CP. The timing of initiation of combustion may be correspondingly delayed. As a result, a greater amount of the energy of the combustion event may be captured because the maximum force acting on piston 16 coincides with a greater moment arm, thereby resulting in more torque at crankshaft 20 during the power stroke.

FIGS. 23-30 schematically illustrate exemplary operation of engine 10 having exemplary piston 16, which serves to delay the upper surface of piston 16's travel at the beginning of the power stroke of exemplary engine 10. In particular, by selectively activating hydraulic cylinder 40 of piston 16, such that the length L between the center of piston aperture 37 and an upper surface 45 of piston 16 (e.g., at its cross-sectional center) may be selectively varied. Such an exemplary embodiment renders it possible to effectively hold the upper surface of piston 16 in cylinder 14 at a substantially fixed position for a short period of time, even as crankpin 24 continues to revolve around crankshaft 20's axis CS as crankshaft 20 rotates. As a result, it is possible to hold the upper surface of piston 16 at the point of highest compression in the combustion chamber while crankpin 24 revolves to a position, which results in an increased moment arm defined by the radial axis RA extending between the center of crankshaft 20 and the center C of crankpin 24 and the axis CR of connecting rod 28. This results in relatively more torque being applied to crankshaft 20 as combustion begins with the upper surface of piston 16 still remaining at a point farthest from the center of crankshaft 20 (i.e., at the end of its upward stroke as shown). In this exemplary manner, the delaying strategy outlined below may be implemented.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

Figure 23:
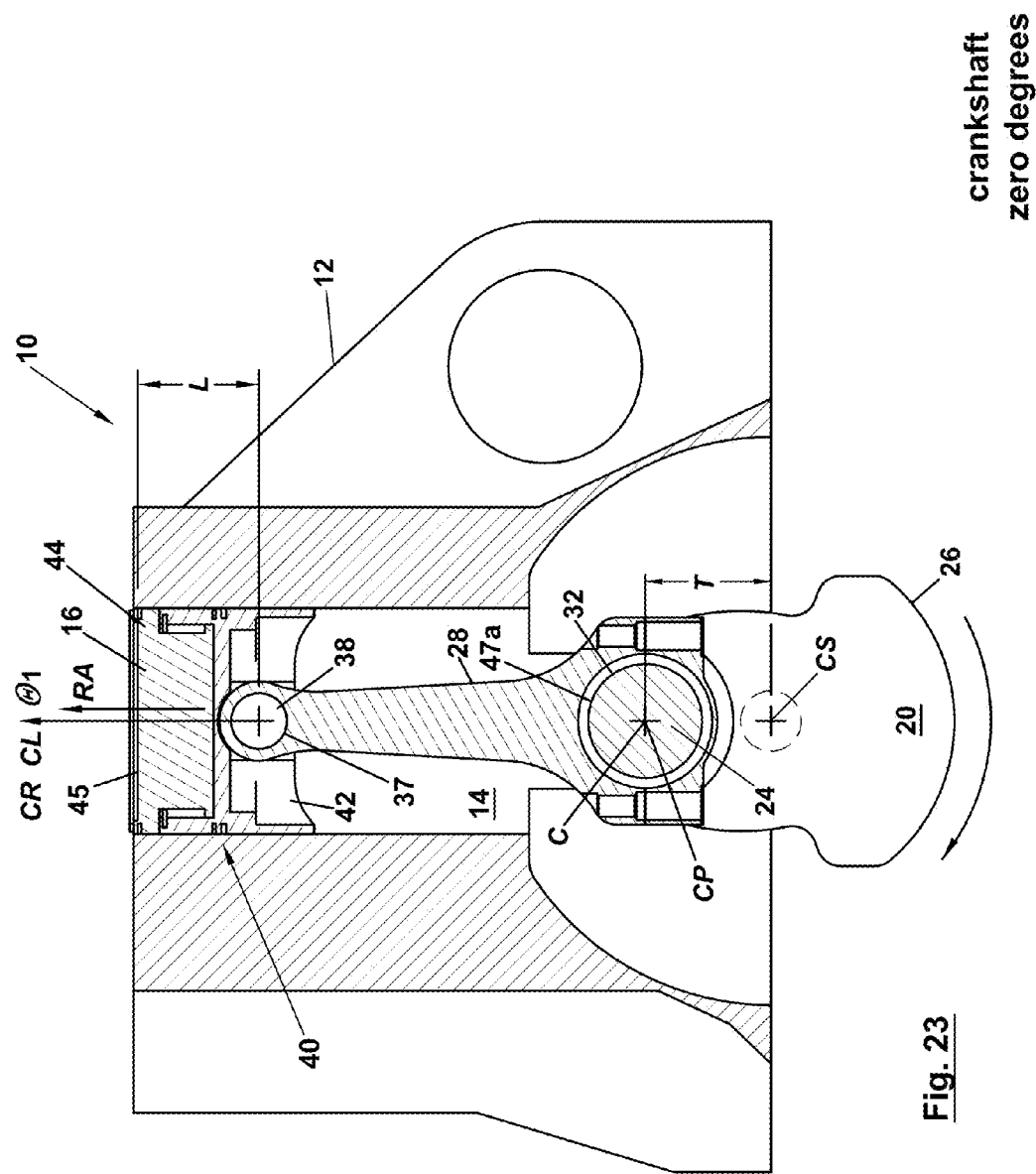
FIG. 23 is a schematic end section view of the exemplary embodiment shown in FIG. 16 with the radial axis angle of the crankshaft shown at 0 degrees.

For example, as shown in FIG. 23, crankshaft 20 is oriented such that radial axis RA defined by the center of crankshaft 20 and the center of crankpin 24 is oriented at zero degrees, which corresponds generally to a first stroke termination angle $\theta_1$, which generally coincides with the end of the compression stroke of exemplary engine 10. Thus, with radial axis RA in this orientation, piston 16 is at its upper position within cylinder 14, and upper surface 45 of piston 16 is at a point of maximum distance from the axis CS of crankshaft 20.

As shown in FIG. 23, during operation of engine 10 crankshaft 20 rotates in the clockwise direction. Hydraulic cylinder 40 is in a configuration such that piston 16 is at the top of its stroke while the radial axis RA of crankshaft 20 is substantially aligned with the longitudinal axis CR of connecting rod 28. In particular, piston portion 44 of hydraulic cylinder 40 is in a position relative to cylinder portion 42 such that piston 16 is at the top (or end) of its stroke.

Figure 24:
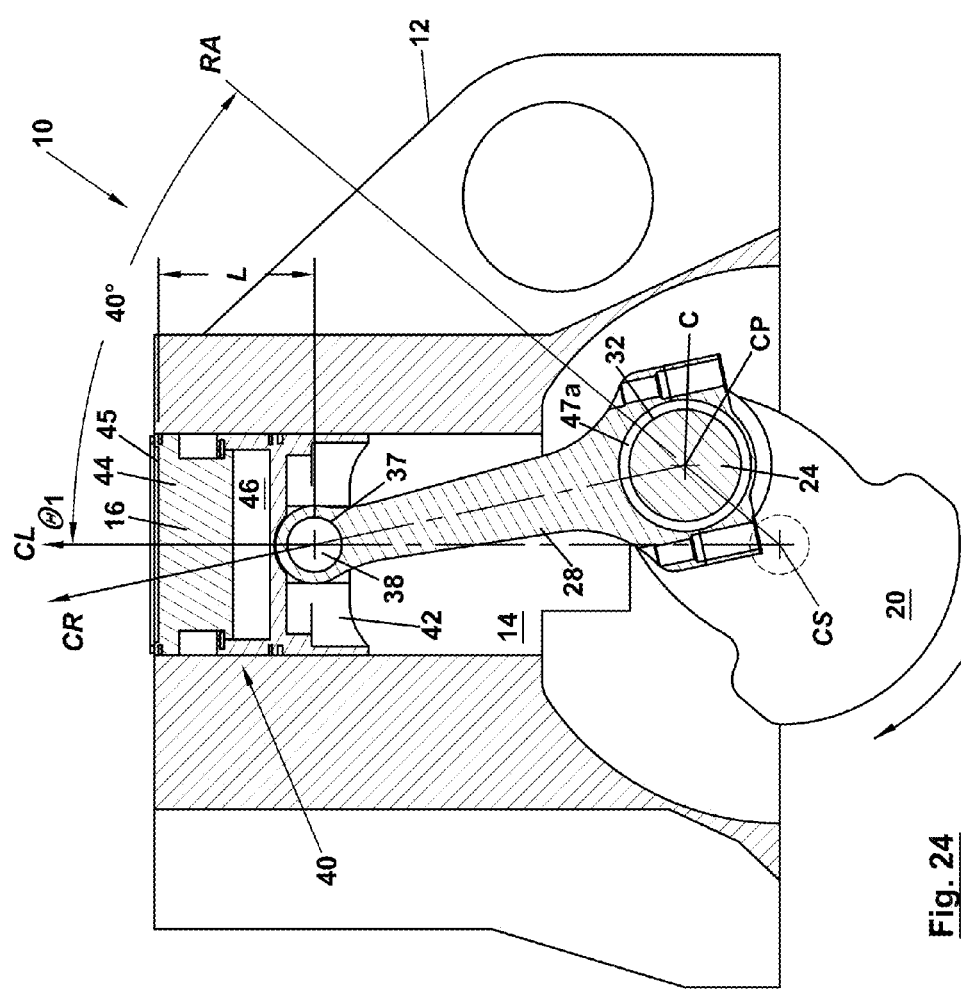
FIG. 24 is a schematic end section view of the exemplary embodiment shown in FIG. 16 with the radial axis angle of the crankshaft shown at 40 degrees.

FIG. 24 shows crankshaft 20 in an orientation where radial axis RA has rotated 40 degrees past first stroke termination angle $\theta_1$. In a conventional engine, piston 16 would have traveled a significant distance toward crankshaft axis CS. In contrast, according to exemplary engine 10, the upper surface of piston 16 has not yet started its downward travel toward crankshaft axis CS. Instead, piston portion 44 of hydraulic cylinder 40 has increased its extension from cylinder portion 42, thus increasing the length L of the distance between the center of piston aperture 37 and the upper surface of piston 16. As a result of the increase in length L, the upper surface of piston 16 has not traveled down cylinder 14 (as shown), even though crankpin 24 has rotated clockwise relative to the center C of crankshaft 20, such that the center of crankpin 24 is farther from the top of cylinder 14. (See Table II below showing an exemplary relationship for exemplary engine 10 between radial axis RA's angle and the displacement of the upper surface of piston 16 relative to the first stroke termination angle $\theta_1$.)

TABLE II

RADIAL AXIS RA ANGLE VS. PISTON DISPLACEMENT
RELATIVE TO ZERO DEGREES FOR FIGS. 16-30

| Crank Angle | Piston Depth |
|---|---|
| 0 | 0.000 |
| 4 | 0.000 |
| 8 | 0.000 |
| 12 | 0.000 |
| 16 | 0.000 |
| 20 | 0.000 |
| 24 | 0.000 |
| 28 | 0.000 |
| 32 | 0.000 |
| 36 | 0.000 |
| 40 | 0.000 |
| 44 | 0.113 |
| 48 | 0.233 |
| 52 | 0.360 |
| 56 | 0.492 |
| 60 | 0.628 |
| 64 | 0.767 |
| 68 | 0.908 |
| 72 | 1.051 |
| 76 | 1.194 |
| 80 | 1.337 |
| 84 | 1.478 |
| 88 | 1.617 |
| 92 | 1.753 |
| 96 | 1.885 |
| 100 | 2.014 |
| 104 | 2.137 |
| 108 | 2.256 |
| 112 | 2.369 |
| 116 | 2.476 |

TABLE II-continued

RADIAL AXIS RA ANGLE VS. PISTON DISPLACEMENT
RELATIVE TO ZERO DEGREES FOR FIGS. 16-30

| Crank Angle | Piston Depth |
|---|---|
| 120 | 2.577 |
| 124 | 2.671 |
| 128 | 2.759 |
| 132 | 2.841 |
| 136 | 2.916 |
| 140 | 2.985 |
| 144 | 3.047 |
| 148 | 3.102 |
| 152 | 3.150 |
| 156 | 3.192 |
| 160 | 3.228 |
| 164 | 3.257 |
| 168 | 3.279 |
| 172 | 3.295 |
| 176 | 3.305 |
| 180 | 3.308 |

The change in relative position between piston portion 44 and cylinder portion 42 of hydraulic cylinder may be achieved by supplying hydraulic fluid under pressure to chamber 46 of hydraulic cylinder 40 in a controlled manner. This may be accomplished, for example, by one of the exemplary fluid circuits 50 shown in FIGS. 21A and 21B. For example, controller 60 sends one or more signals to valve 58 and/or pump 56, such that hydraulic fluid is supplied to chamber 46 in a controlled manner, such that piston portion 44 of hydraulic cylinder 40 extends further out of cylinder portion 42, thereby increasing the length L, as shown in FIG. 24. Such exemplary operation results in an effective delay of the initiation of the power stroke of piston 16.

Exemplary controller 60 may be configured to receive signals that provide it with an indication regarding the radial position of radial axis RA. Controller 60 may be implemented or programmed to determine, based on such signals, timing for extending and/or retracting piston portion 44 of hydraulic cylinder 40 relative to cylinder portion 42 of hydraulic cylinder 40 according to the exemplary manner described herein. For example, upon receipt of signals indicating the radial position of radial axis RA, controller 60 may electronically perform an algorithm that results in sending signals to valve 58 and/or pump 56, such that they are operated in a manner resulting in the exemplary operation of hydraulic cylinder 40 described herein.

Figure 25:
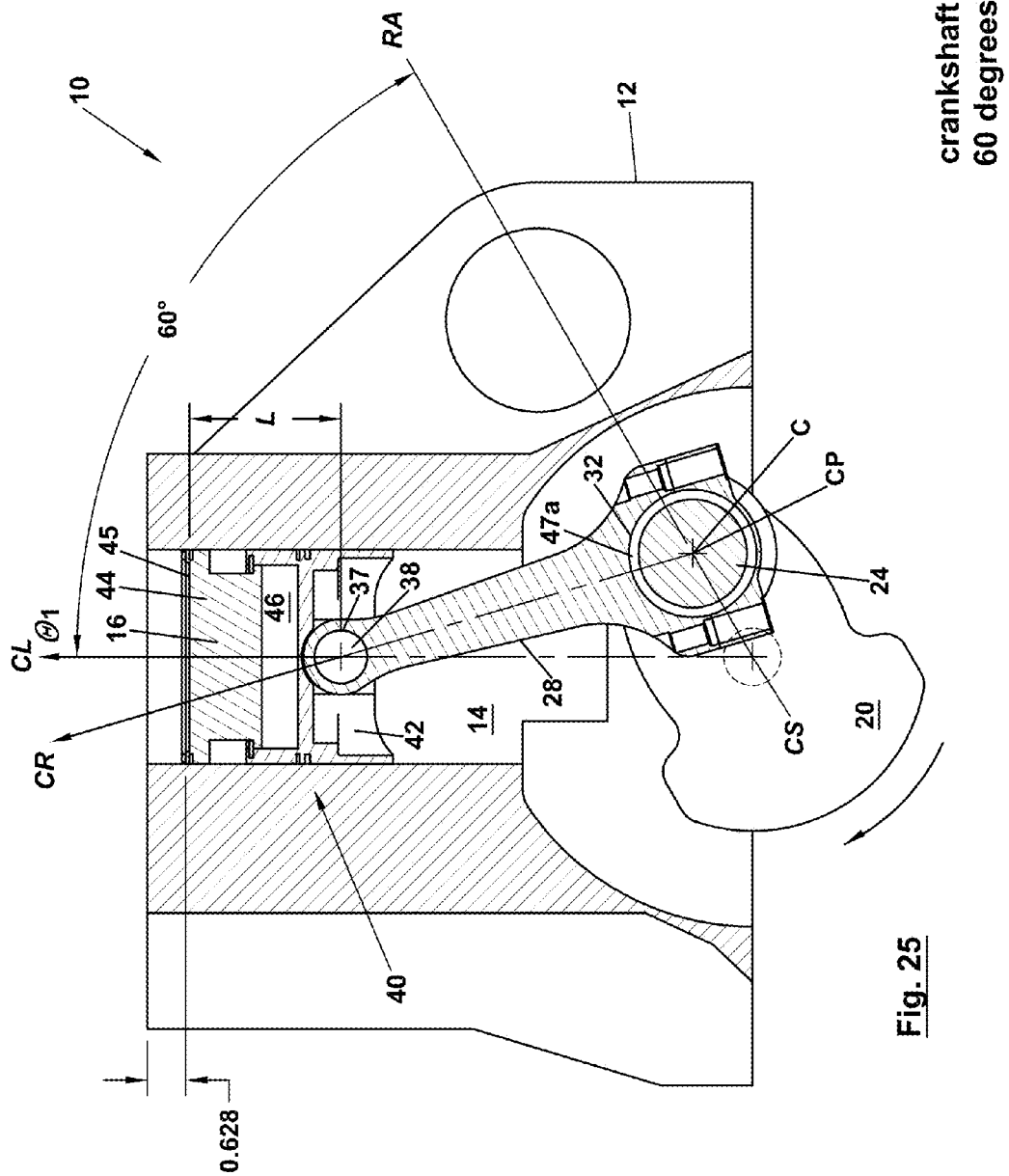
FIG. 25 is a schematic end section view of the exemplary embodiment shown in FIG. 16 with the radial axis angle of the crankshaft shown at 60 degrees.

As shown in FIG. 25, radial axis RA has rotated 60 degrees from first stroke termination angle $\theta_1$. Between 40 and 60 degrees past first stroke termination angle $\theta_1$ (e.g., 59 degrees, 55 degrees, 50 degrees, 45 degrees, or 41 degrees), piston portion 44 ceases to extend farther out of cylinder portion 42 of hydraulic cylinder 40, and upper surface 45 of piston 16 begins to travel down cylinder 14 with the remainder of piston 16 (i.e., the portion of piston 16 corresponding to cylinder portion 42). Timing of combustion in cylinder 14 may be initiated to generally coincide with the beginning of downward travel of upper surface 45 of piston 16. According to some exemplary embodiments, the radial position at which the piston portion 44 ceases to extend farther out of cylinder portion 42 may be adjusted during operation according to predetermined criteria in order to tailor operation of engine 10. In the exemplary embodiment shown in FIG. 25, when the radial axis RA has rotated to 60 degrees past the first stroke termination angle $\theta_1$, the upper portion of piston 16 has traveled 0.628 inch down cylinder 14 relative to its point of maximum extension from crankshaft axis CR.

Figure 26:
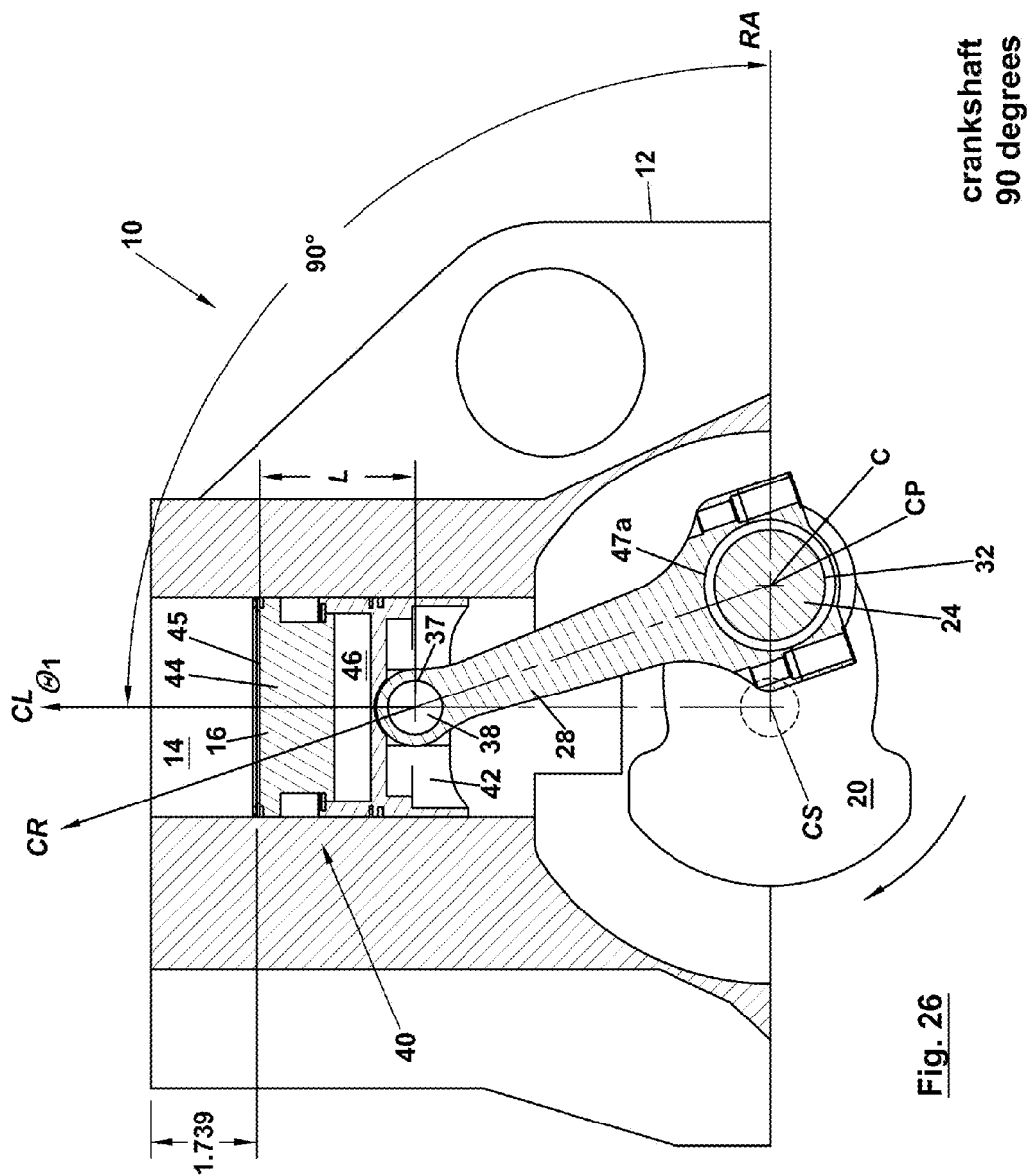
FIG. 26 is a schematic end section view of the exemplary embodiment shown in FIG. 16 with the radial axis angle of the crankshaft shown at 90 degrees.

Referring to FIG. 26, radial axis RA has rotated 90 degrees past first stroke termination angle $\theta_1$. Piston portion 44 and cylinder portion 42 of hydraulic cylinder 40 have maintained the relative positions shown in FIG. 25. Thus, the length L between the center of piston aperture 37 and upper surface 45 of piston 16 has remained the same as shown in FIG. 25. As a result, piston 16 has continued to travel down cylinder 14, such that upper surface 45 of piston 16 has traveled 1.739 inches down cylinder 14 relative to its point of maximum extension from crankshaft axis CR. Thus, whereas during the first 40 degrees of rotation of radial axis RA past first stroke termination angle $\theta_1$, upper surface 45 of piston 16 did not travel downward, during the next 50 degrees of rotation of radial axis RA, upper surface 45 has traveled 1.1110 inches down cylinder 14.

Figure 27:
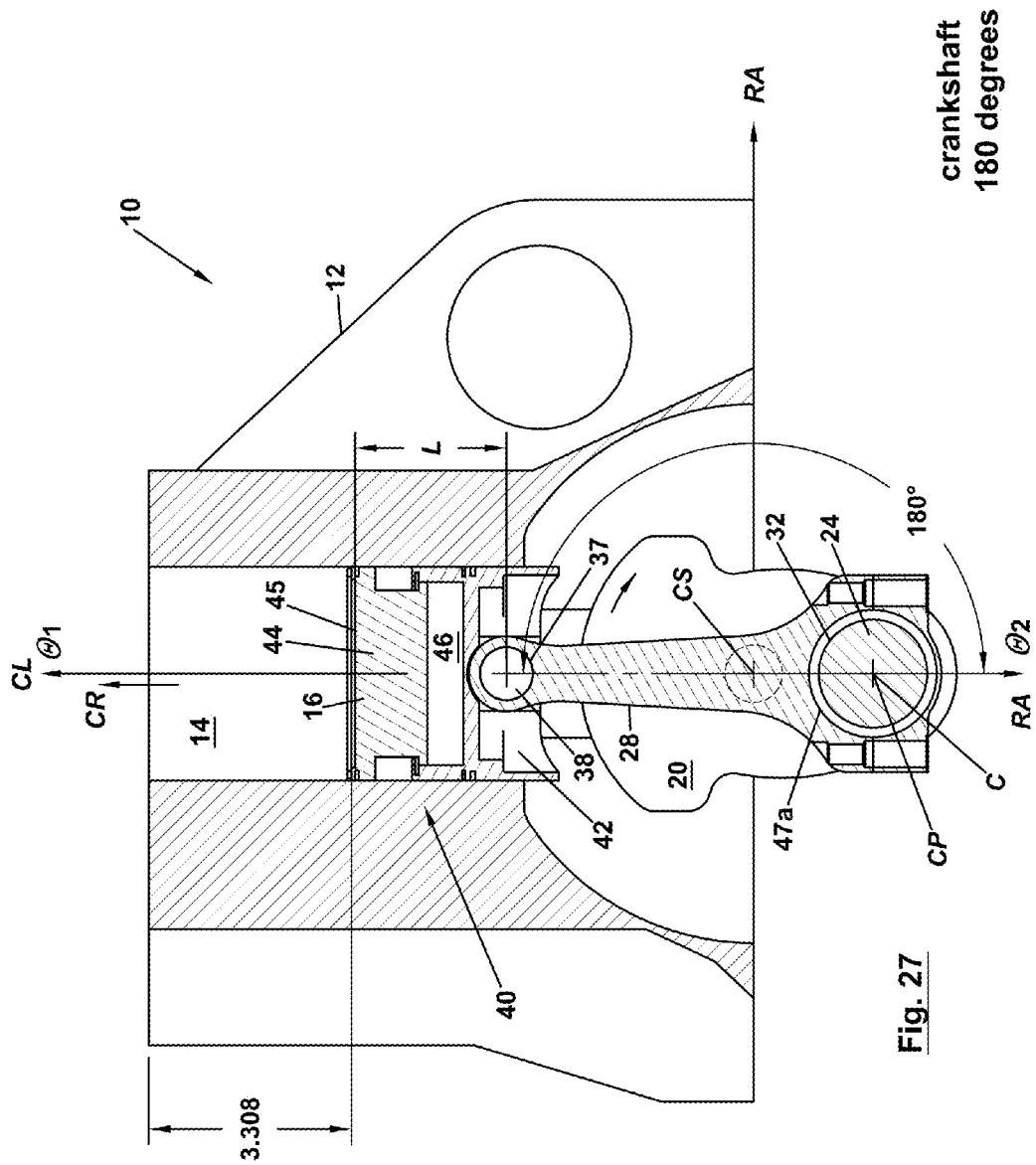
FIG. 27 is a schematic end section view of the exemplary embodiment shown in FIG. 16 with the radial axis angle of the crankshaft shown at 180 degrees.

Referring to FIG. 27, radial axis RA has rotated 180 degrees past first stroke termination angle $\theta_1$ (i.e., at a second stroke termination angle $\theta_2$, which corresponds generally to the end of the power stroke). Piston portion 44 and cylinder portion 42 of hydraulic cylinder 40 have maintained the relative positions shown in FIGS. 25 and 26. Thus, the length L between the center of piston aperture 37 and upper surface 45 of piston 16 has remained the same as shown in FIGS. 25 and 26. As a result, upper surface 45 of piston 16 has continued to travel down cylinder 14, such that upper surface 45 has traveled 3.308 inches down cylinder 14 relative to its point of maximum extension from crankshaft axis CR.

Figure 28:
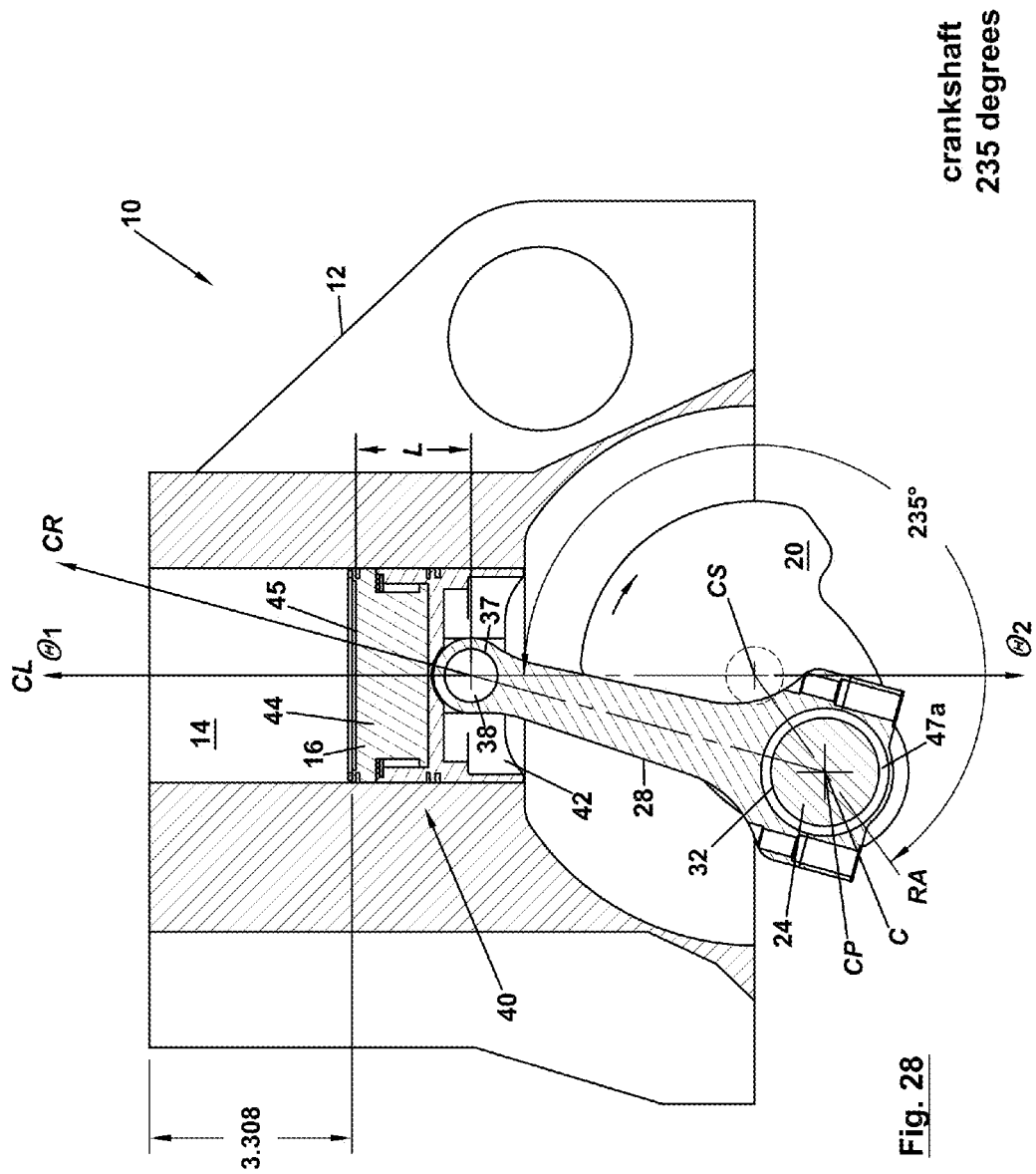
FIG. 28 is a schematic end section view of the exemplary embodiment shown in FIG. 16 with the radial axis angle of the crankshaft shown at 235 degrees.

Referring to FIG. 28, radial axis RA has rotated 230 degrees past first stroke termination angle $\theta_1$. Thus, crankpin 24's center C has reversed its vertical direction of travel, such that it is approaching cylinder 14. However, upper surface 45 of piston 16 has not started to travel up cylinder 14 because the length L has shortened to offset upward movement of crankpin 24's center C. The shortening of the length L may occur by operation of fluid circuit 50, which permits pressurized hydraulic fluid to drain from chamber 46 of hydraulic cylinder 40, thereby causing piston portion 44 of hydraulic cylinder 40 to retract into cylinder portion 42. The shortening of the length L may be accomplished passively due to inherent resistance within cylinder 14 to piston 16's travel back up cylinder 14. According to some embodiments, shortening of the length L may be completed when the radial axis RA reaches a radial position of 360 degrees (see, e.g., FIGS. 20A, 20B, and 30), and upper surface 45 of piston 16 abuts a damper 70 associated with cylinder head 13, as explained in more detail with respect to FIG. 30. As a result of the shortening of the length L, upper surface 45 of piston 16 may remain in substantially the same position within cylinder 14 as the position shown in FIG. 27 (e.g., at 3.308 inches from its point of maximum extension from crankshaft axis CR) when the radial position of the radial axis RA was at the second stroke termination angle $\theta_2$ (i.e., at 180 degrees past first stroke termination angle $\theta_1$).

Figure 29:
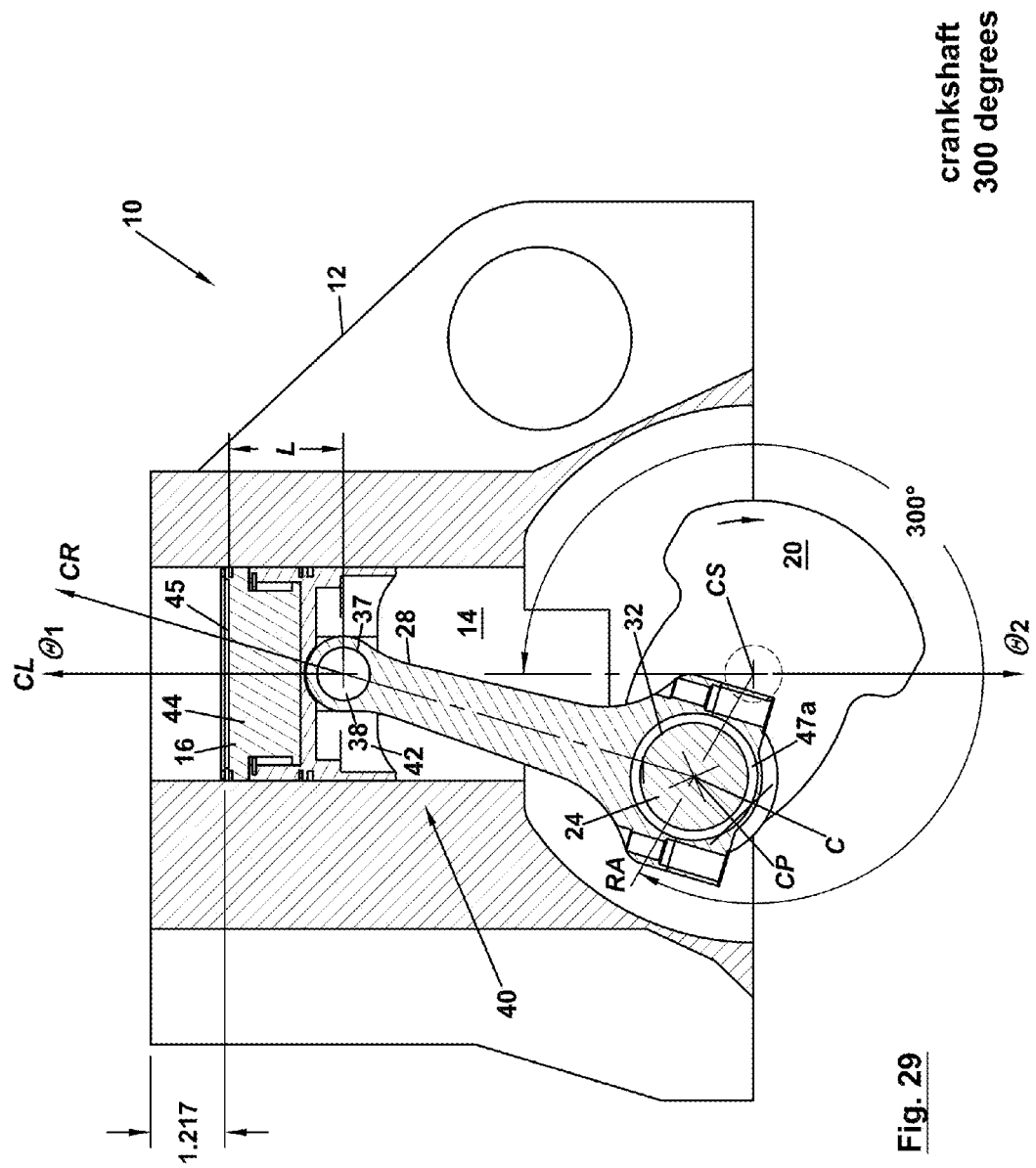
FIG. 29 is a schematic end section view of the exemplary embodiment shown in FIG. 16 with the radial axis angle of the crankshaft shown at 300 degrees.

Referring to FIG. 29, radial axis RA has rotated 300 degrees past first stroke termination angle $\theta_1$. In the exemplary embodiment shown, piston portion 44 and cylinder portion 42 of hydraulic cylinder 40 have maintained the relative positions shown in FIG. 28. Thus, the length L has remained the same as shown in FIG. 28. As a result, upper surface 45 of piston 16 has continued to travel up cylinder 14 with the remainder of piston 16, such that upper surface 45 has traveled to a point 1.217 inches from the end of its point of maximum upward travel relative to crankshaft axis CR. Thus, whereas during the first 55 degrees of rotation of radial axis RA past the second stroke termination angle $\theta_2$, upper surface 45 of piston 16 did not travel upward, during the next 65 degrees of rotation of radial axis RA, upper surface 45 has traveled 2.091 inches up within cylinder 14.

Figure 30:
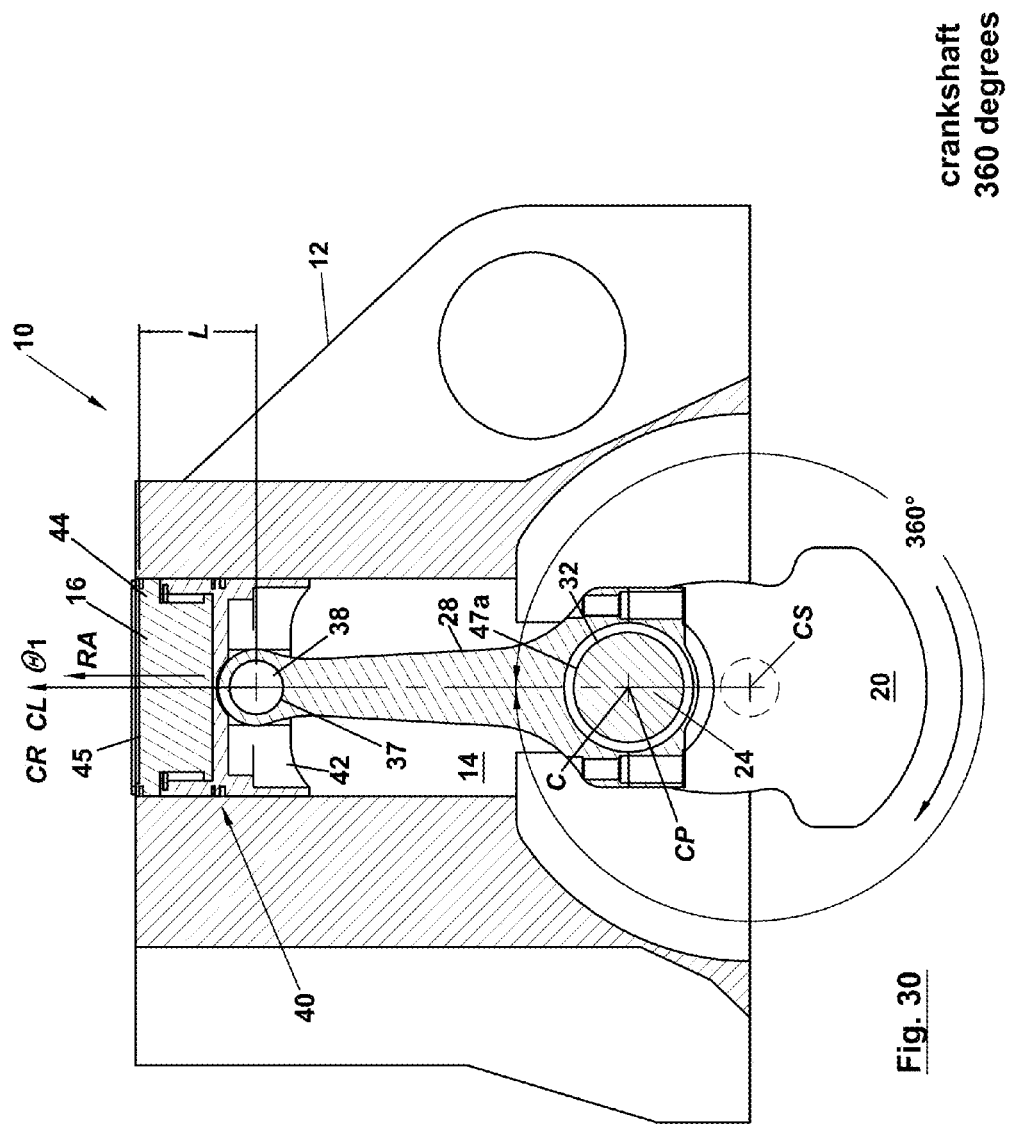
FIG. 30 is a schematic end section view of the exemplary embodiment shown in FIG. 16 with the radial axis angle of the crankshaft shown at 0/360 degrees.

Referring to FIG. 30, radial axis RA has rotated 360 degrees past the first stroke termination angle $\theta_1$, thus completing a full revolution such that radial axis RA is aligned with cylinder axis CL in the exemplary embodiment shown. Piston portion 44 and cylinder portion 42 of hydraulic cylinder 40 have maintained the relative positions shown in FIGS. 28 and 29. Thus, the length L between the center of piston aperture 37 and upper surface 45 of piston 16 has remained the same as shown in FIGS. 28 and 29. As a result, upper surface 45 has continued to travel up cylinder 14, such that upper surface 45 has traveled back to its point of maximum upward travel relative to crankshaft axis CR (i.e., to its upper position within cylinder 14).

As mentioned above, according to some embodiments, shortening of the length L may be completed as the radial axis RA approaches the radial position shown in FIG. 30, and upper surface 45 of piston 16 abuts a damper 70 associated with cylinder head 13, thereby compressing piston portion 44 of hydraulic cylinder 40 into cylinder portion 42. Referring to FIGS. 20A and 20B, cylinder head 13 may include damper 70, which make take the form of, for example, an internally-extending flange 72 formed of an energy absorbing structure. For example, flange 72 may be formed from an impact-resistant material, such as, for example, high-strength, impact-resistant tool steel, or any other suitable material known to those skilled in the art. Alternatively, or in addition, damper 70 may take the form of a shock absorber-type structure (not shown).

In this exemplary manner, the length L between the center of piston aperture 37 and upper surface 45 of piston 16 is variable, such that the distance between upper surface 45 and the center C of crankpin 24 (i.e., the effective stroke length) is variable. More specifically, the distance between first aperture 32 and upper surface 45 of piston 16 is variable (see, e.g., FIGS. 23-30), the variability of this distance being facilitated in the exemplary embodiment by virtue of controlled extension and retraction of piston portion 44 of hydraulic cylinder 40 relative to cylinder portion 42, which are part of piston 16. As radial axis RA rotates between first stroke termination angle $\theta_1$ and 180 degrees past first stroke termination angle $\theta_1$ (i.e., to second stroke termination angle $\theta_2$), the length L initially increases, thereby delaying initiation of the power stroke, for example, until radial axis RA reaches a point, for example, at least 40 degrees past first stroke termination angle $\theta_1$ in the exemplary embodiment shown. Thereafter, the length L remains substantially constant as radial axis RA continues to rotate toward an orientation 180 degrees past first stroke termination angle $\theta_1$ due to fluid within chamber 46. As the radial axis RA rotates between 180 and 360 degrees past first stroke termination angle $\theta_1$, the length L is reduced as piston portion 44 retracts into cylinder portion 42 of hydraulic cylinder 40, as fluid drains from chamber 46 of hydraulic cylinder 40.

According to some embodiments, the exemplary configuration and/or interaction can be tailored to achieve desired performance characteristics of exemplary engine 10, such as, for example, improved efficiency, improved power output, improved responsiveness, and/or improved torque. For example, the extension and retraction of piston portion 44 relative to cylinder portion 42 be controlled to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10. Timing of the initiation of combustion may be tailored to take advantage of the delayed stroke.

According to some embodiments, engine 10 may be configured to selectively operate in at least two modes, for example, a fixed-length mode and a variable-length mode. For example, in a first mode of operation (i.e., a fixed-length mode), hydraulic cylinder 40 may be operated such that the length L is fixed regardless of the radial position of radial axis RA. More specifically, hydraulic cylinder 40 may be operated such that the minimum length L is fixed such that there is substantially no delay in the downward travel of piston 16 as radial axis RA travels from first stroke termination angle $\theta_1$ to 90 degrees, resulting in operation similar to a conventional engine of corresponding configuration. Effectively fixing the length L may permit engine 10 to operate at relatively higher engine speeds when compared to operation in a mode in which the length L is varied as described above with reference to FIGS. 23-30. Thus, operating according to the fixed-length mode may be desirable when it is anticipated that the rotational speed of crankshaft 20 will be relatively high and/or it is desirable to operate engine 10 at a higher power output than would be achievable in variable-length mode.

According to a second mode of operation, a variable-length mode of operation, the length L may be varied, for example, as explained with respect to FIGS. 23-30 above. It may be desirable to operate engine 10 according to the variable-length mode of operation to achieve greater efficiency relative to the fixed-length mode of operation.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

FIGS. 31-47 schematically illustrate a third exemplary embodiment of engine 10. The exemplary embodiment shown in FIGS. 31-47 includes some features that are similar to the features of exemplary engine 10 shown in FIGS. 1-15. For example, similar to the exemplary engine 10 shown in FIGS. 1-15, exemplary engine 10 shown in FIGS. 31-47 includes a connecting rod configured to affect the length of the stroke of engine 10 via hydraulic operation. However, the exemplary engine 10 shown in FIGS. 31-47 does not require external control of fluid flow to the connecting rod. Rather, the fluid that hydraulically affects the length of the stroke of engine 10 is contained within the connecting rod. Thus, with respect to this embodiment, fluid is only supplied to the connecting rod in order to, for example, replenish the fluid contained in the connecting rod when, for example, the fluid is depleted (e.g., via leakage) during normal operation of exemplary engine 10.

Figure 31:
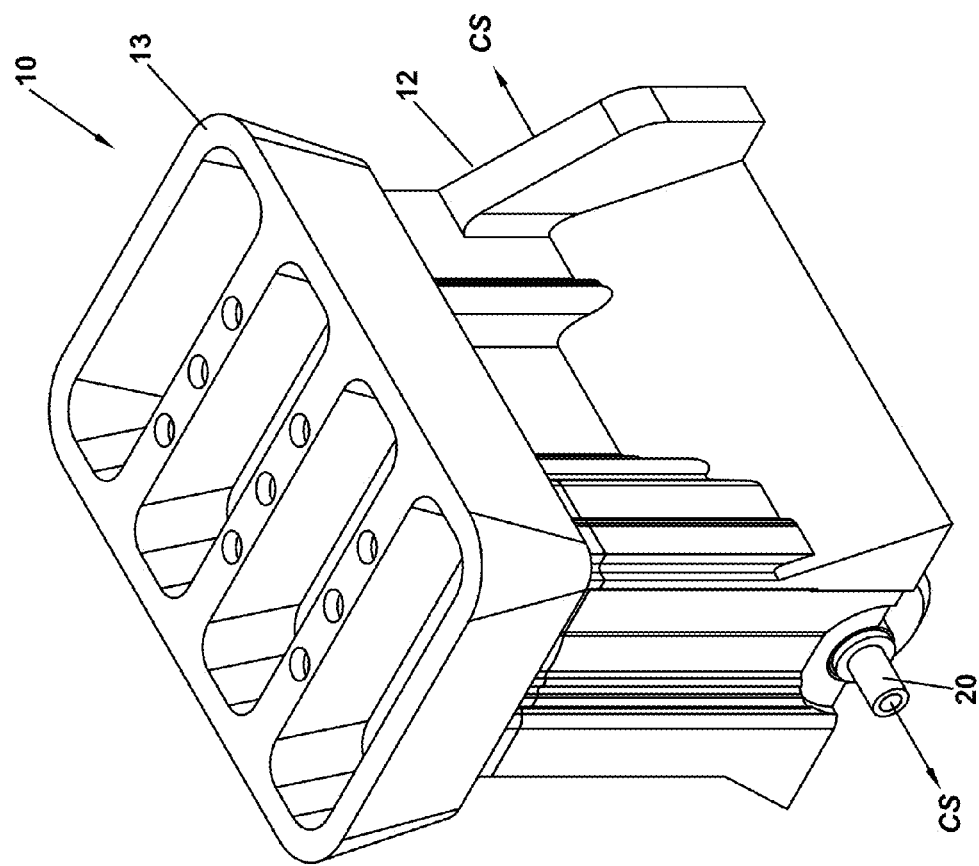
FIG. 31 is a schematic partial perspective view of a further exemplary embodiment of an internal combustion engine.
Figure 32:
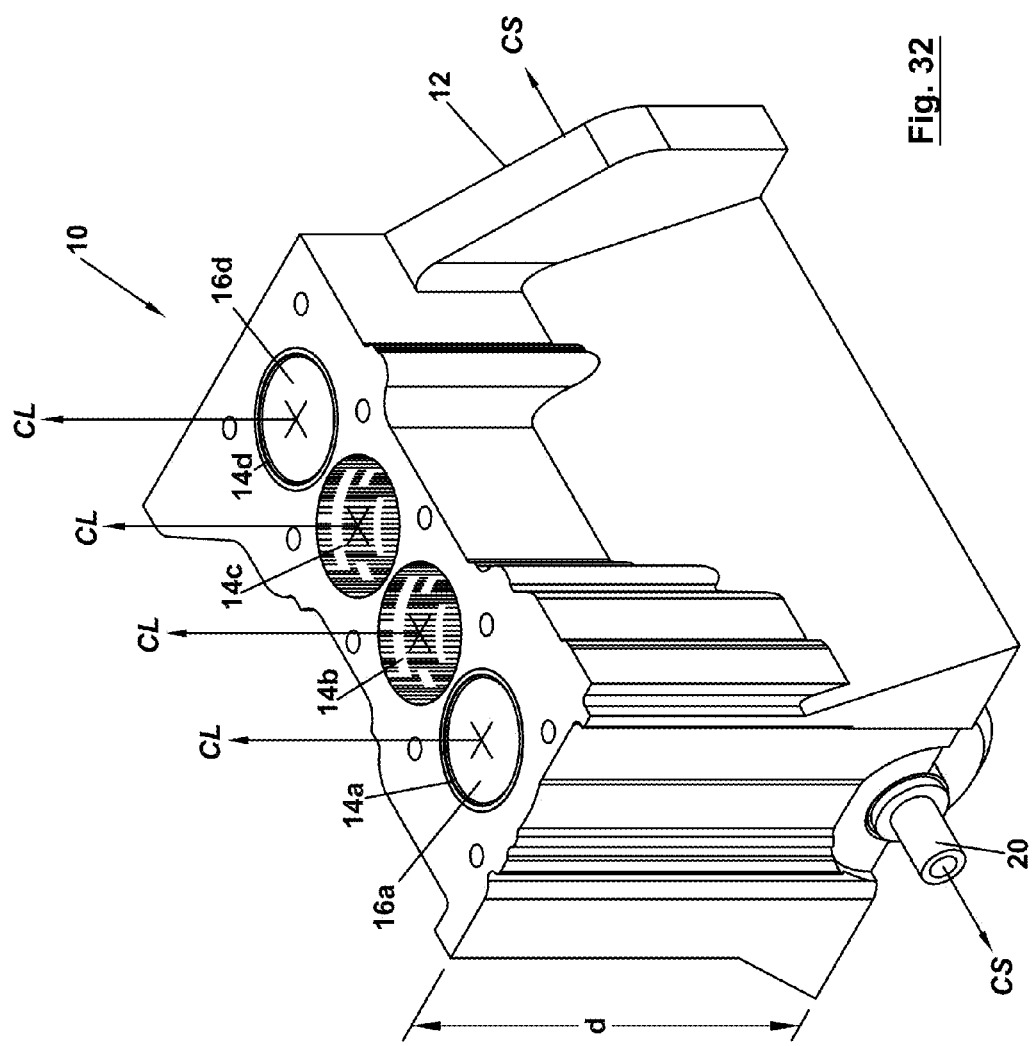
FIG. 32 is a schematic partial perspective view of a portion of the exemplary embodiment shown in FIG. 31.

Exemplary engine 10 shown in FIGS. 31-47 is a reciprocating-piston internal combustion engine. As shown in FIGS. 31 and 32, engine 10 includes a cylinder block 12 and a cylinder head 13. Referring to FIG. 32, cylinder block 12 defines a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 33:
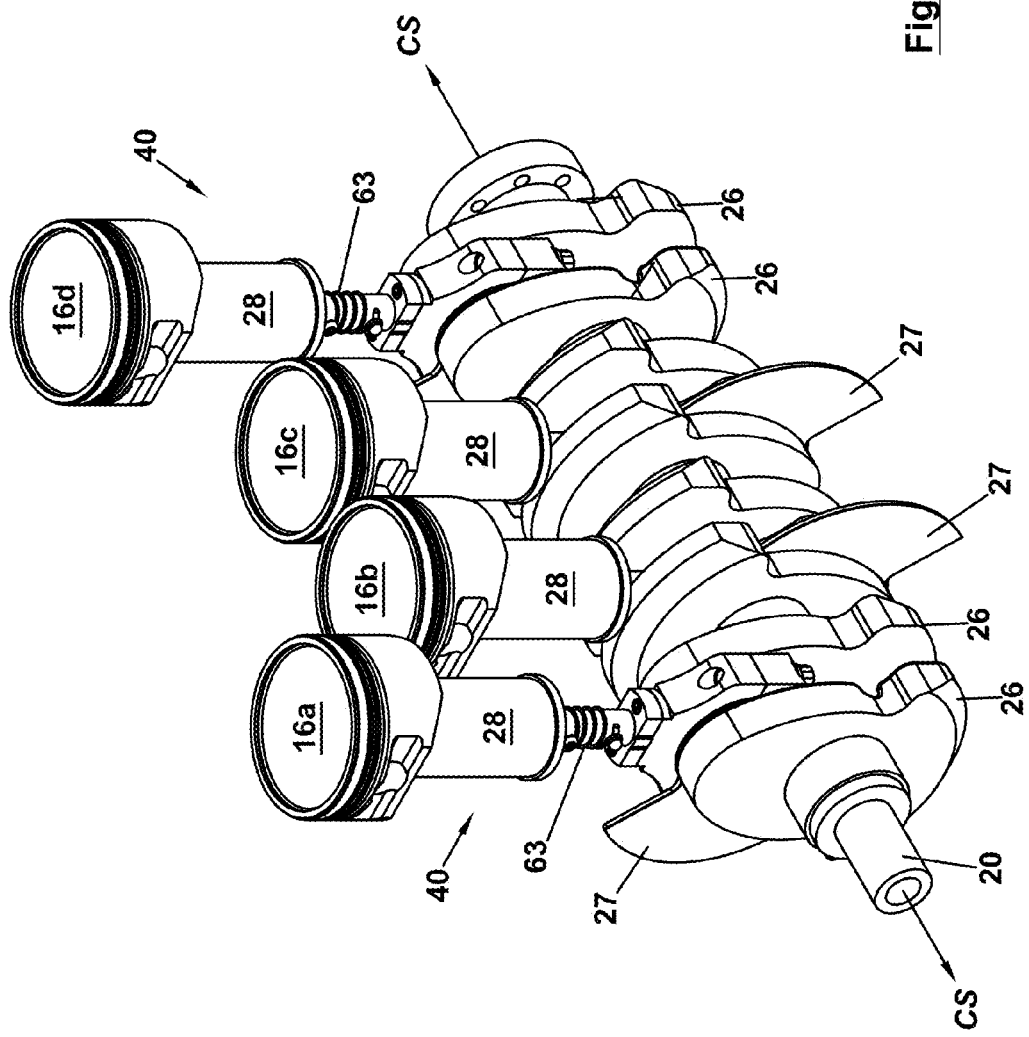
FIG. 33 is a schematic partial perspective view of an exemplary portion of the exemplary embodiment shown in FIG. 31.

As shown in FIGS. 32 and 33, exemplary engine 10 includes pistons 16 corresponding to cylinders 14, for example, four pistons 16a, 16b, 16c, and 16d (FIG. 33). As shown in FIG. 32, pistons 16a and 16d are positioned in the upper end (i.e., "upper" being relative to the orientation of engine 10 shown in FIG. 32) of cylinders 14a and 14d, respectively, while pistons 16b and 16c are not visible in FIG. 32 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIGS. 34A and 34B, crankshaft 20 defines a number of journals 22 corresponding to the number of bearings defined by cylinder block 12, and journals 22 are received by bearings, such that crankshaft 20 may rotate along longitudinal axis CS.

Exemplary crankshaft 20 also defines a number of crankpins 24 corresponding to the number of pistons 16. Crankpins 24 are circular in cross section, and the respective circular cross-sections may define a center C (see, e.g., FIG. 34B), which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T (see FIG. 34B) from the longitudinal axis CS of crankshaft 20. Crankshaft 20 may also include a number of counterbalance weights 26 for providing (or improving) rotational balance of crankshaft 20 when assembled with pistons 14 and connecting rods.

Referring to FIG. 33, for example, pistons 16 are operably coupled to crankpins 24 via a number of connecting rods 28 corresponding to the number of pistons 16. In particular, exemplary connecting rods 28 (see, e.g., FIGS. 37 and 38) include a proximal end 30 having a first aperture 32 configured to receive crankpin 24, and a distal end 34 having a second aperture 36 for operably coupling connecting rod 28 to piston 16 via, for example, a pin 38.

According to the exemplary engine 10 shown in FIGS. 31-47, exemplary connecting rod 28 is configured to have a variable length. In particular, exemplary connecting rod 28 defines a longitudinal length L between the center of first aperture 32 and the center of second aperture 36, or a longitudinal length between the center of first aperture 32 and an upper surface of piston 16. The longitudinal length L of connecting rod 28 may be selectively altered via, for example, hydraulic operation. For example, exemplary connecting rod 28 includes a hydraulic cylinder 40 including a cylinder portion 42 and a piston portion 44. In the example shown in FIG. 37, cylinder portion 42 includes first aperture 32 for receiving crankpin 24, and piston portion 44 includes second aperture 36 for receiving pin 38, which couples connecting rod 28 to piston 16. Cylinder portion 42 and piston portion 44 define two fluid receiving chambers 46a and 46b.

By selectively transferring fluid (e.g., hydraulic fluid such as oil) between fluid receiving chambers 46a and 46b, the longitudinal length L of connecting rod 28 may be selectively varied. In particular, the longitudinal length L of connecting rod 28 may be varied by permitting fluid to flow from chamber 46a to chamber 46b, such that the longitudinal length L lengthens, and conversely, by permitting fluid to flow from chamber 46b to chamber 46a, such that the longitudinal length L shortens. Thus, control of the fluid flow between fluid receiving chambers 46a and 46b results in selective control of the longitudinal length L of connecting rod 28.

By virtue of controlling the length L of connecting rod 28 by transfer of fluid between chambers 46a and 46b, hydraulic operation of connecting rod 28 does not require a separate fluid circuit and/or controller (e.g., as shown in FIGS. 6A and 6B). Rather, the fluid is self-contained within chambers 46a and 46b of connecting rod 28. However, a simple fluid supplying arrangement may be provided in order to replenish the fluid in chambers 46a and 46b. A fluid circuit similar to the exemplary embodiment shown in FIGS. 6A and 6B could be used for this purpose, although other less complex fluid supplying arrangements could be used. For example, an arrangement for supplying fluid while exemplary engine 10 is not operating could be used, and/or an arrangement for supplying fluid while exemplary engine 10 is operating could be used.

According to some embodiments, fluid in chambers 46a and 46b may be replenished via one or more fluid passages in one or more of crankshaft 20, crankpin 24, and connecting rod 28. For example, as shown in FIG. 34B, exemplary crankshaft 20 includes fluid passages 47a, which may be configured to supply fluid to the surface of crankpins 24, which may, in turn, supply fluid to connecting rods 28 (see, e.g., FIG. 40, which shows an example of how fluid passages 47a in crankshaft 20 supply fluid to a fluid passage 53 in connecting rod 28. Fluid may be supplied to fluid passage 47a of crankshaft 20 via a fluid line (not shown).

Figure 35:
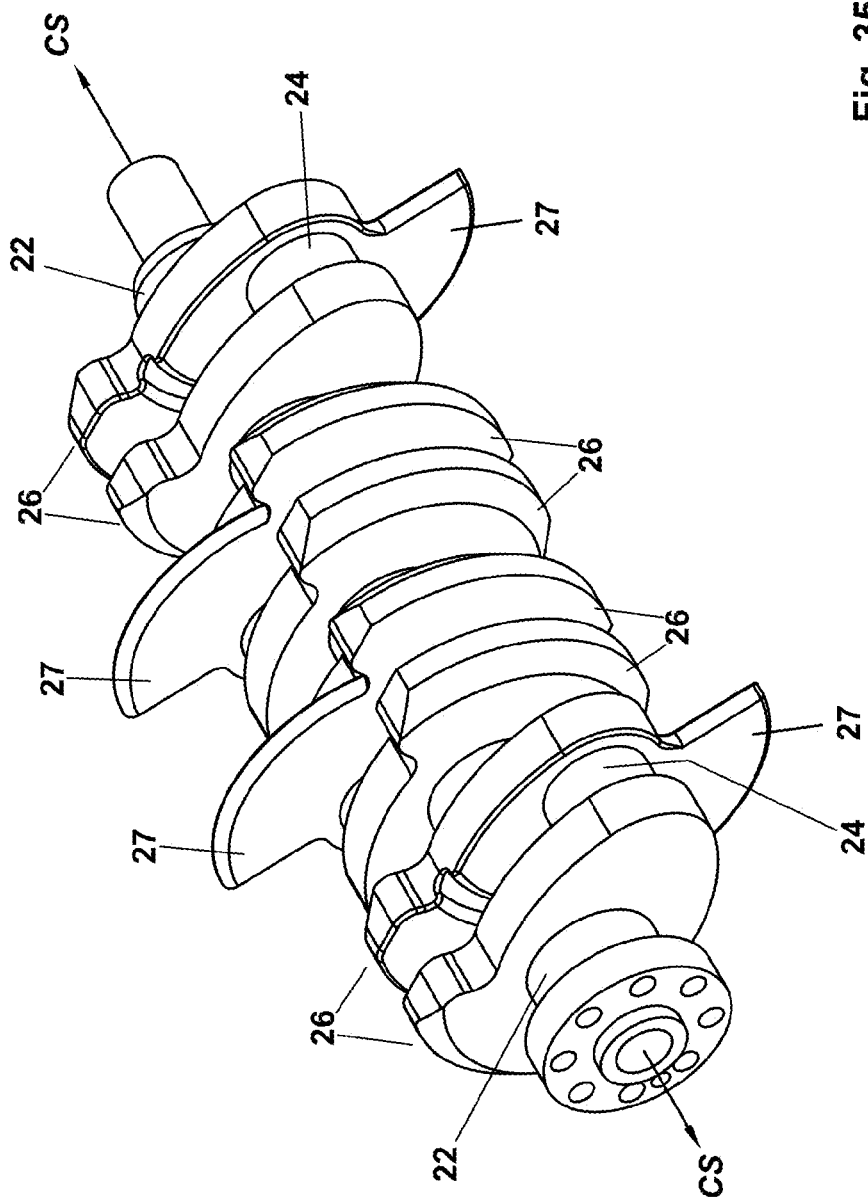
FIG. 35 is a schematic perspective view of an exemplary embodiment of a crankshaft of the exemplary embodiment shown in FIG. 30.
Figure 36:
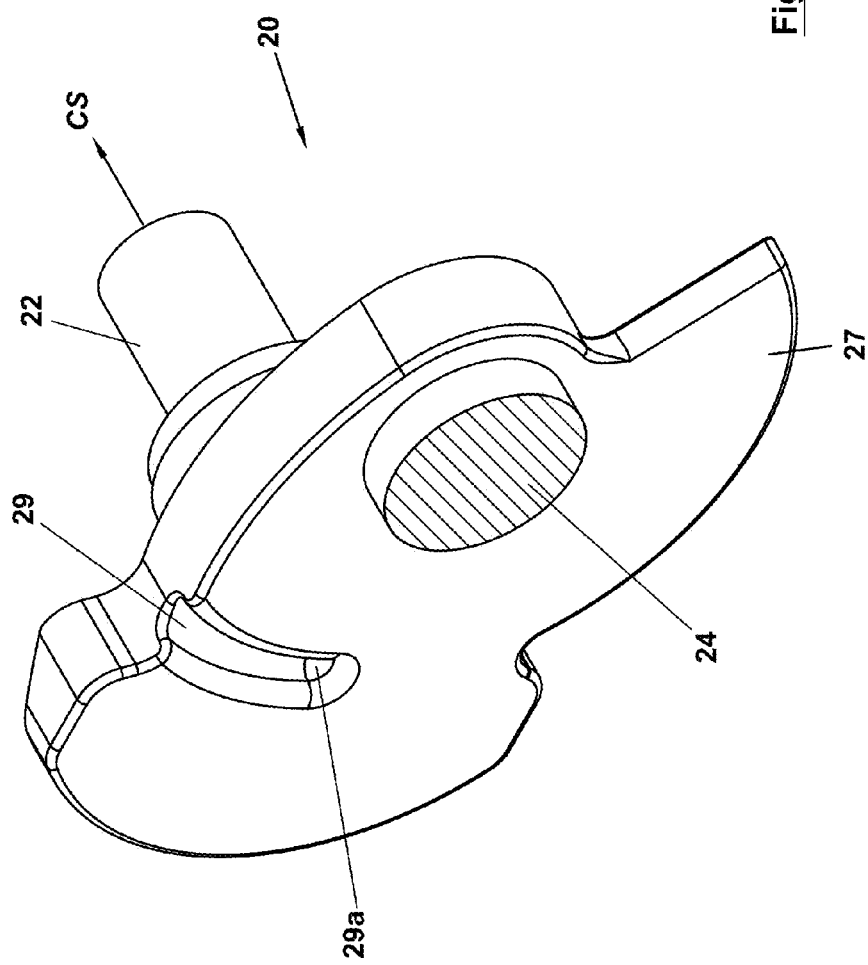
FIG. 36 is a schematic perspective section view of a portion of the exemplary embodiment of crankshaft shown in FIG. 35.
Figure 37:
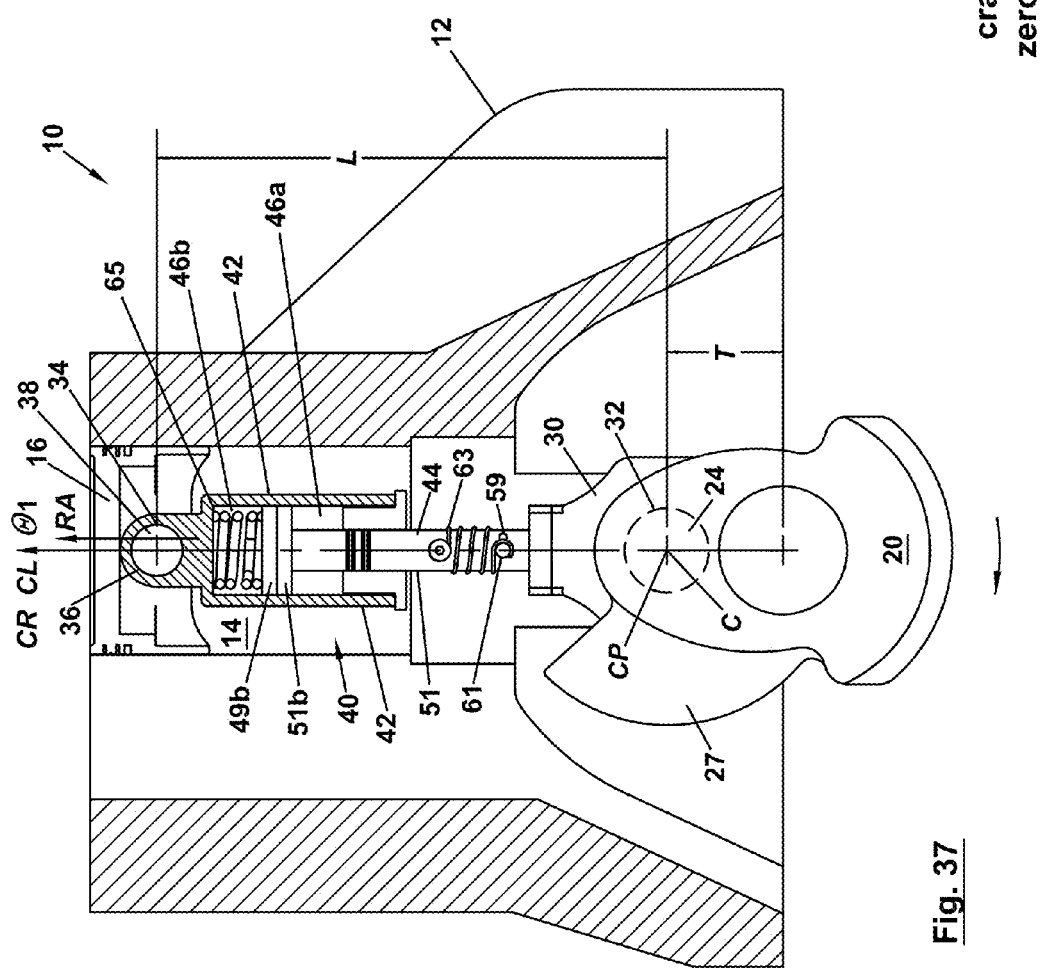
FIG. 37 is a schematic partial end section view of the exemplary embodiment shown in FIG. 31 with the radial axis angle of the crankshaft shown at 0 degrees.
Figure 38:
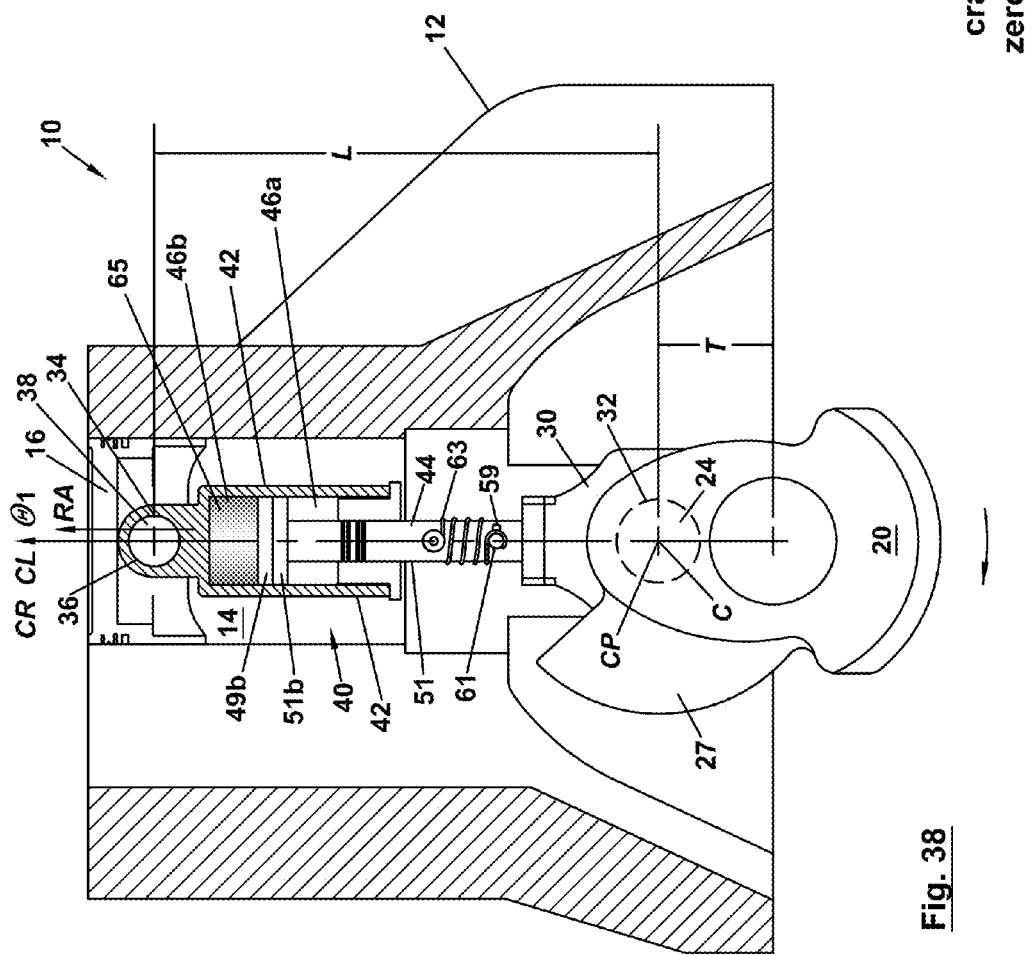
FIG. 38 is a schematic partial end section view of another exemplary embodiment of the exemplary embodiment shown in FIG. 37 with the radial axis angle of the crankshaft shown at 0 degrees.

Referring to FIGS. 35 and 36, exemplary crankshaft 20 may include one or more actuating cams 27 configured to engage a follower associated with operation of hydraulic cylinder 40, as explained in more detail herein with respect to FIGS. 41-47. For example, as shown in FIGS. 35 and 36, exemplary actuating cams 27 extend from counterbalance weights 26 in the form of a wing having a greater radial extension than counter balance weights 26. Alternatively, actuating cams 27 may not be formed as part of counterbalance weights 26.

Referring to FIG. 36, counterbalance weights 26 may include a clearance channel 29 in the form of a curved groove. As explained in more detail below with respect to FIGS. 41-47, clearance channel 29 is configured to prevent counterbalance weight 26 from engaging the follower associated with operation of hydraulic cylinder 40.

Referring to FIGS. 37-41, hydraulic cylinder 40 of connecting rod 28 is configured to operate such that the effective length L of connecting rod 28 can be controlled. For example, referring to FIG. 40, piston portion 44 of hydraulic cylinder 40 includes an inner portion 49 and an outer portion 51. Inner portion 49 and/or outer portion 51 define fluid passage 53, which provides flow communication between passage 47a in crankshaft 20 (see FIG. 34B) and chambers 46a and 46b of hydraulic cylinder 40. The exemplary fluid passage 53 may permit fluid in chambers 46a and 46b to be replenished in the event, for example, some of the fluid in chambers 46a and/or 46b leaks out and/or needs to be replaced.

According to the exemplary embodiment shown, outer portion 51 defines a hollow sleeve 51a, which terminates in a flange 51b having a circular periphery (e.g., creating a disc-like shape). Inner portion 49 includes a stem 49a, which terminates in a disc-like portion 49b. Stem 49a extends through sleeve 51a, such that disc-like portion 49b abuts flange 51b. Inner portion 49 and outer portion 51 are configured such that stem 49a is able to rotate within sleeve 51a, with disc-like portion 49b abutting flange 51b (see FIG. 42B).

Figure 39:
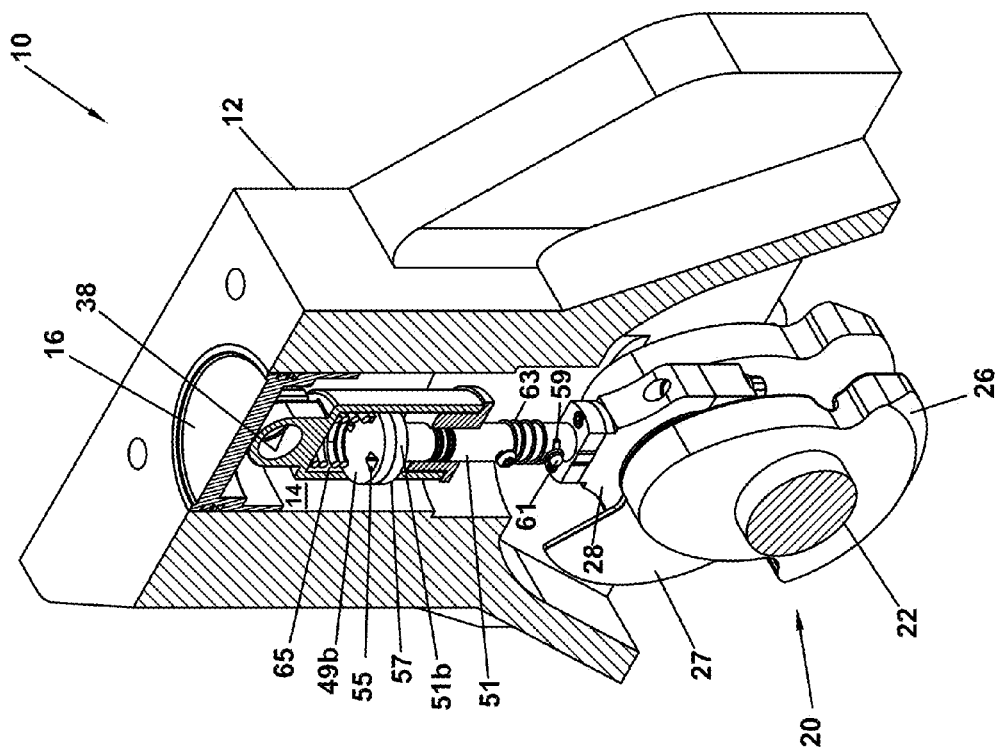
FIG. 39 is a schematic partial perspective section view of the exemplary embodiment shown in FIG. 31 with the radial axis angle of the crankshaft shown at 0 degrees.

Referring to FIG. 39, disc-like portion 49b includes a first aperture 55, and flange 51b includes a second aperture 57. First and second apertures 55 and 57 are configured such that when they are aligned, they form a port, and flow communication is provided between chamber 46a and chamber 46b. When first and second apertures 55 and 57 are not aligned, the port is closed, and flow communication between chamber 46a and chamber 46b is prevented. According to the exemplary embodiment shown, first and second apertures 55 and 57 are capable of being selectively aligned and misaligned by rotation of inner portion 49 within outer portion 51 (see, e.g., FIGS. 41B, 42B, and 45B). Although only a single first aperture 55 and a single second aperture 57 are shown for clarity, there may be more than a single first aperture 55 and a single second aperture 57. For example, there may be two, three, four, or more first and second aperture pairs.

In order to cause rotation of inner portion 49 within outer portion 51, sleeve 51a includes a circumferentially-extending slot 59 (see, e.g., FIGS. 37-39), and stem 49a includes a follower 61 in the form of, for example, a pin. Follower 61 extends from stem 49a through slot 59 and beyond the cross-sectional periphery of sleeve 51a. Slot 59 and follower 61 are configured such that movement of follower 61 within slot 59 results in rotation of inner portion 49 relative to outer portion 51, such that first and second apertures 55 and 57 can be aligned and misaligned in a controllable manner via movement of follower 61, thereby controlling the flow of fluid between chambers 46a and 46b.

A radial biasing member 63 (e.g., a spring) may be provided, such that inner portion 49 and outer portion 51 are biased in relative radial positions with respect to one another that result in first and second apertures 55 and 57 being substantially aligned, thereby providing flow communication between chambers 46a and 46b. Exemplary hydraulic cylinder 40 includes a biasing member 65, such as, for example, a spring (e.g., a coil spring (FIG. 37)) in chamber 46b. According to some embodiments, biasing member 65 may include pressurized gas (see FIG. 38) contained within a bladder (not shown). For example, the pressurized gas and bladder may be configured such that when compressed and the magnitude of the compression increases, the force acting against the compression by the gas within the bladder increases. Regardless of its form, biasing member 65 is configured to bias piston portion 44 of hydraulic cylinder 40 to an extended position, which corresponds to an increase in the effective length L of connecting rod 28.

According to the exemplary embodiment shown in FIGS. 31-47, operation of hydraulic cylinder 40 may be controlled such that substantial movement of piston 16 toward crankshaft 20 during the power stroke is delayed until crankshaft 20 has rotated to point at which there is a more effective moment arm between connecting rod axis CR and radial axis RA extending between crankshaft axis CS and a respective crankpin axis CP. More specifically, operation of hydraulic cylinder 40 may be controlled via controlling radial movement of inner portion 49 within outer portion of 51, such that fluid selectively flows between chamber 46a and chamber 46b, thereby changing the effective length L. As a result, a greater amount of the energy of the combustion event may be captured because the maximum force acting on piston 16 coincides with a greater moment arm, thereby resulting in more torque at crankshaft 20 during the power stroke. Timing of initiation of combustion may be tailored to take advantage of the delayed stroke.

During operation of exemplary engine 10, as crankshaft 20 rotates, crankpins 24 revolve around crankshaft longitudinal axis CS, such that crankpin centers C define a circular path having a radius defined by the distance T defined along a radial axis RA (see FIGS. 40-47) extending between the longitudinal axis CS of crankshaft 20 and the longitudinal axis CP of the respective crankpins 24. Thus, first apertures 32 of proximal end 30 of connecting rod 28, which are rotatably coupled with respect to crankpins 24, also revolve about the crankshaft axis CS. Distal end 34 of connecting rod 28 is constrained to move in a reciprocating and linear manner due to being operably coupled to piston 16, which is likewise constrained to move in a reciprocating and linear manner within respective cylinder 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS (as affected according to the exemplary operation described herein).

During operation of a conventional engine, a piston reciprocates within the cylinder, such that during a power stroke of the internal combustion engine, combustion of an air/fuel mixture within a combustion chamber defined by the piston, cylinder, and cylinder-head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process in a conventional internal combustion engine may be less than desired.

Exemplary engine 10 is configured to employ a strategy that delays substantial movement of piston 16 toward crankshaft 20 during the power stroke, until crankshaft 20 has rotated to a point at which there is a more effective moment arm between connecting rod axis CR and radial axis RA extending between crankshaft axis CS and a respective crankpin axis CP. As a result, a greater amount of the energy of the combustion event may be captured because the maximum force acting on piston 16 coincides with a greater moment arm, thereby resulting in more torque at crankshaft 20 during the power stroke. Timing of the initiation of combustion may be tailored to take advantage of the delayed stroke.

FIGS. 40-47 schematically illustrate exemplary operation of engine 10 having exemplary connecting rod 28, which serves to delay piston 16's travel at the beginning of the power stroke of exemplary engine 10. In particular, by selectively activating hydraulic cylinder 40 of connecting rod 28, such that the distance between the center CP of crankpin 24 and the center of pin 38 (i.e., the effective length L of connecting rod 28) may be selectively varied. Such an exemplary embodiment renders it possible to effectively hold piston 16 in cylinder 14 at a substantially fixed position for a short period of time, even as crankpin 24 continues to revolve around crankshaft 20's axis CS as crankshaft 20 rotates. As a result, it is possible to hold piston 16 at the point of highest compression in the combustion chamber while crankpin 24 revolves to a position, which results in an increased moment arm defined by the radial axis RA extending between the center of crankshaft 20 and the center C of crankpin 24 and the axis CR of connecting rod 28. This results in relatively more torque being applied to crankshaft 20 as combustion begins, with piston 16 still remaining at a point farthest from the center of crankshaft 20 (i.e., at the end of its upward stroke as shown). In this exemplary manner, the delaying strategy outlined below may be implemented.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

Figure 40:
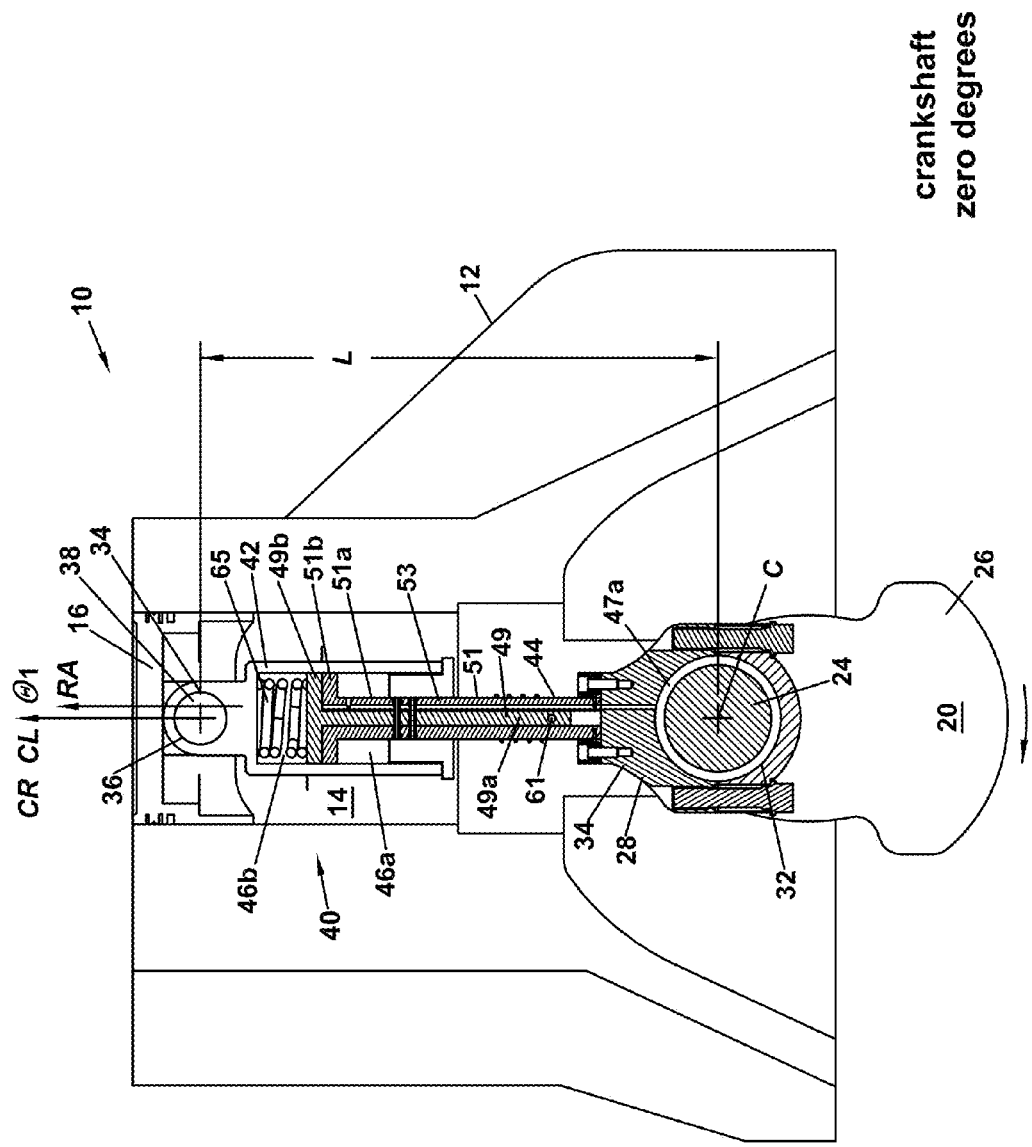
FIG. 40 is a schematic end section view of the exemplary embodiment shown in FIG. 31 with the radial axis angle of the crankshaft shown at 0 degrees.

For example, as shown in FIG. 40, crankshaft 20 is oriented such that radial axis RA defined by the center of crankshaft 20 and the center C of crankpin 24 is oriented at zero degrees, which corresponds generally a first stroke termination angle $\theta_1$ that generally coincides with the end of the compression stroke of exemplary engine 10. Thus, with radial axis RA in this orientation, piston 16 is at its upper position within cylinder 14.

As shown in FIG. 40, during operation of engine 10 crankshaft 20 rotates in the clockwise direction. Hydraulic cylinder 40 is in a configuration such that piston 16 is at the top of its stroke while the radial axis RA of crankshaft 20 is substantially aligned with the longitudinal axis CR of connecting rod 28. In particular, piston portion 44 of hydraulic cylinder 40 is in a position relative to cylinder portion 42 such that piston 16 is at the top of its stroke. As shown in FIG. 40, biasing member 65 in chamber 46b is in an at least partially compressed configuration. This corresponds to piston portion 44 of hydraulic cylinder 40 being in a position relative to cylinder portion 42 that results in a shortening of the effective length L of connecting rod 28.

FIGS. 41A-41C show crankshaft 20 in an orientation where radial axis RA has rotated 36 degrees past first stroke termination angle $\theta_1$. In a conventional engine, piston 16 would have traveled a significant distance toward crankshaft axis CS. In contrast, according to exemplary engine 10, piston 16 has not yet started its downward travel toward crankshaft axis CS. Instead, piston portion 44 of hydraulic cylinder 40 has increased its extension from cylinder portion 42, thus increasing the effective length L of connecting rod 28. As a result of the increase in effective length L, piston 16 has not traveled down cylinder 14 (as shown), even though crankpin 24 has rotated clockwise relative to the center C of crankshaft 20, such that the center C of crankpin 24 is farther from the top of cylinder 14. (See Table III below showing an exemplary relationship for exemplary engine 10 between radial axis RA's angle and piston 16's displacement relative to the first stroke termination angle $\theta_1$.)

TABLE III

RADIAL AXIS RA ANGLE VS. PISTON DISPLACEMENT RELATIVE TO ZERO DEGREES FOR FIGS. 31-47

| Crank Angle | Piston Depth |
| --- | --- |
| 0 | 0.000 |
| 4 | 0.000 |
| 8 | 0.000 |
| 12 | 0.000 |
| 16 | 0.000 |
| 20 | 0.000 |
| 24 | 0.000 |
| 28 | 0.000 |
| 32 | 0.000 |
| 36 | 0.000 |
| 40 | 0.000 |
| 44 | 0.106 |
| 48 | 0.218 |

TABLE III-continued

RADIAL AXIS RA ANGLE VS. PISTON DISPLACEMENT
RELATIVE TO ZERO DEGREES FOR FIGS. 31-47

| Crank Angle | Piston Depth |
|---|---|
| 52 | 0.337 |
| 56 | 0.461 |
| 60 | 0.590 |
| 64 | 0.722 |
| 68 | 0.857 |
| 72 | 0.995 |
| 76 | 1.133 |
| 80 | 1.272 |
| 84 | 1.411 |
| 88 | 1.549 |
| 92 | 1.685 |
| 96 | 1.819 |
| 100 | 1.949 |
| 104 | 2.076 |
| 108 | 2.199 |
| 112 | 2.317 |
| 116 | 2.431 |
| 120 | 2.539 |
| 124 | 2.641 |
| 128 | 2.737 |
| 132 | 2.826 |
| 136 | 2.909 |
| 140 | 2.986 |
| 144 | 3.055 |
| 148 | 3.118 |
| 152 | 3.173 |
| 156 | 3.221 |
| 160 | 3.262 |
| 164 | 3.296 |
| 168 | 3.322 |
| 172 | 3.340 |
| 176 | 3.351 |
| 180 | 3.364 |

In particular, during crankshaft 20's rotation from the position shown in FIG. 40 and the position shown in FIG. 41A, first and second apertures 55 and 57 (see FIGS. 41B and 41C) have been aligned such that they provide flow communication between chamber 46a and chamber 46b. This may be accomplished by, for example, transferring fluid from chamber 46a to chamber 46b. For example, as fluid flows from chamber 46a into chamber 46b, chamber 46b is expanded with the assistance of biasing member 65, which provides an extension force against disc-like portion 49b to expand chamber 46b. As a result, the effective length L of connecting rod 28 increases, such that rather than beginning downward travel in cylinder 14, piston 16 remains substantially in its position of maximum stroke.

Figure 42A:
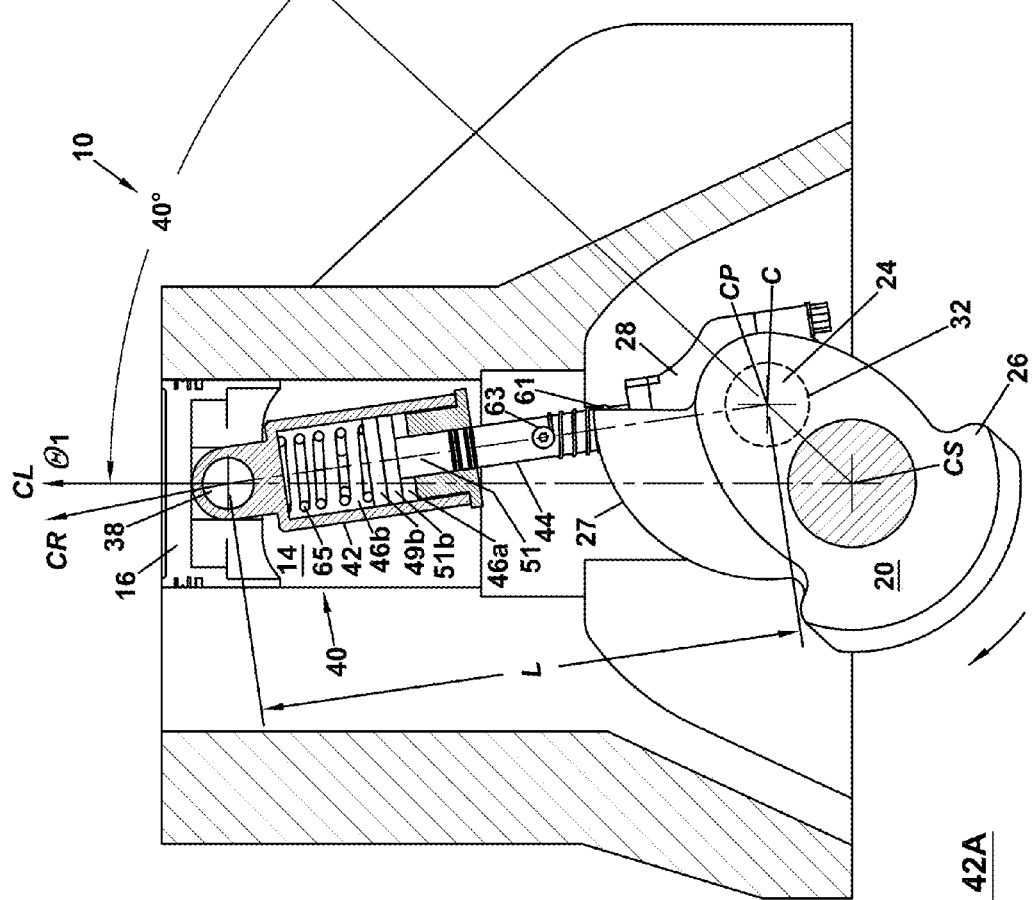
FIG. 42A is a schematic end section view of the exemplary embodiment shown in FIG. 31 with the radial axis angle of the crankshaft shown at 40 degrees.
Figure 42B:
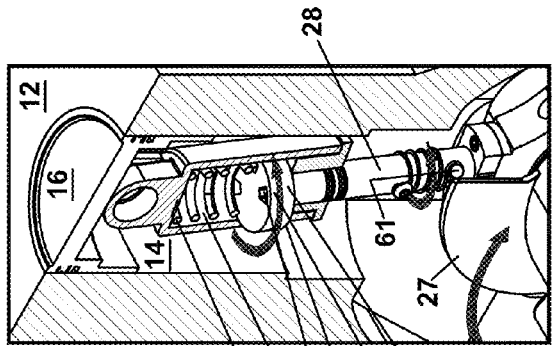
FIG. 42B is a schematic perspective detail section view of FIG. 42A.
Figure 42C:
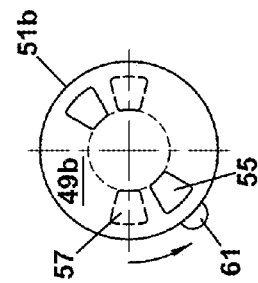
FIG. 42C is a schematic, detail top view of an exemplary portion of the detail shown in FIG. 42B.

As crankshaft 20 rotates from the position shown in FIG. 40 to the position shown in FIG. 41A, actuating cam 27 of crankshaft 20 rotates from a position relatively remote with respect to follower 61 to a position approaching follower 61. As shown in FIGS. 42A-42C, which show crankshaft 20 in an orientation where radial axis RA has rotated 40 degrees past first stroke termination angle $\theta_1$, actuating cam 27 engages follower 61 (see FIG. 42B). As actuating cam 27 engages follower 61, follower 61 moves within slot 59, thus twisting inner portion 49 within outer portion 51, such that first and second apertures 55 and 57 become misaligned with respect to one another (see FIG. 42C). As first and second apertures 55 and 57 become misaligned, flow communication between chamber 46a and chamber 46b is prevented. Thus, fluid in chamber 46b is retained in chamber 46b. The effective length L of connecting rod 28 has increased as crankpin 24 moves away from cylinder 14 as crankshaft 20 rotates. As a result, piston 16 remains at its point of maximum stroke within cylinder 14.

With fluid retained in chamber 46b, as combustion begins with crankshaft 20 in an orientation where radial axis RA has rotated, for example, 40 degrees past first stroke termination angle $\theta_1$, piston portion 44 ceases to extend farther out of cylinder portion 42 of hydraulic cylinder 40. Combustion may begin at this point. Fluid retained in chamber 46b maintains the effective length L of connecting rod 28 in an extended configuration rather than allowing chamber 46b to collapse as combustion forces piston 16 down cylinder 14. As a result, force from combustion is transferred to crankpin 24, thereby driving crankshaft 20 in a clockwise direction as shown. Although the exemplary embodiment shown in FIGS. 31-47 shows the point at which piston 16 begins to move from its point of maximum stroke to be where radial axis RA has rotated 40 degrees past first stroke termination angle $\theta_1$, this point may be between 40 and 60 degrees past first stroke termination angle $\theta_1$ (e.g., 59 degrees, 55 degrees, 50 degrees, 45 degrees, or 41 degrees). According to some embodiments, the radial position at which the piston portion 44 ceases to extend farther out of cylinder portion 42 may be adjusted during operation according to predetermined criteria in order to tailor operation of engine 10.

Figure 43:
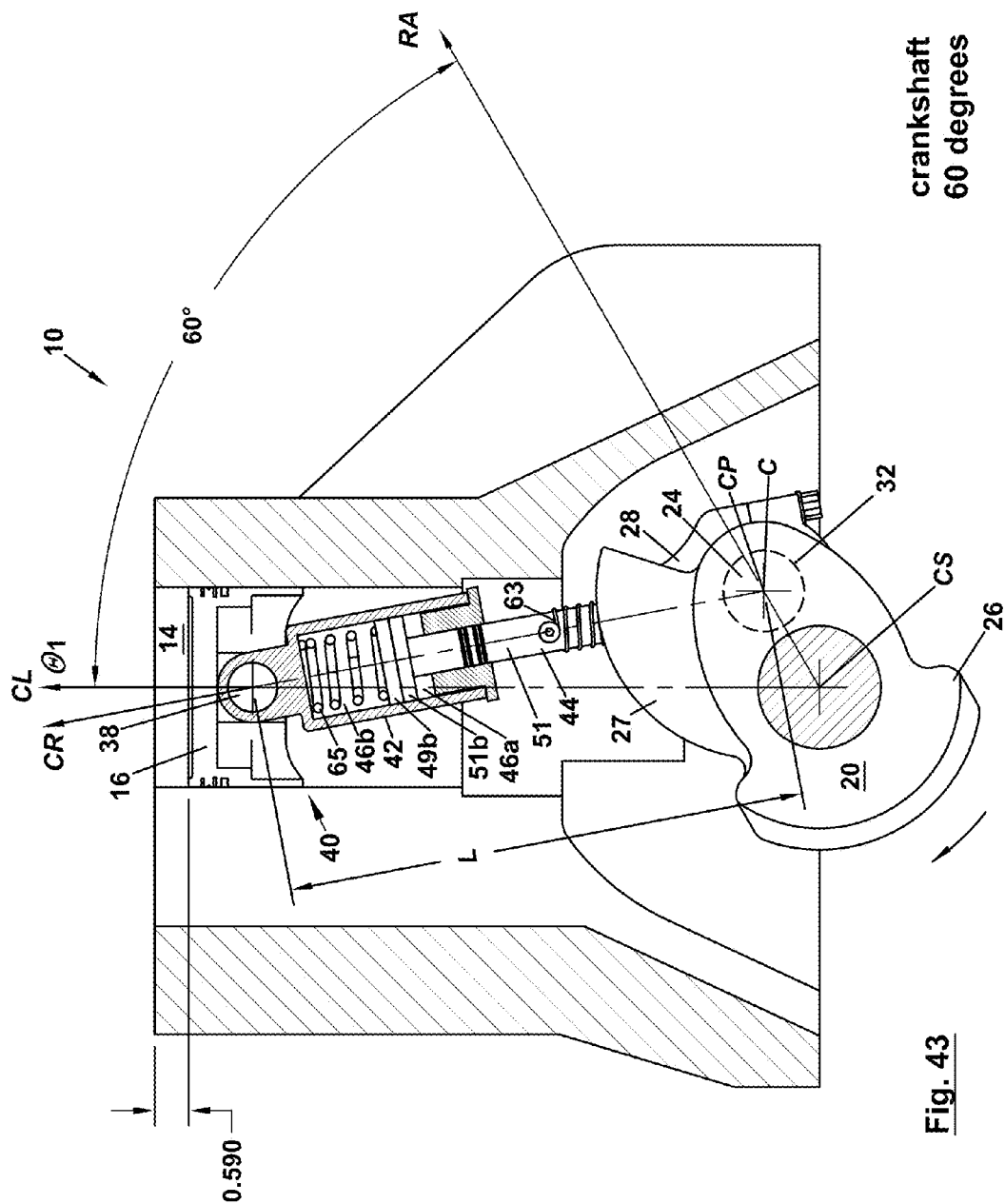
FIG. 43 is a schematic end section view of the exemplary embodiment shown in FIG. 31 with the radial axis angle of the crankshaft shown at 60 degrees.

Referring to FIG. 43, when the radial axis RA has rotated to 60 degrees past the first stroke termination angle $\theta_1$, piston 16 has traveled 0.590 inch down cylinder 14 relative to its point of maximum extension from crankshaft axis CR. This results from piston portion 44 of hydraulic cylinder 40 maintaining its relative position with respect to cylinder portion 42 due to the fluid within chamber 46b. The fluid is prevented from draining from chamber 46b into chamber 46a by virtue of actuating cam 27 continuing to hold follower 61 in a position, such that first and second apertures 55 and 57 are misaligned, so that fluid is prevented from flowing from chamber 46b to chamber 46a. As a result, the effective length L of connecting rod 28 remains fixed as the radial axis RA rotates from 40 degrees to 60 degrees past the first stroke termination angle $\theta_1$.

Figure 44:
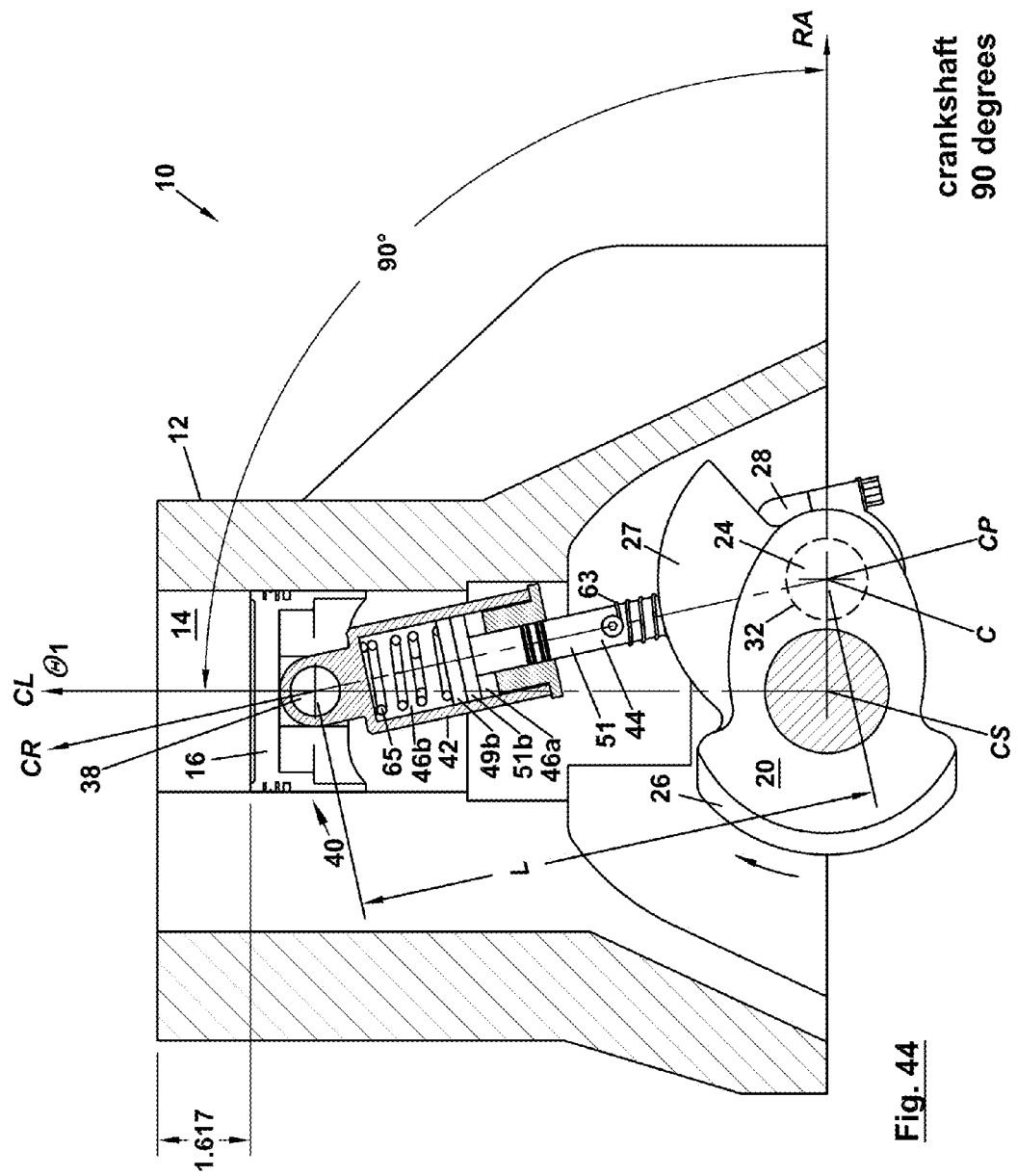
FIG. 44 is a schematic end section view of the exemplary embodiment shown in FIG. 31 with the radial axis angle of the crankshaft shown at 90 degrees.
Figure 45:
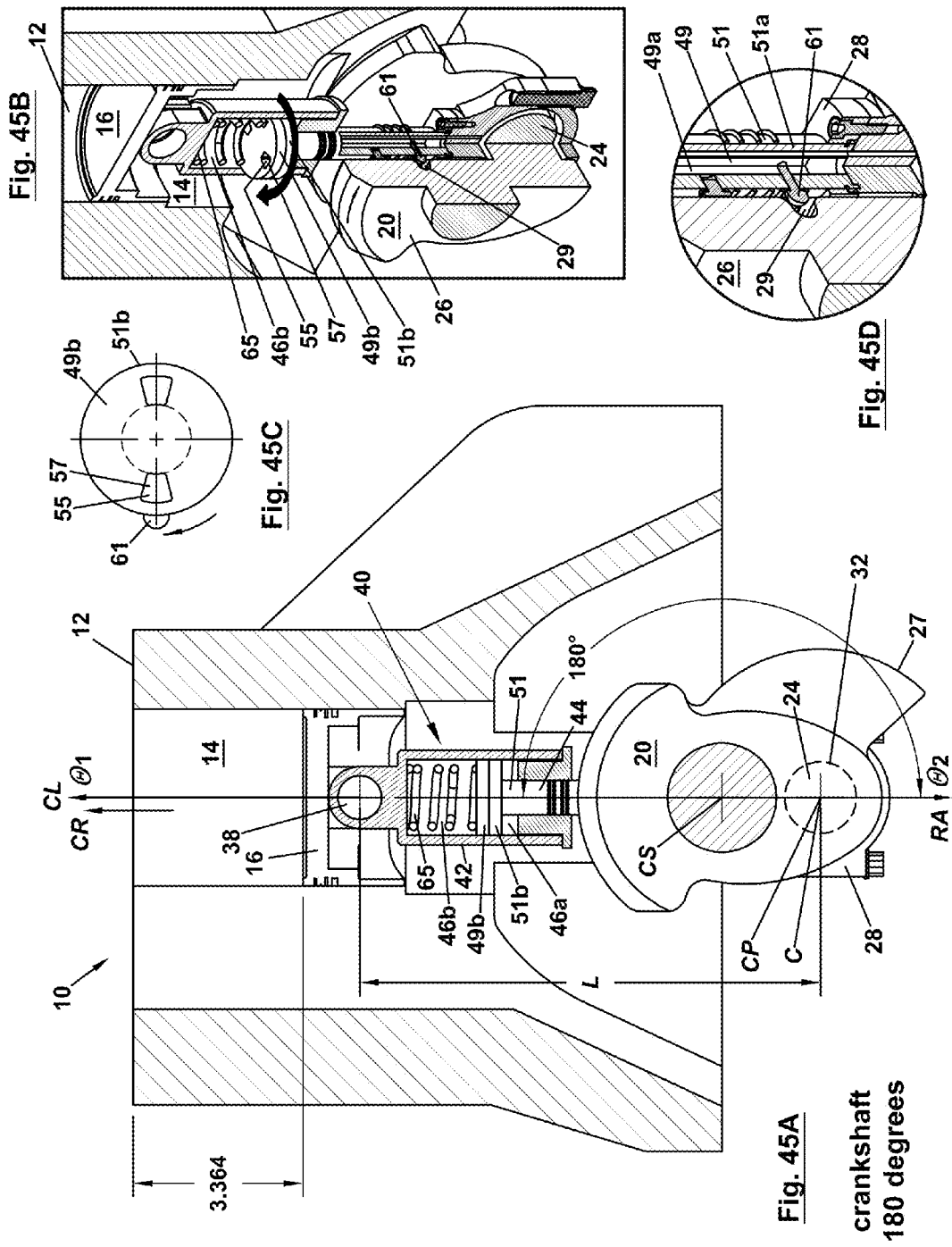
FIG. 45A is a schematic end section view of the exemplary embodiment shown in FIG. 31 with the radial axis angle of the crankshaft shown at 180 degrees.
FIG. 45B is a schematic perspective detail section view of FIG. 45A.
FIG. 45C is a schematic perspective detail section view of FIG. 45B.
FIG. 45D is a schematic, detail top view of an exemplary portion of the detail shown in FIG. 45B.

Referring to FIG. 44, radial axis RA has rotated 90 degrees past first stroke termination angle $\theta_1$. Piston portion 44 and cylinder portion 42 of hydraulic cylinder 40 have maintained the relative positions shown in FIG. 43. Actuating cam 27 continues to engage follower 61 such that first and second apertures 55 and 57 remain misaligned, and chamber 46b remains expanded by virtue of the fluid contained therein. Thus, the effective length L of connecting rod 28 has remained the same as shown in FIG. 43. As a result, piston 16 has continued to travel down cylinder 14, such that piston 16 has traveled 1.617 inches down cylinder 14 relative to its point of maximum extension from crankshaft axis CR. Thus, whereas during the first 40 degrees of rotation of radial axis RA past first stroke termination angle $\theta_1$, piston 16 did not travel downward, during the next 50 degrees of rotation of radial axis RA, piston 16 has traveled 1.617 inches down cylinder 14.

Referring to FIGS. 45A-45D, radial axis RA has rotated 180 degrees past first stroke termination angle $\theta_1$ (i.e., at a second stroke termination angle $\theta_2$, which corresponds to the end of the power stroke). Piston portion 44 and cylinder portion 42 of hydraulic cylinder 40 have maintained the relative positions shown in FIGS. 43 and 44. Thus, piston 16 has continued to travel down cylinder 14, such that piston 16 has traveled 3.364 inches down cylinder 14 relative to its point of maximum extension from crankshaft axis CR.

However, as radial axis RA reaches this point, actuating cam 27 disengages follower 61. As a result, radial biasing member 63 forces follower 61 to return to the position shown in FIGS. 40 and 41. When follower 61 returns to this position (see FIG. 45B), inner portion 49 of piston portion 44 of hydraulic cylinder 40 twists within outer portion 51, resulting in first and second apertures 55 and 57 becoming aligned once again (see FIG. 45D). By virtue of first and second apertures 55 and 57 being aligned, flow communication between chambers 46a and 46b is once again permitted.

As shown in FIGS. 45B and 45C, clearance channel 29 in counterbalance weight 26 of crankshaft 20 provides clearance between counterbalance weight 26 and follower 61. As a result, counterbalance 26 does not engage follower 61, and radial biasing member 63 holds first and second apertures 55 and 57 aligned with one another. This permits flow communication between chambers 46a and 46b as crankshaft 20 continues to rotate clockwise as shown. By virtue of opening flow communication, fluid may flow from chamber 46b to chamber 46a, thereby permitting the effective length L of connecting rod 28 to shorten as chamber 46b contracts.

Figure 46:
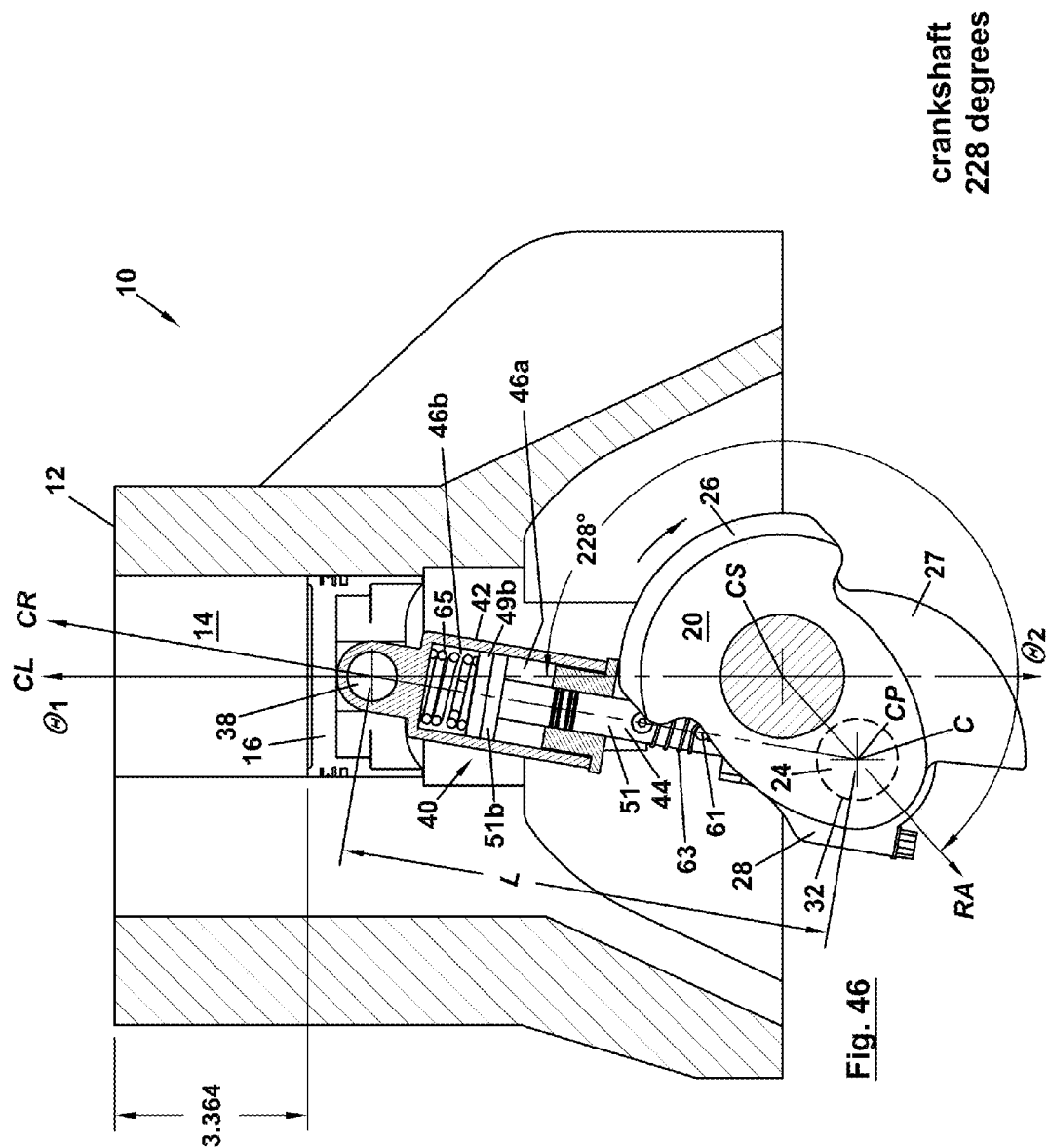
FIG. 46 is a schematic end section view of the exemplary embodiment shown in FIG. 31 with the radial axis angle of the crankshaft shown at 228 degrees.

Referring to FIG. 46, radial axis RA has rotated 228 degrees past first stroke termination angle $\theta_1$. Thus, crankpin 24's center C has reversed its vertical direction as shown, such that it is becoming closer to cylinder 14. However, piston 16 has not started to travel up cylinder 14 because the effective length L of connecting rod 28 has shortened to offset upward movement of crankpin 24's center C. The shortening of the effective length L may occur as fluid flows from chamber 46b to chamber 46a. Shortening of the effective length L of connecting rod 28 may be accomplished passively due to inherent resistance within cylinder 14 as crankpin 24 drives connecting rod 28 back up into cylinder 14. According to some embodiments, shortening of the effective length L may be completed when the radial axis RA reaches a radial position of 360 degrees as described in relation to exemplary embodiments previously described herein (see, e.g., FIGS. 5A, 5B, and 15), where piston 16 abuts a damper 70 associated with cylinder head 13, as explained in more detail with respect to FIG. 15.

As a result of the shortening of the effective length L of connecting rod 28, piston 16 may remain in substantially the same position within cylinder 14 as the position shown in FIGS. 45A-45D (e.g., at 3.364 inches from its point of maximum extension from crankshaft axis CR), when the radial position of the radial axis RA was at the second stroke termination angle $\theta_2$ (i.e., at 180 degrees past first stroke termination angle $\theta_1$).

Figure 47:
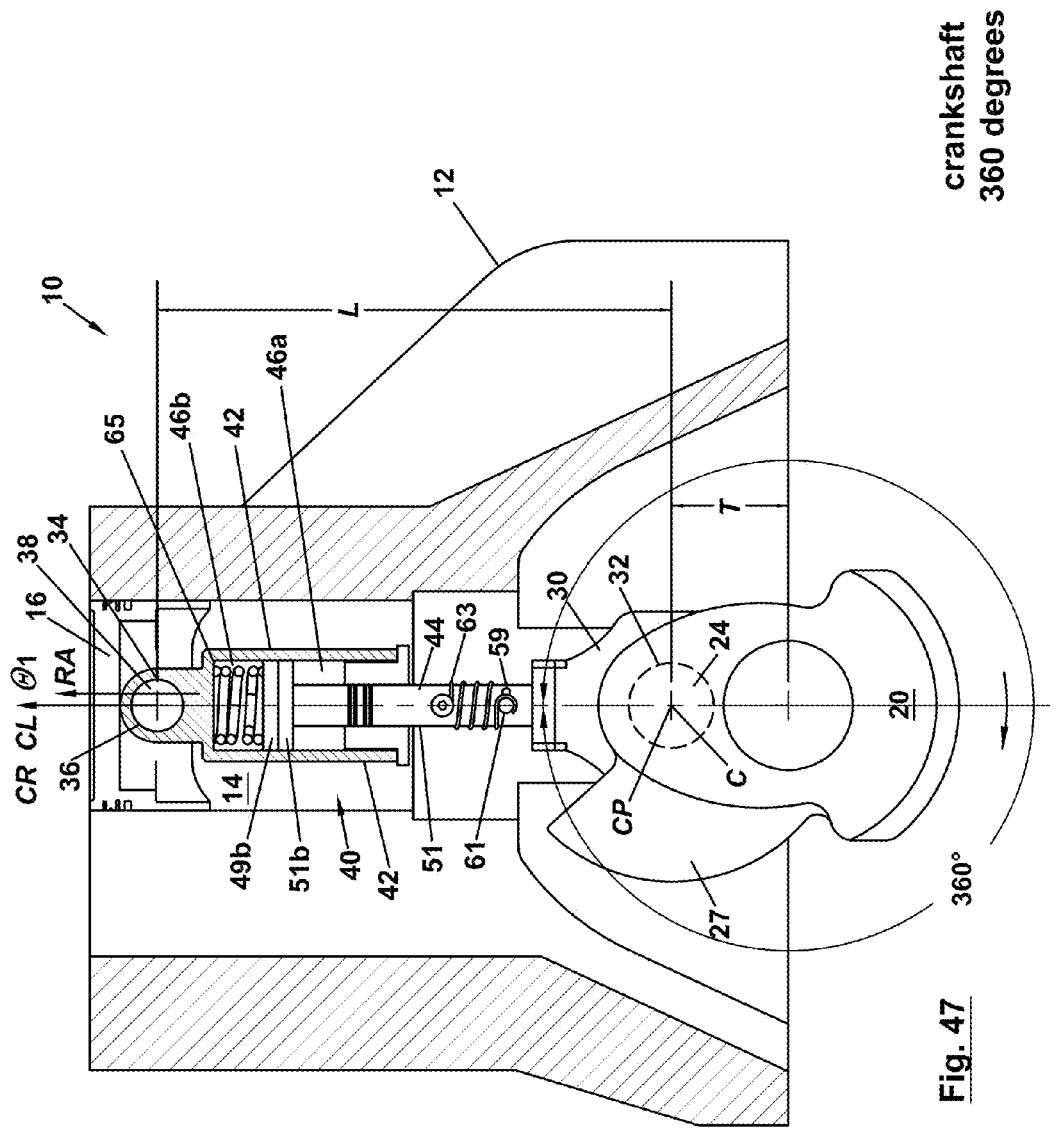
FIG. 47 is a schematic end section view of the exemplary embodiment shown in FIG. 31 with the radial axis angle of the crankshaft shown at 0/360 degrees.

Referring to FIG. 47, radial axis RA has rotated 360 degrees past first stroke termination angle $\theta_1$, thus completing a full revolution such that radial axis RA is aligned with cylinder axis CL in the exemplary embodiment shown. Piston portion 44 and cylinder portion 42 of hydraulic cylinder 40 have maintained the relative positions shown in FIG. 46. Thus, the effective length L of connecting rod 28 has remained the same as shown in FIG. 46 (or shortens to the effective length L shown in FIG. 46). As a result, piston 16 has continued to travel up cylinder 14, such that piston 16 has traveled back to its point of maximum upward travel relative to crankshaft axis CR (i.e., its upper position within cylinder 14).

As mentioned above, according to some embodiments, shortening of the effective length L of connecting rod 28 may be completed as the radial axis RA approaches the radial position shown in FIG. 47, and an upper surface of piston 16 abuts a damper 70 associated with cylinder head 13, thereby compressing piston portion 44 of hydraulic cylinder 40 into cylinder portion 42 (e.g., in a manner as shown in FIG. 15). For example, referring back to FIGS. 5A and 5B, cylinder head 13 may include damper 70, which may take the form of, for example, an internally-extending flange 72 formed of an energy absorbing structure. Flange 72 may be formed from an impact-resistant material, such as high-strength, impact-resistant tool steel, or any other suitable material known to those skilled in the art. Alternatively, or in addition, damper 70 may take the form of a shock absorber-type structure (not shown).

According to some embodiments, cylinder block 12 may have a greater distance d (e.g., see FIG. 32) between the bearings that support crankshaft 20 and the upper (or remote) end of cylinders 14 relative to a conventional cylinder block of corresponding configuration. As crankshaft 20 rotates through positions that result in crankpins 24 being laterally offset from the axes CL of cylinders 14, connecting rod 28 is subjected to increased bending stress. By increasing the distance d, the magnitude of the bending stress on connecting rod 28 may be reduced as crankshaft 20 rotates through positions resulting in bending stress in connecting rod 28. This may serve to increase the durability and/or service life of hydraulic cylinders 40.

In the exemplary manner described above, the effective length L of connecting rod 28 is variable, such that the distance between the center of pin 38, which operably couples connecting rod 28 to piston 16, and the center C of crankpin 24 is variable. More specifically, the distance between the center of first aperture 32 and the center of second aperture 36 is variable (see, e.g., FIGS. 40-47), the variability of the effective length L being facilitated in the exemplary embodiment by virtue of controlled extension and retraction of piston portion 44 of hydraulic cylinder 40 relative to cylinder portion 42. As radial axis RA rotates between first stroke termination angle $\theta_1$ and 180 degrees past first stroke termination angle $\theta_1$ (i.e., to second stroke termination angle $\theta_2$), the effective length initially increases, thereby delaying initiation of the power stroke, for example, until radial axis RA reaches a point, for example, at least 40 degrees past first stroke termination angle $\theta_1$ in the exemplary embodiment shown. Timing of the initiation of combustion may be tailored to take advantage of this delay. Thereafter, the effective length L remains substantially constant as radial axis RA continues to rotate toward an orientation 180 degrees past first stroke termination angle $\theta_1$. As the radial axis RA rotates between 180 and 360 degrees past first stroke termination angle $\theta_1$, the effective length L is reduced as piston portion 44 retracts into cylinder portion 42 of hydraulic cylinder 40.

According to some embodiments, the exemplary configuration and/or interaction can be tailored to achieve desired performance characteristics of exemplary engine 10, such as, for example, improved efficiency, improved power output, improved responsiveness, and/or improved torque. For example, the extension and retraction of piston portion 44 relative to cylinder portion 42 may be controlled to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10.

According to some embodiments, engine 10 may be configured to selectively operate in at least two modes, for example, a fixed-length mode and a variable-length mode.

For example, in a first mode of operation (i.e., a fixed-length mode), hydraulic cylinder 40 may be operated such that the effective length L is fixed regardless of the radial position of radial axis RA. More specifically, hydraulic cylinder 40 may be operated such that the minimum effective length L is fixed such that there is substantially no delay in the downward travel of piston 16 as radial axis RA travels from first stroke termination angle $\theta_1$ to 90 degrees, resulting in operation similar to a conventional engine of corresponding configuration. Effectively fixing the effective length L of connecting rod 28 may permit engine 10 to operate at relatively higher engine speeds when compared to operation in a mode in which the effective length L of connecting rod 28 is varied as described above with reference to FIGS. 40-47. Thus, operating according to the fixed-length mode may be desirable when it is anticipated that the rotational speed of crankshaft 20 will be relatively high and/or it is desirable to operate engine 10 at a higher power output than would be achievable in variable-length mode.

According to a second mode of operation, a variable-length mode of operation, the effective length L of connecting rod 28 may be varied, for example, as explained with respect to FIGS. 40-47 above. It may be desirable to operate engine 10 according to the variable-length mode of operation to achieve greater efficiency relative to the fixed-length mode of operation.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

FIGS. 48-63B schematically illustrate a fourth exemplary embodiment of engine 10. The exemplary embodiment shown in FIGS. 48-63B includes some features that are similar to the features of exemplary engine 10 shown in FIGS. 1-15. For example, similar to the exemplary engine 10 shown in FIGS. 1-15, exemplary engine 10 shown in FIGS. 48-63B includes a connecting rod configured to affect the length of the stroke of engine 10 via hydraulic operation.

Figure 48:
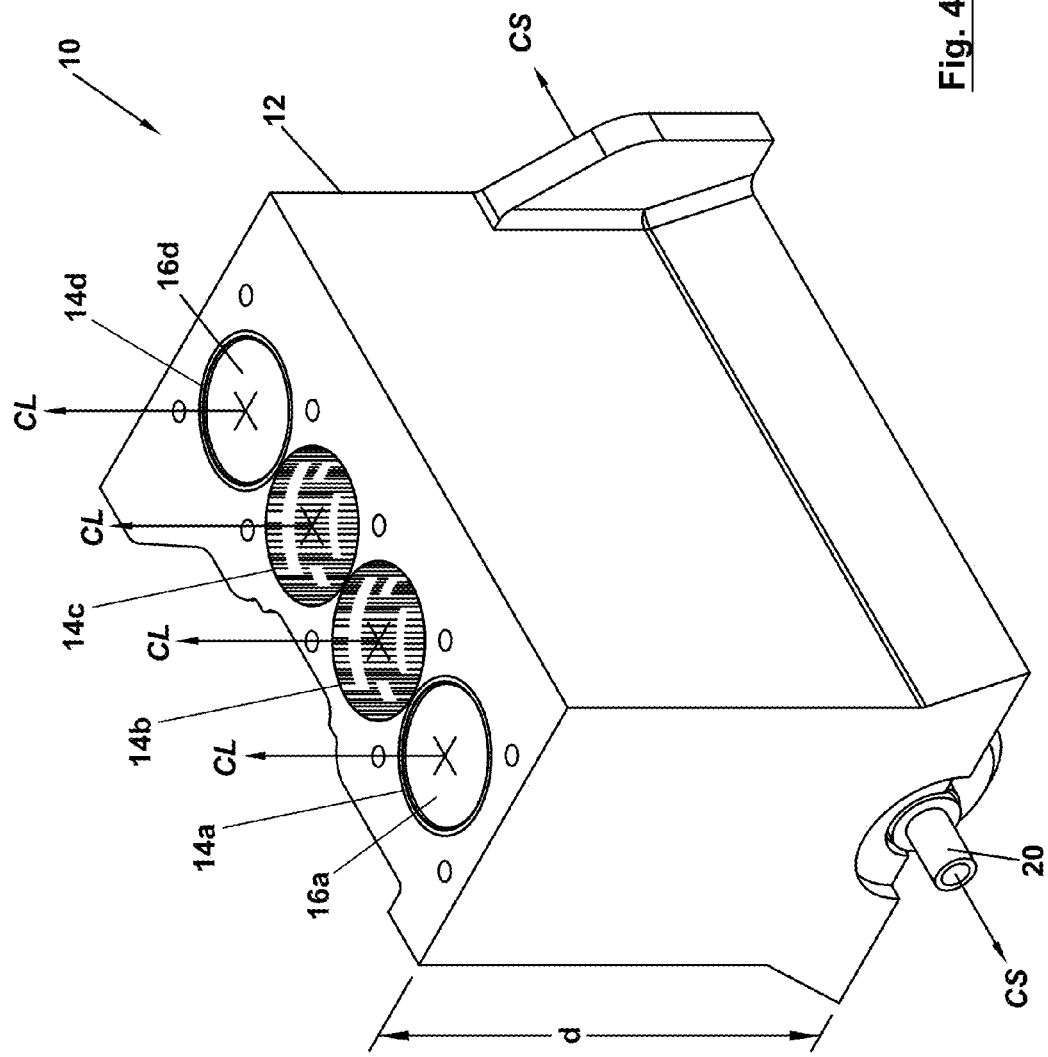
FIG. 48 is a schematic partial perspective view of a further exemplary embodiment of an internal combustion engine.

Exemplary engine 10 shown in FIGS. 48-63B is a reciprocating-piston internal combustion engine. As shown in FIG. 48, engine 10 includes a cylinder block 12 and a cylinder head (not shown). Cylinder block 12 defines a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 49:
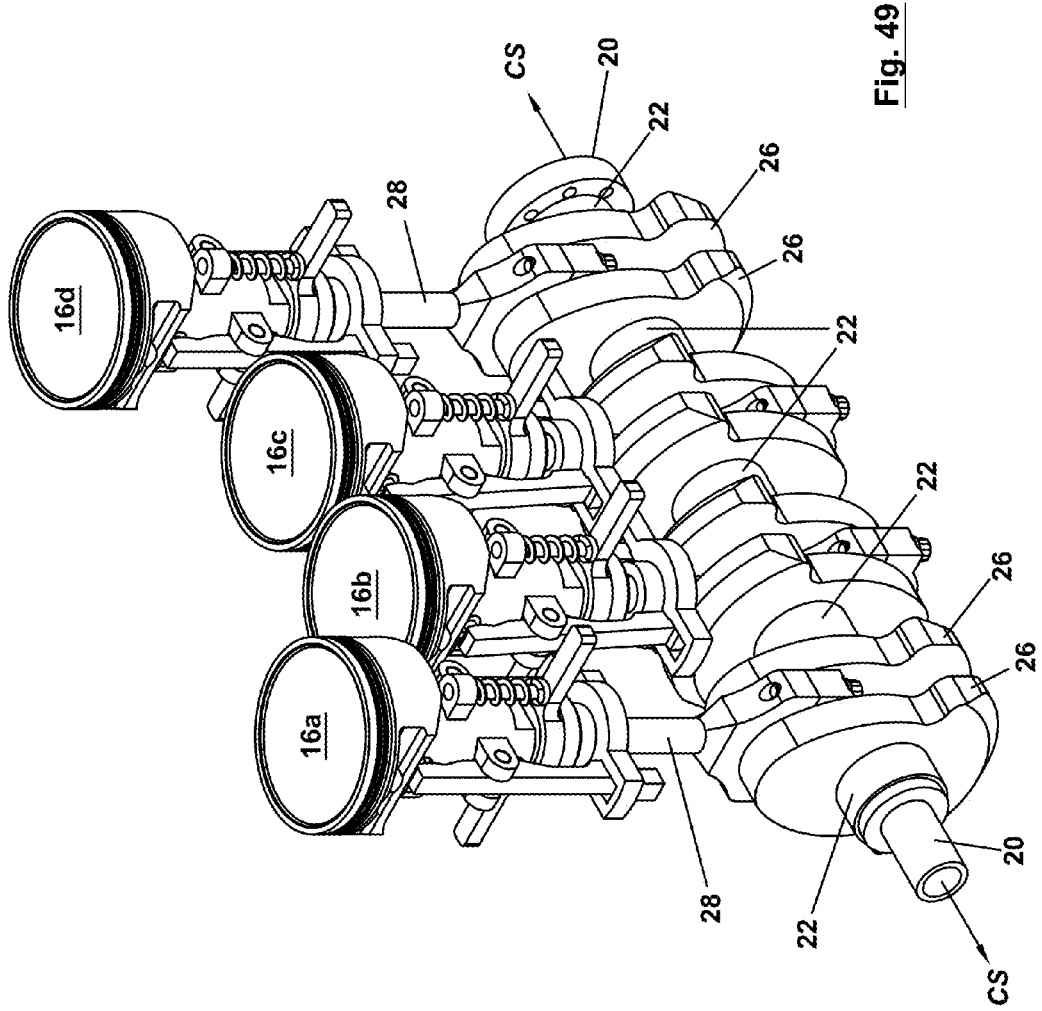
FIG. 49 is a schematic partial perspective view of a portion of the exemplary embodiment shown in FIG. 48.

As shown in FIGS. 48 and 49, exemplary engine 10 includes pistons 16 corresponding to cylinders 14, for example, four pistons 16a, 16b, 16c, and 16d (FIG. 49). As shown in FIG. 48, pistons 16a and 16d are positioned in the upper end (i.e., "upper" being relative to the orientation of engine 10 shown in FIG. 48) of cylinders 14a and 14d, respectively, while pistons 16b and 16c are not visible in FIG. 48 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Figure 50A:
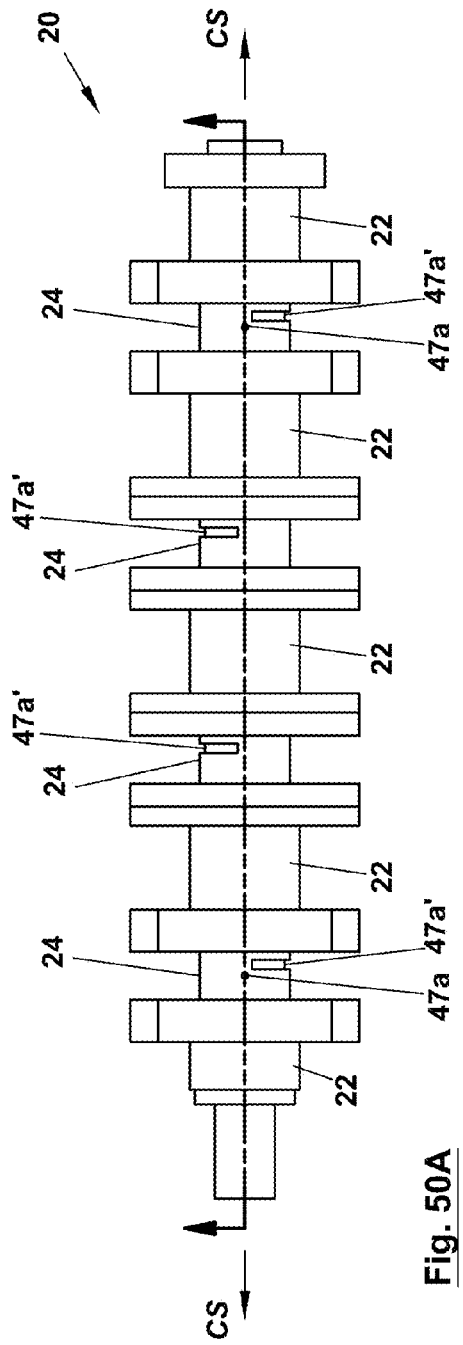
FIG. 50A is a schematic top view of an exemplary embodiment of a crankshaft for the exemplary embodiment shown in FIG. 48.
Figure 50B:
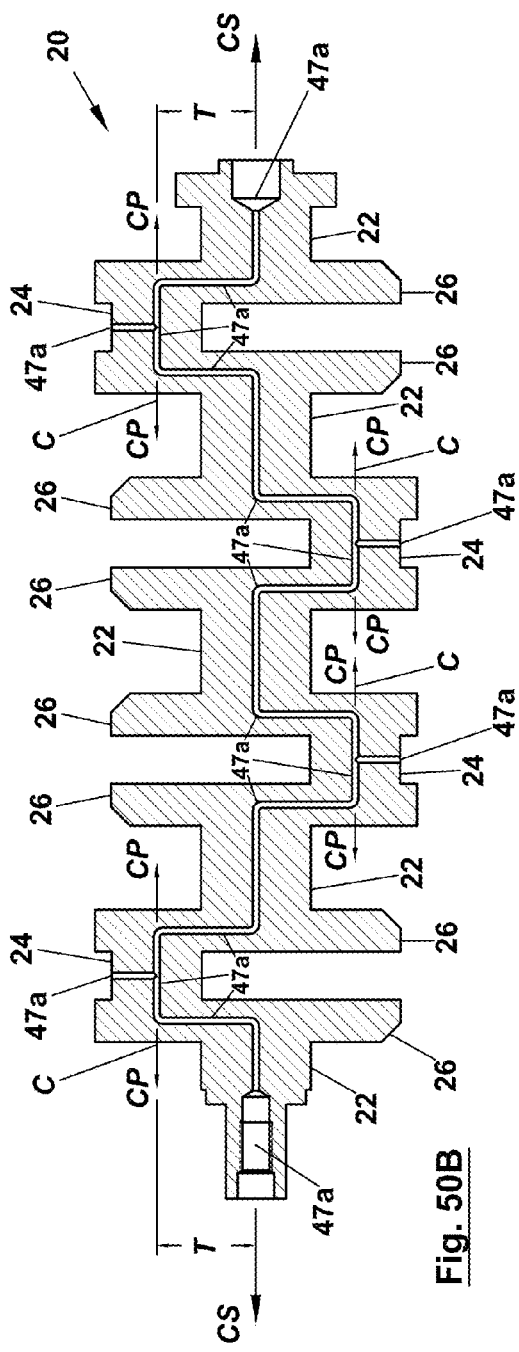
FIG. 50B is a schematic side section view the exemplary crankshaft shown in FIG. 50A.
Figure 52:
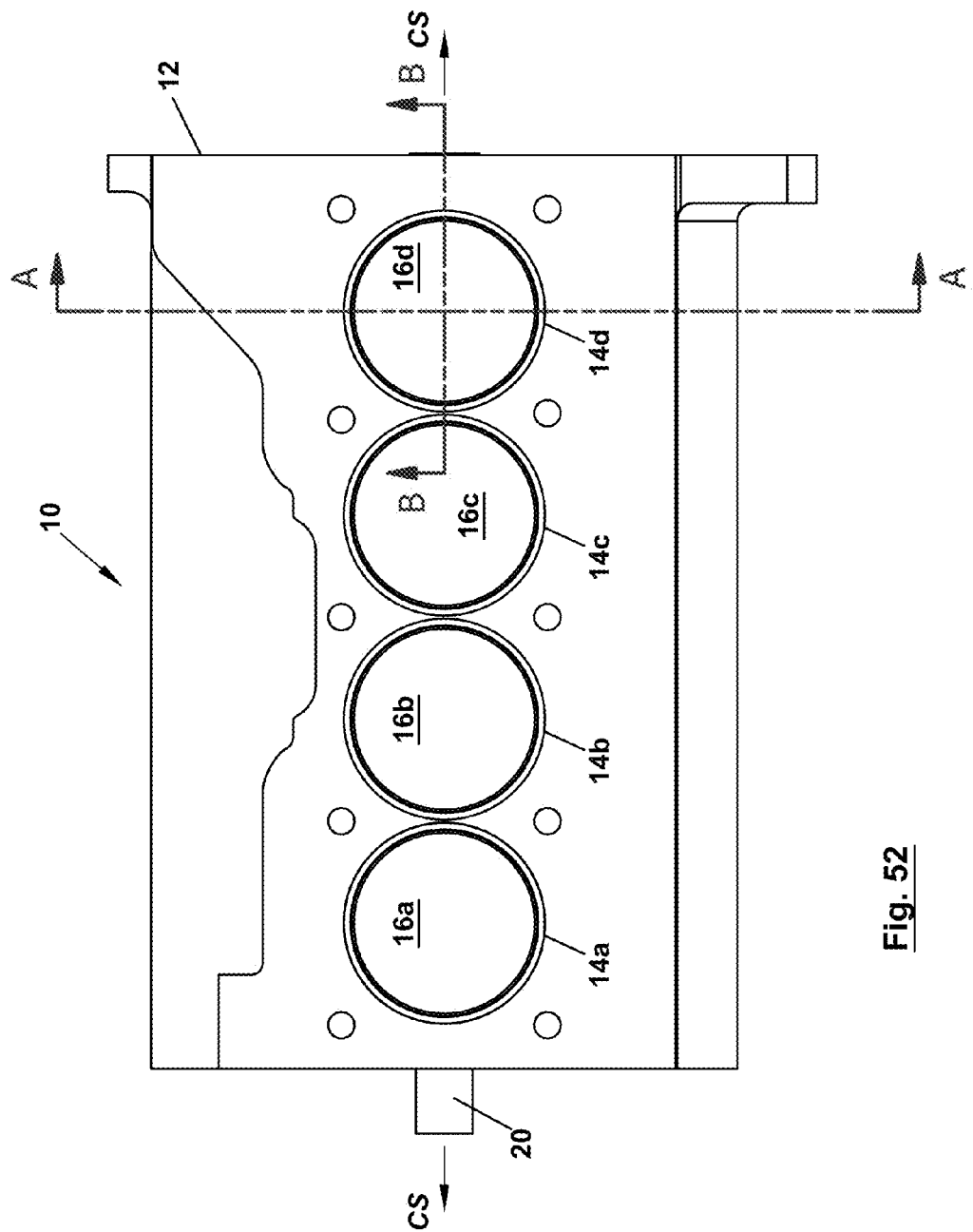
FIG. 52 is a schematic top view of the exemplary embodiment shown in FIG. 48.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIGS. 50A and 50B, crankshaft 20 defines a number of journals 22 corresponding to the number of bearings defined by cylinder block 12, and journals 22 are received by bearings, such that crankshaft 20 may rotate along longitudinal axis CS.

Exemplary crankshaft 20 also defines a number of crankpins 24 corresponding to the number of pistons 16. Crankpins 24 are circular in cross section, and the respective circular cross-sections may define a center C (see, e.g., FIG. 50B), which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T (see FIG. 50B) from the longitudinal axis CS of crankshaft 20. Crankshaft 20 may also include a number of counterbalance weights 26 for providing (or improving) rotational balance of crankshaft 20 when assembled with pistons 14 and connecting rods.

Referring to FIG. 49, for example, pistons 16 are operably coupled to crankpins 24 via a number of connecting rods 28 corresponding to the number of pistons 16. In particular, exemplary connecting rods 28 (see, e.g., FIGS. 49, 53A-53D, and 54A-54C) include a proximal end 30 having a first aperture 32 configured to receive crankpin 24, and a distal end 34 having a second aperture 36 for operably coupling connecting rod 28 to piston 16 via, for example, a pin 38.

According to the exemplary engine 10 shown in FIGS. 48-63B, exemplary connecting rod 28 is configured to have a variable length. In particular, exemplary connecting rod 28 defines a longitudinal length L between the center of first aperture 32 and the center of second aperture 36, or a longitudinal length between the center of first aperture 32 and an upper surface of piston 16. The longitudinal length L of connecting rod 28 may be selectively altered via, for example, hydraulic operation. For example, exemplary connecting rod 28 includes a hydraulic cylinder 40 including a cylinder portion 42 and a piston portion 44. In the example shown in FIG. 53A, cylinder portion 42 includes first aperture 32 for receiving crankpin 24, and piston portion 44 includes second aperture 36 for receiving pin 38, which couples connecting rod 28 to piston 16. Cylinder portion 42 and piston portion 44 define a fluid receiving chamber 46.

By selectively supplying fluid (e.g., hydraulic fluid such as oil) to fluid receiving chamber 46, the longitudinal length L of connecting rod 28 may be selectively varied. For example, as shown in FIG. 51A, a fluid line 48 is operably coupled to fluid receiving chamber 46 (e.g., via fluid passages 47*a*, 47*b*, and 47*c*), as explained in more detail below, to provide flow communication between fluid chamber 46 and a fluid circuit 50 (see FIGS. 51A and 51B). Fluid line 48 may be, for example, flexible high-pressure tubing known to those skilled in the art.

According to some embodiments, hydraulic cylinder 40 may be a single-acting cylinder configured such that fluid may be supplied under pressure to fluid chamber 46, depending on the desired operation of hydraulic cylinder 40. According to some embodiments, fluid may be supplied to hydraulic cylinder 40 under pressure via one or more fluid passages in one or more of crankshaft 20, crankpin 24, and connecting rod 28. For example, as shown in FIG. 50B, exemplary crankshaft 20 includes fluid passages 47*a*, which may be configured to receive fluid from fluid line 48 and supply pressurized fluid to crankpins 24, which may, in turn, supply pressurized fluid to connecting rods 28 via fluid passages 47*b* in connecting rods 28 (see, e.g., FIGS. 53A-53D and 54A-54C), which, in turn, supply fluid to fluid passages 47*c* in connecting rods 28 and to chamber 46.

According to some embodiments, crankshaft 20 may include drain grooves 47*a*' (see FIG. 50A) in crankpins 24. Drain grooves 47*a*' may be axially offset with respect to passages 47*a*, for example, as shown in FIG. 50A. Drain grooves 47*a*' are configured to cooperate with corresponding drain passages 47*c*' in connecting rod 28 (see FIGS. 53A-53D and 54A-54C) to provide flow communication between chamber 46 of connecting rod 28, so that when hydraulic cylinder 40 contracts (i.e., when it shortens the effective length L of connecting rod 28), fluid will be able exit chamber 46, as explained in more detail with respect to FIGS. 54A-54C. Exemplary passages 47*a* of crankshaft 20 and fluid passages 47*b*, 47*c*, and 47*c*' of connecting rods 28 may be configured, such that fluid is supplied to and/or drained from connecting rods 28 based on the relative radial position of first aperture 32 with respect to crankpin 24, as explained in more detail below.

Referring to FIGS. 51A and 51B, exemplary engine 10 shown in FIGS. 48-63B includes a fluid circuit 50 for supplying and receiving hydraulic fluid to and from hydraulic cylinder 40 of connecting rod 28. For example, as shown in FIG. 51A, exemplary fluid circuit 50 uses oil or other suitable lubricant for lubricating engine 10 as a source of fluid for operating hydraulic cylinder 40. For example, engine 10 includes a sump 52 for containing oil and a first oil pump 54 in flow communication with sump 52 for distributing the oil throughout engine 10. Exemplary fluid circuit 50 also includes a second oil pump 56 (e.g., a high-pressure oil pump of either fixed or variable capacity) in flow communication with sump 52 for supplying fluid to hydraulic cylinder 40 under pressure via line 48 and passages 47*a*-47*c*, as explained in more detail below. In addition, according to some embodiments, fluid circuit 50 may be configured to permit fluid to exit chamber 46 of hydraulic cylinder 40 as the effective length L of connecting rod 28 shortens. Exemplary fluid circuit 50 further includes one or more valves 58 to control the flow of fluid to hydraulic cylinder 40. For example, exemplary hydraulic cylinder 40 is a single-acting cylinder, and fluid circuit 50 may include a valve 58. Valve 58 may be any suitable valve known to those skilled in the art, such as, for example, a flow control valve, a directional control valve, a proportional directional control valve, and/or an electro-hydraulic servo valve.

Exemplary fluid circuit 50 also includes a controller 60 configured to control operation of pump 56 and/or valve 58. Exemplary controller 60 may be a microprocessor-based controller, such as, for example, a programmable or pre-programmed controller that operates digitally according to logic and/or algorithms stored either within controller 60 or downloaded remotely via physical connection and/or wireless communication link. Exemplary controller 60 may be integrated as part of, for example, an engine control module (not shown). Alternatively, exemplary controller 60 may be separate from an engine control module and/or may be operated in concert with an engine control module. Exemplary controller 60 may be configured (e.g., provided with programming) that provides control signals to pump 56 and/or valve 58, such that hydraulic cylinder 40 is operated in a manner described below with respect to FIGS. 53A-63B.

Exemplary fluid circuit 50 shown in FIG. 51A also includes a fluid cooler 62 configured to cool the oil in fluid circuit 50. Fluid cooler 62 may be any type of fluid cooler known to those skilled in the art, and fluid cooler 62 may be either a part of the customary cooling system of engine 10 or it may be separate from the customary cooling system of engine 10. Further, exemplary fluid circuit 50 may include a thermostat or other temperature regulating device 64 for generally maintaining the temperature of the fluid in a desired operating range once the fluid temperature reaches the desired operating temperature. According to some embodiments, temperature regulating device 64 may be controlled via controller 60.

Referring to FIG. 51B, exemplary fluid circuit 50 does not use the lubricant for lubricating engine 10 as a source of fluid for operating hydraulic cylinders 40. Rather, exemplary fluid circuit shown in FIG. 51B is self-contained and uses fluid that remains separate from the lubricant of engine 10. As shown in FIG. 51B, fluid circuit 50 includes a sump 54*b* that is not in flow communication with sump 52. Exemplary fluid circuit 50 shown in FIG. 51B may include one or more of the attributes of the exemplary fluid circuit shown in FIG. 51A.

Referring to FIGS. 52 and 53A-53C, hydraulic cylinder 40 of connecting rod 28 is configured to operate such that the effective length L of connecting rod 28 can be controlled. For example, referring to FIG. 53A, exemplary connecting rod 28 includes a length control mechanism 74 and a damping mechanism 76. Exemplary length control mechanism 74 is configured to permit change in the effective length L of connecting rod 28 in a controlled manner, and exemplary damping mechanism 76 is configured to shorten the effective length L of connecting rod 28.

Referring to FIGS. 53B and 54A, exemplary length control mechanism 74 includes cylinder portion 42. Cylinder portion 42 includes upper cylinder 78 and bushing 80 coupled to upper cylinder 78. Upper cylinder 78 includes opposing recesses 82, which receive pistons 84. Recesses 82 are inflow communication with chamber 46, and fluid supplied to chamber 46 acts on pistons 84, such that they extend beyond the circumference of upper cylinder 78. Upper cylinder 78 also includes opposing lower bosses 86 and opposing lower recesses 88. Lower recesses 88 receive rocker biasing members 90 (e.g., coil springs). Exemplary bushing 80 includes opposing bushing recesses 92, which receive cushions 94, and bushing 80 defines a radial seat 81.

Figure 54C:
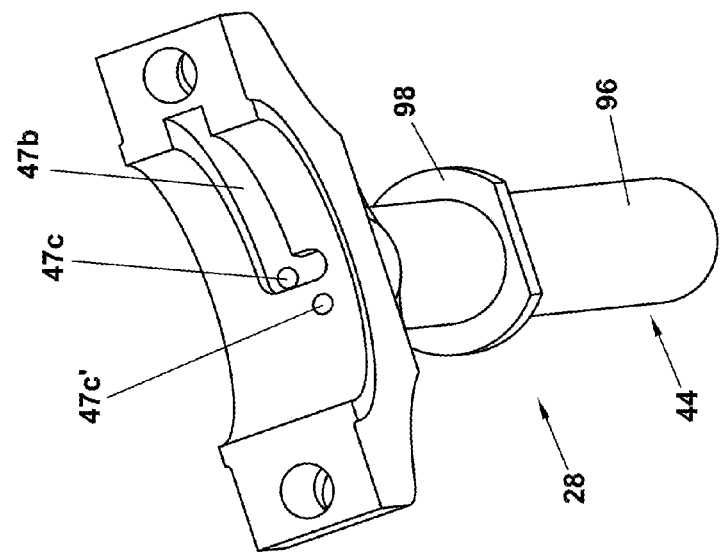
FIG. 54C is a schematic partial perspective view of the exemplary connecting rod shown in FIG. 54B viewed from another perspective.
Figure 54B:
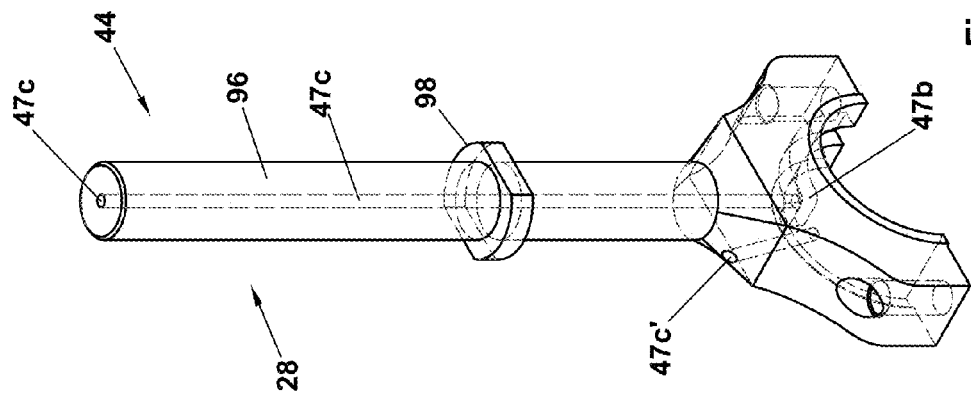
FIG. 54B is a schematic partial perspective view of the exemplary connecting rod shown in FIG. 54A.

Piston portion 44 of hydraulic cylinder 40 includes a shaft 96. Exemplary shaft 96 includes a stop flange 98 and fluid passage 47c, providing flow communication between passages 47a of crankshaft 20, passages 47b and 47c of connecting rod 28, and chamber 46 of hydraulic cinder 40. As shown in FIGS. 54B and 54C, passage 47c exits into passage 47b, which may take the form of a groove, which, in combination with the surface of crankpin 24, forms passage 47b, permitting the flow of fluid between passages 47a of crankshaft 20 and chamber 46 of hydraulic cylinder 40 of exemplary connecting 28.

According to some embodiments, connecting rod 28 includes a drain passage 47c', which is configured to permit fluid to flow from chamber 46 to the crankcase (not shown) of exemplary engine 10. For example, as shown in FIGS. 54B and 54C, drain passage 47c' provides flow communication between drain groove 47a' in crankpin 24 of crankshaft 20 (see FIG. 50A) and the crankcase when drain passage 47c' is radially aligned with drain groove 47a', as explained in more detail below. According to some embodiments, drain passage 47c' and drain groove 47a' are axially offset (i.e., with respect to the longitudinal axis CS of crankshaft 20) with respect to passage 47a of crankshaft 20, and groove 47b and passage 47c of connecting rod 28.

Exemplary length control mechanism 74 includes opposing rockers 100 pivotally-mounted at respective pivot points 102 on respective lower bosses 86. Rockers 100 include proximate ends 104 and distal ends 106. Distal ends 106 define short shoulders 108 and long shoulders 110. Length control mechanism 74 further includes a stop collar 112 having opposing apertures 114 for receiving respective distal ends 106 of rockers 100.

During operation, long shoulders 110 are configured to engage the upper surface of stop collar 112 adjacent apertures 114 (see, e.g., FIGS. 55A-57B), such that the effective length L of connecting rod 28 may maintain a lengthened configuration during an exemplary mode of operation, as explained in more detail below with respect to FIGS. 53A-62B. Short shoulders 108 are configured to engage the underside of stop collar 112 adjacent apertures 114 (see, e.g., FIGS. 63A and 63B), such that the effective length L of connecting rod 28 may maintain a shortened configuration during another exemplary mode of operation, as explained in more detail below with respect to FIGS. 63A and 63B.

Referring to FIGS. 53A and 54A, exemplary damping mechanism 76 is configured to reduce the impact of cylinder portion 42 as the effective length L of connecting rod 28 is reduced. In the exemplary embodiment shown, cylinder portion 42 includes a pair of upper bosses 116, which receive respective guides 118. A stop member 120 is received on radial seat 81 of bushing 80. Stop member 120 includes opposing lateral extensions 122 having opposing clearances 124 for receiving ends of respective guides 118. Springs 126 are received on respective guides 118 and extend between respective upper bosses 116 and lateral extensions 122. Springs 126 are compressed between upper bosses 116 and lateral extensions 122, such that they provide a biasing force that maintains the lateral extensions 122 of stop member 120 in a perpendicular relationship with respect to shaft 96 of connecting rod 28 (see, e.g., FIGS. 56A, 57A, and 59A).

Damping mechanism 76 further includes a pair of opposing recesses 128 in cylinder block 12 (see FIG. 53A), which receive respective damping pistons 130. Opposing stop plates 132 are mounted to cylinder block 12 adjacent to recesses 128. As explained in more detail below with respect to FIGS. 53A-62B, as lateral extensions 122 of stop member 120 approach damping pistons 130, lateral extensions 122 engage damping pistons 130, which provide a cushion before lateral extensions 122 abut stop plates 132, thus softening the contact between lateral extensions 122 and stop plates 132. Stop plates 132 may be mounted to cylinder block 12 via, for example, respective bolts 134. Stop plates 132 may be formed from an impact-resistant material, such as high-strength, impact-resistant tool steel, or any other suitable material known to those skilled in the art.

According to the exemplary embodiment shown in FIGS. 48-63B, operation of hydraulic cylinder 40 of connecting rod 28 may be controlled such that substantial movement of piston 16 toward crankshaft 20 during the power stroke is delayed until crankshaft 20 has rotated to point at which there is a more effective moment arm between connecting rod axis CR and radial axis RA extending between crankshaft axis CS and a respective crankpin axis CP. More specifically, operation of hydraulic cylinder 40 may be controlled via operation fluid circuit 50, such that fluid selectively flows to and from chamber 46, thereby changing the effective length L. For example, the effective length L may be lengthened as the radial axis RA sweeps from 0 degrees to, for example, about 40 degrees to offset the downward travel of crankpin center C, thereby delaying initiation of the downward stroke of piston 16. As a result, a greater amount of the energy of the combustion event may be captured because the maximum force acting on piston 16 coincides with a greater moment arm, thereby resulting in more torque at crankshaft 20 during the power stroke. Timing of the initiation of combustion may be tailored to take advantage of the delayed stroke.

During operation of exemplary engine 10, as crankshaft 20 rotates, crankpins 24 revolve around crankshaft longitudinal axis CS, such that crankpin centers C define a circular path having a radius defined by the distance T defined along a radial axis RA (see FIGS. 53A-62B) extending between the longitudinal axis CS of crankshaft 20 and the longitudinal axis CP of the respective crankpins 24. Thus, first apertures 32 of proximal end 30 of connecting rod 28, which are rotatably coupled with respect to crankpins 24, also revolve about the crankshaft axis CS. Distal end 34 of connecting rod 28 is constrained to move in a reciprocating and linear manner due to being operably coupled to piston 16, which is likewise constrained to move in a reciprocating and linear manner within respective cylinder 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS (as affected according to the exemplary operation described below).

During operation of a conventional engine, a piston reciprocates within the cylinder, such that during a power stroke of the internal combustion engine, combustion of an air/fuel mixture within a combustion chamber defined by the piston, the cylinder, and the cylinder-head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process in a conventional internal combustion engine may be less than desired.

Exemplary engine 10 is configured to employ a strategy that delays substantial movement of piston 16 toward crankshaft 20 during the power stroke, until crankshaft 20 has rotated to point at which there is a more effective moment arm between connecting rod axis CR and radial axis RA extending between crankshaft axis CS and a respective crankpin axis CP. As a result, a greater amount of the energy of the combustion event may be captured because the maximum force acting on piston 16 coincides with a greater moment arm, thereby resulting in more torque at crankshaft 20 during the power stroke.

FIGS. 53A-62B schematically illustrate exemplary operation of engine 10 having exemplary connecting rod 28, which serves to delay piston 16's travel at the beginning of the power stroke of exemplary engine 10. In particular, by selectively activating hydraulic cylinder 40 of connecting rod 28, the distance between the center CP of crankpin 24 and the center of pin 38 (i.e., the effective length L of connecting rod 28) may be selectively varied. Such an exemplary embodiment renders it possible to effectively hold piston 16 in cylinder 14 at a substantially fixed position for a short period of time, even as crankpin 24 continues to revolve around crankshaft 20's axis CS as crankshaft 20 rotates. As a result, it is possible to hold piston 16 at the point of highest compression in the combustion chamber while crankpin 24 revolves to a position, which results in an increased moment arm defined by the radial axis RA extending between the center of crankshaft 20 and the center C of crankpin 24 and the axis CR of connecting rod 28. This results in relatively more torque being applied to crankshaft 20 as combustion begins with piston 16 still remaining at a point of farthest from the center of crankshaft 20 (i.e., at the end of its upward stroke as shown). In this exemplary manner, the delaying strategy outlined below may be implemented.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

For example, as shown in FIGS. 53A and 53B, crankshaft 20 is oriented such that radial axis RA defined by the center of crankshaft 20 and the center of crankpin 24 is oriented at zero degrees, which corresponds generally a first stroke termination angle $\theta_1$ that generally coincides with the end of the compression stroke of exemplary engine 10. Thus, with radial axis RA in this orientation, piston 16 is at its upper position within cylinder 14.

As shown in FIG. 53A, during operation of engine 10 crankshaft 20 rotates in the clockwise direction. Hydraulic cylinder 40 is in a configuration such that piston 16 is at the top of its stroke while the radial axis RA of crankshaft 20 is substantially aligned with the longitudinal axis CR of connecting rod 28. In particular, piston portion 44 of hydraulic cylinder 40 is in a position relative to cylinder portion 42 such that piston 16 is at the top of its stroke. As shown in FIG. 53A, biasing member 65 in chamber 46 is in an at least partially compressed configuration. This corresponds to piston portion 44 of hydraulic cylinder 40 being in a position relative to cylinder portion 42 that results in a shortening of the effective length L of connecting rod 28.

Referring to FIG. 53A, lateral extensions 122 of damping mechanism 76 are against stop plates 132, with damping pistons 130 compressed into respective recesses 128 in cylinder block 12. Referring to FIG. 53B, connecting rod 28 is in a configuration such that the effective length L is shortened. That is, piston portion 44 of hydraulic cylinder 40 is retracted into cylinder portion 42. As shown in FIGS. 53A and 53B, fluid passages 47a in crankshaft 20 have rotated to a position providing flow communication between fluid in passages 47a and fluid passages 47b and 47c of connecting rod 28. For example, fluid circuit 50 may provide pressurized fluid to passages 47a and by virtue passage 47a aligning with passage 47b, fluid is just beginning to be supplied to chamber 46. Thus, pistons 84 are beginning to extend from recesses 82, which are, in turn, beginning to apply force to proximate ends 104 of rockers 100. As a result, rockers 100 are beginning to pivot on lower bosses 86, thereby counteracting forces applied to rockers 100 via biasing members 90, so that short shoulders 108 are disengaging and clearing the edges of apertures 114 of stop collar 112. In contrast to the flow communication between passages 47a, 47b, and 47c, drain groove 47a' of crankpin 24 is not aligned with drain passage 47c' of connecting rod 28 (see FIG. 53D). Thus, flow communication between chamber 46 and the crankcase of exemplary engine 10 is not provided, and fluid is not permitted to drain from connecting rod 28.

FIGS. 55A and 55B show crankshaft 20 in an orientation where radial axis RA has rotated 40 degrees past first stroke termination angle $\theta_1$. In a conventional engine, piston 16 would have traveled a significant distance toward crankshaft axis CS by this point of rotation of crankshaft 20. In contrast, according to exemplary engine 10, piston 16 has not yet started its downward travel toward crankshaft axis CS. Instead, piston portion 44 of hydraulic cylinder 40 has increased its extension from cylinder portion 42, thus increasing the effective length L of connecting rod 28. As a result of the increase in the effective length L, piston 16 has not traveled down cylinder 14 (as shown), even though crankpin 24 has rotated clockwise relative to the center C of crankshaft 20, such that the center C of crankpin 24 is farther from the top of cylinder 14. (See Table IV below showing an exemplary relationship for exemplary engine 10 between radial axis RA's angle and piston 16's displacement relative to the first stroke termination angle $\theta_1$.)

TABLE IV

RADIAL AXIS RA ANGLE VS. PISTON DISPLACEMENT
RELATIVE TO ZERO DEGREES FOR FIGS. 48-63B

| Crank Angle | Piston Depth |
|---|---|
| 0 | 0.000 |
| 4 | 0.000 |
| 8 | 0.000 |
| 12 | 0.000 |
| 16 | 0.000 |
| 20 | 0.000 |
| 24 | 0.000 |
| 28 | 0.000 |
| 32 | 0.000 |
| 36 | 0.000 |
| 40 | 0.000 |
| 44 | 0.102 |
| 48 | 0.211 |
| 52 | 0.327 |
| 56 | 0.448 |
| 60 | 0.574 |
| 64 | 0.703 |
| 68 | 0.836 |
| 72 | 0.971 |
| 76 | 1.108 |
| 80 | 1.246 |
| 84 | 1.384 |
| 88 | 1.521 |
| 92 | 1.657 |
| 96 | 1.791 |
| 100 | 1.923 |
| 104 | 2.051 |
| 108 | 2.176 |
| 112 | 2.296 |
| 116 | 2.412 |
| 120 | 2.522 |
| 124 | 2.627 |
| 128 | 2.727 |
| 132 | 2.819 |
| 136 | 2.906 |
| 140 | 2.985 |
| 144 | 3.058 |
| 148 | 3.123 |
| 152 | 3.181 |
| 156 | 3.232 |
| 160 | 3.275 |
| 164 | 3.310 |
| 168 | 3.338 |
| 172 | 3.358 |
| 176 | 3.369 |
| 180 | 3.373 |

In particular, during crankshaft 20's rotation from the position shown in FIG. 53B, fluid has expanded chamber 46 due to the flow communication between passages 47a-47c and chamber 46. In addition, fluid supplied to chamber 46 drives pistons 84, so that they extend from recesses 82. As a result, pistons 84 apply force against proximate ends 104 of rockers 100, causing them to pivot against biasing members 90. By virtue of rockers 100 pivoting in this manner, the intermediate portions of rockers 100 abut against respective cushions 94 in bushing 80. Further, long shoulders 110 of rockers 100 abut the upper surface of stop collar 112 adjacent apertures 114. So long as pressure is applied via fluid to pistons 84, rockers 100 retain the effective length L of connecting rod 28 in its extended configuration. Thus, as the force of combustion is applied against piston 16, rockers 100 act to maintain connecting rod 28 in its extended configuration.

Fluid supplied by fluid circuit 50 flows within piston portion 44 of hydraulic cylinder 40 and into chamber 46. This may be accomplished, for example, by one of the exemplary fluid circuits 50 shown in FIGS. 51A and 51B. For example, controller 60 sends one or more signals to valve(s) 58 and/or pump 56, such that hydraulic fluid is supplied to chamber 46 in a controlled manner, such that piston portion 44 of hydraulic cylinder 40 extends farther out of cylinder portion 42, thereby increasing the effective length L of connecting rod 28. As fluid flows into chamber 46, chamber 46 is expanded with the assistance of biasing member 65, which provides an extension force against the end of shaft 96 to expand chamber 46. As a result, the effective length L of connecting rod 28 increases, such that rather than beginning downward travel in cylinder 14, piston 16 remains substantially in its position of maximum stroke.

Exemplary controller 60 may be configured to receive signals that provide it with an indication regarding the radial position of radial axis RA. Controller 60 may be programmed to determine, based on such signals, timing for extending and/or retracting piston portion 44 of hydraulic cylinder 40 relative to cylinder portion 42 of hydraulic cylinder 40 according to the exemplary manner described herein. For example, upon receipt of signals indicating the radial position of radial axis RA, controller 60 may electronically perform an algorithm that results in sending signals to valve(s) 58 and/or pump 56, such that they are operated in a manner resulting in the exemplary operation of hydraulic cylinder 40 described herein.

Referring to FIG. 55A, lateral extensions 122 of damping mechanism 76 are still against stop plates 132, with damping pistons 130 compressed into respective recesses 128 in cylinder block 12. However, relative to FIG. 53A, the axis CR of connecting rod 28 is no longer aligned with the axis CL of cylinder 14. Radial seat 81 of bushing 80 permits stop member 120 to pivot with respect to shaft 96 of connecting rod 28, while springs 126 act to permit this pivoting action in a restrained manner.

In the exemplary manner described above, length control mechanism 74 maintains the effective length L of connecting rod 28 in an extended configuration rather than allowing chamber 46 to collapse as combustion forces piston 16 down cylinder 14. As a result, force from combustion is transferred to crankpin 24, thereby driving crankshaft 20 in a clockwise direction as shown. Although the exemplary embodiment shown in FIGS. 48-62B shows the point at which combustion to be where radial axis RA has rotated 40 degrees past first stroke termination angle $\theta_1$, this point may be between 40 and 60 degrees past first stroke termination angle $\theta_1$ (e.g., 59 degrees, 55 degrees, 50 degrees, 45 degrees, or 41 degrees). According to some embodiments, the radial position at which the piston portion 44 ceases to extend farther out of cylinder portion 42 may be adjusted during operation according to predetermined criteria in order to tailor operation of engine 10, for example, with the aid of controller 60 of fluid circuit 50.

Referring to FIGS. 56A and 56B, when the radial axis RA has rotated to 90 degrees past the first stroke termination angle $\theta_1$, piston 16 has traveled about 1.6 inches down cylinder 14 relative to its point of maximum extension from crankshaft axis CR. (See Table IV.) This results from piston portion 44 of hydraulic cylinder 40 maintaining its relative position with respect to cylinder portion 42 due to the interaction between rockers 100 and stop collar 112 and/or the fluid within chamber 46. Passages 47a-47c remain in flow communication with one another, thus keeping pistons 84 extended against rockers 100. As a result, the effective length L of connecting rod 28 remains fixed as the radial axis RA rotates from 40 degrees to 90 degrees past the first stroke termination angle $\theta_1$.

As shown in FIG. 56A, lateral extensions 122 of stop member 120 have disengaged from stop plates 132 and damping pistons 130. Stop member 120 remains engaged with radial seat 81 of bushing 80, which has moved away from stop collar 112 by virtue of the lengthening of connecting rod 28. Springs 126 act against stop member 120, such that stop member 120 is perpendicular relative to shaft 96 of connecting rod 28.

Figures 57A, 57B:
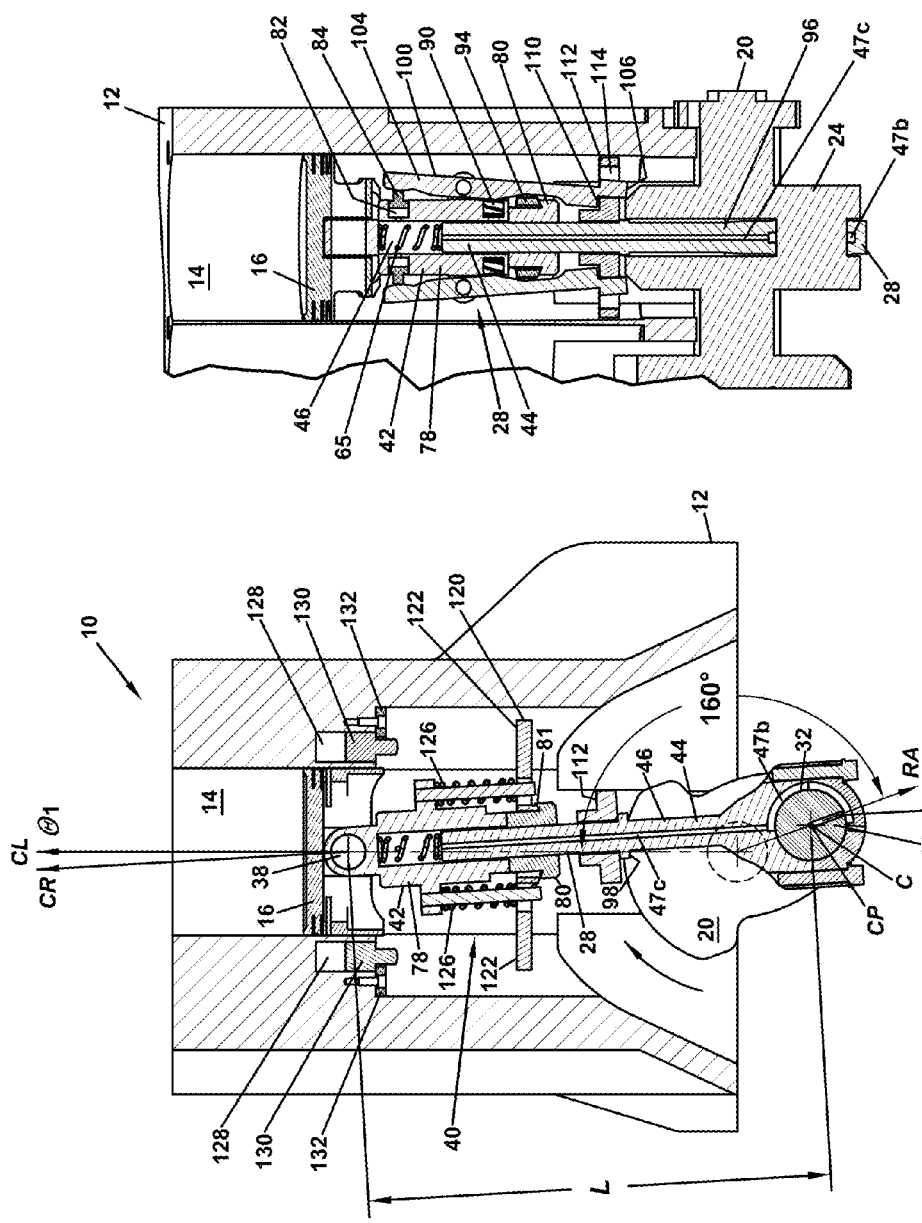
FIG. 57A is a schematic end section view taken along line A-A of FIG. 53 with the radial axis angle of the crankshaft shown at 160 degrees.
FIG. 57B is a schematic side section view taken along line B-B of FIG. 53 with the radial axis angle of the crankshaft shown at 160 degrees.

Referring to FIGS. 57A and 57B, radial axis RA has rotated to 160 degrees past the first stroke termination angle $\theta_1$, and piston 16 has traveled about 3.275 inches down cylinder 14 relative to its point of maximum extension from crankshaft axis CR. (See Table IV.) Piston portion 44 of hydraulic cylinder 40 has maintained its relative position with respect to cylinder portion 42 due to the interaction between rockers 100 and stop collar 112 and/or the fluid within chamber 46. Passages 47*a*-47*c* remain in flow communication with one another, and pistons 84 continue to extend against rockers 100. As a result, the effective length L of connecting rod 28 remains fixed as the radial axis RA rotates from 90 degrees to 160 degrees past the first stroke termination angle $\theta_1$.

As shown in FIG. 57A, lateral extensions 122 of stop member 120 continue to be disengaged from stop plates 132 and damping pistons 130. Stop member 120 remains engaged with radial seat 81 of bushing 80, which continues to be spaced from stop collar 112 by virtue of the lengthening of connecting rod 28. Springs 126 act against stop member 120, such that stop member 120 is perpendicular relative to shaft 96 of connecting rod 28.

Figures 58A, 58B:
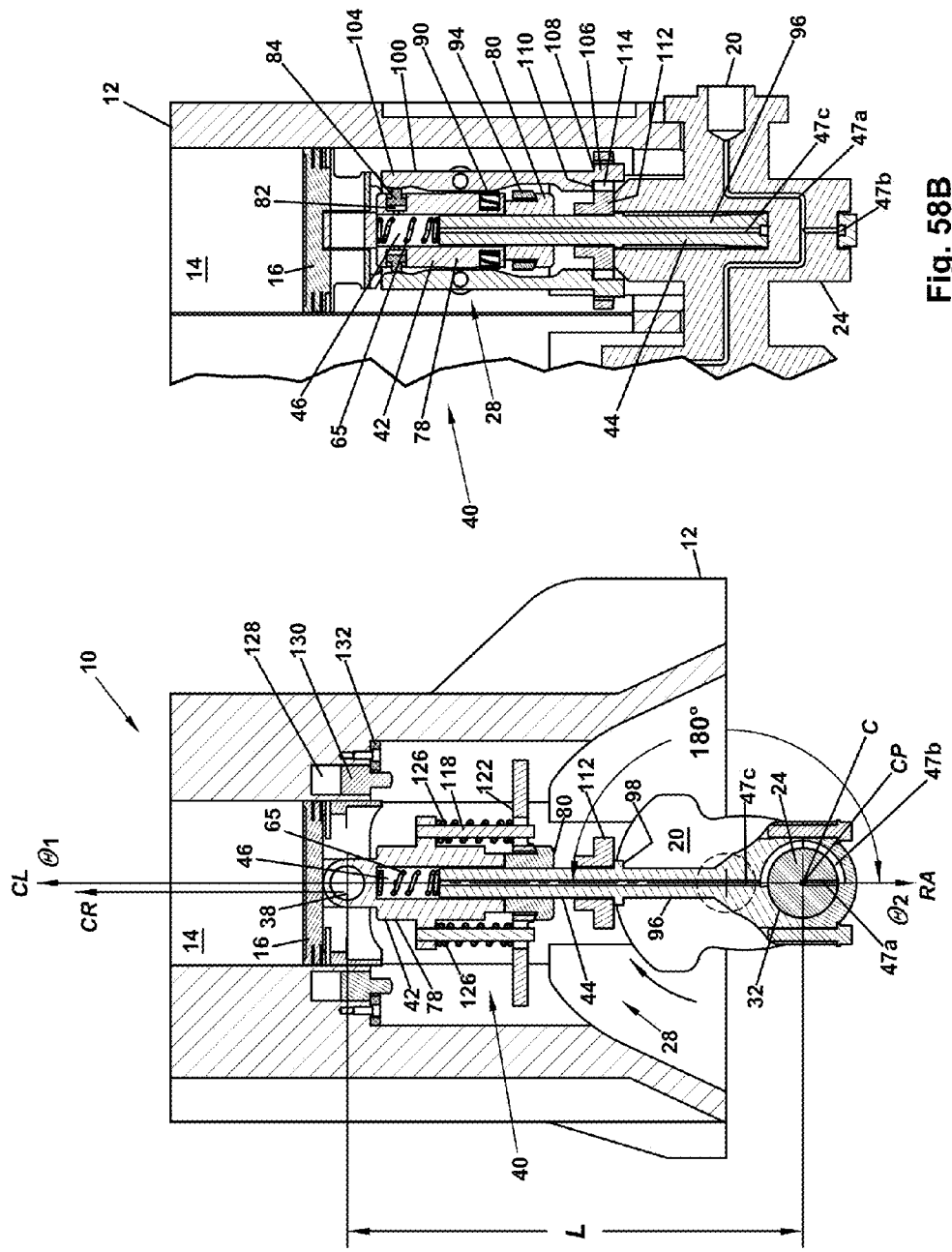
FIG. 58A is a schematic end section view taken along line A-A of FIG. 53 with the radial axis angle of the crankshaft shown at 180 degrees.
FIG. 58B is a schematic side section view taken along line B-B of FIG. 53 with the radial axis angle of the crankshaft shown at 180 degrees.

Referring to FIGS. 58A and 58B, radial axis RA has rotated 180 degrees past first stroke termination angle $\theta_1$ (i.e., at a second stroke termination angle $\theta_2$, which corresponds to the end of the power stroke). Piston portion 44 and cylinder portion 42 of hydraulic cylinder 40 have maintained the relative positions shown in FIGS. 54A-57B. Thus, piston 16 has continued to travel down cylinder 14, such that piston 16 has traveled 3.373 inches down cylinder 14 relative to its point of maximum extension from crankshaft axis CR. (See Table IV.)

However, as radial axis RA reaches this point, passage 47*a* is no longer in flow communication with passage 47*b* and 47*c* or chamber 46. Thus, pistons 84 no longer extend from recesses 82. Thus, rocker biasing members 90 act against respective rockers 100, such that rockers 100 pivot, so that long shoulders 110 move laterally outward to a point at which they can extend into apertures 114 of stop collar 112.

As shown in FIG. 58A, lateral extensions 122 of stop member 120 continue to be disengaged from stop plates 132 and damping pistons 130. Stop member 120 remains engaged with radial seat 81 of bushing 80, which continues to be spaced from stop collar 112 by virtue of the lengthening of connecting rod 28. Springs 126 act against stop member 120, such that stop member 120 is perpendicular relative to shaft 96 of connecting rod 28.

Figure 58C:
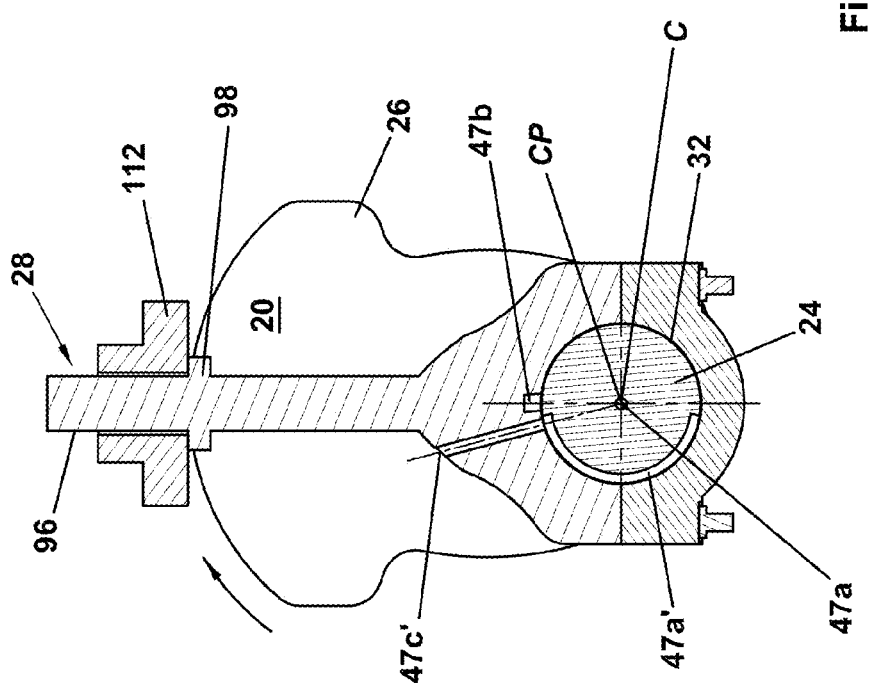
FIG. 58C is a schematic end section view taken along line H-H of FIG. 53C with the radial axis angle of the crankshaft shown at 180 degrees.

Unlike passages 47*a*-47*c*, drain groove 47*a*' of crankpin 24 now begins to register with drain passage 47*c*', as shown in FIG. 58C. As a result, fluid is permitted to flow from chamber 46 of hydraulic cylinder 40 to the crankcase of exemplary engine 10 via passage 47*c*, drain groove 47*a*', and drain passage 47*c*'. Thus, in embodiments with such drain grooves and passages, chamber 46 of hydraulic cylinder 40 is permitted to collapse, thus shortening the effective length L of connecting rod 28. The radial position and/or length of drain groove 47*a*' may be tailored to provide the desired timing and/or duration of drainage of fluid from chamber 46. Alternatively, or in addition, such drainage may permitted and/or controlled via a fluid circuit such as, for example, the exemplary fluid circuits 50 shown in FIGS. 51A and 51B.

Figure 59C:
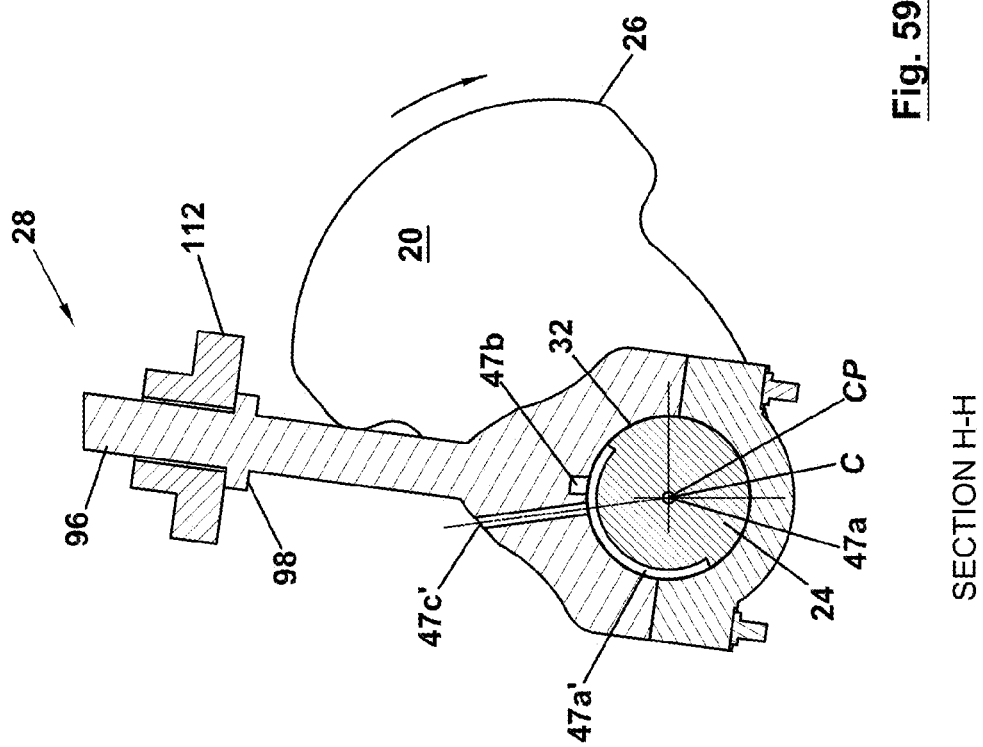
FIG. 59C is a schematic end section view taken along line H-H of FIG. 53C with the radial axis angle of the crankshaft shown at 230 degrees.

Referring to FIGS. 59A-59C, radial axis RA has rotated 230 degrees past first stroke termination angle $\theta_1$. Thus, crankpin 24's center C has reversed vertical direction, such that it begins to approach cylinder 14. Passage 47*a* continues to not be in flow communication with passages 47*b* and 47*c* or chamber 46. Thus, rocker biasing members 90 push respective rockers 100 outward, and rockers 100 begin to extend farther into apertures 114 of stop collar 112. As a result, rockers 100 no longer hold connecting rod 28 in its lengthened configuration.

As shown in FIG. 59A, although stop member 120 has begun to move back toward stop plates 132 and damping pistons 130, lateral extensions 122 of stop member 120 remain spaced from stop plates 132 and damping pistons 130. Stop member 120 remains engaged with radial seat 81 of bushing 80, which continues to be spaced from stop collar 112. Springs 126 continue to act against stop member 120, such that stop member 120 is perpendicular relative to shaft 96 of connecting rod 28.

As shown in FIG. 59C, drain groove 47*a*' of crankpin 24 continues to be registered with drain passage 47*c*' of connecting rod 28, thus permitting fluid to flow from chamber 46 of hydraulic cylinder 40 to the crankcase of exemplary engine 10 via passage 47*c*, drain groove 47*a*', and drain passage 47*c*'. Thus, chamber 46 of hydraulic cylinder 40 is permitted to continue to collapse and shorten the effective length L of connecting rod 28. Drain groove 47*a*' and/or drain passage 47*c*' may be configured to provide such drainage until the radial axis RA has rotated to an angle of, for example, up to 360 degrees past first stroke termination angle $\theta_1$. After that angle, the drain groove 47*a*' and drain passage 47*c*' are no longer registered with one another, and thus, flow communication between chamber 46 of hydraulic cylinder 40 and the crankcase of engine 10 is cut off. However, after that angle, passages 47*a* and 47*b* may begin to register with one another, such that flow communication may be provided between fluid circuit 50 and chamber 46, so that chamber 46 can expand, thereby lengthening the effective length L of connecting rod 28 as radial axis RA sweeps past zero/360 degrees (see, e.g., FIGS. 62A and 62B).

Figure 60B:
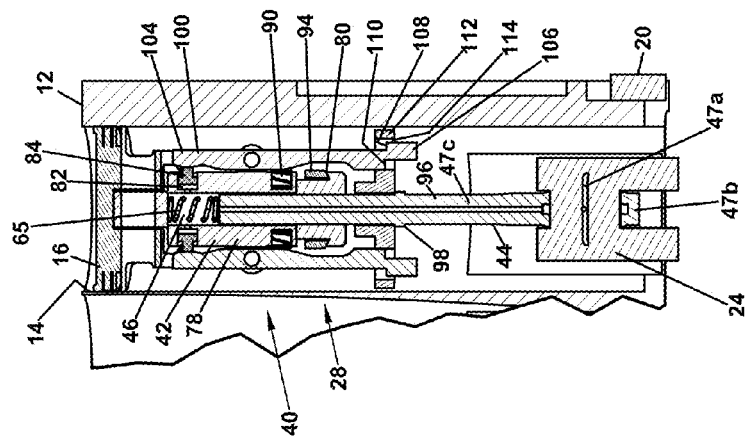
FIG. 60B is a schematic side section view taken along line B-B of FIG. 53 with the radial axis angle of the crankshaft shown at 320 degrees.
Figure 60A:
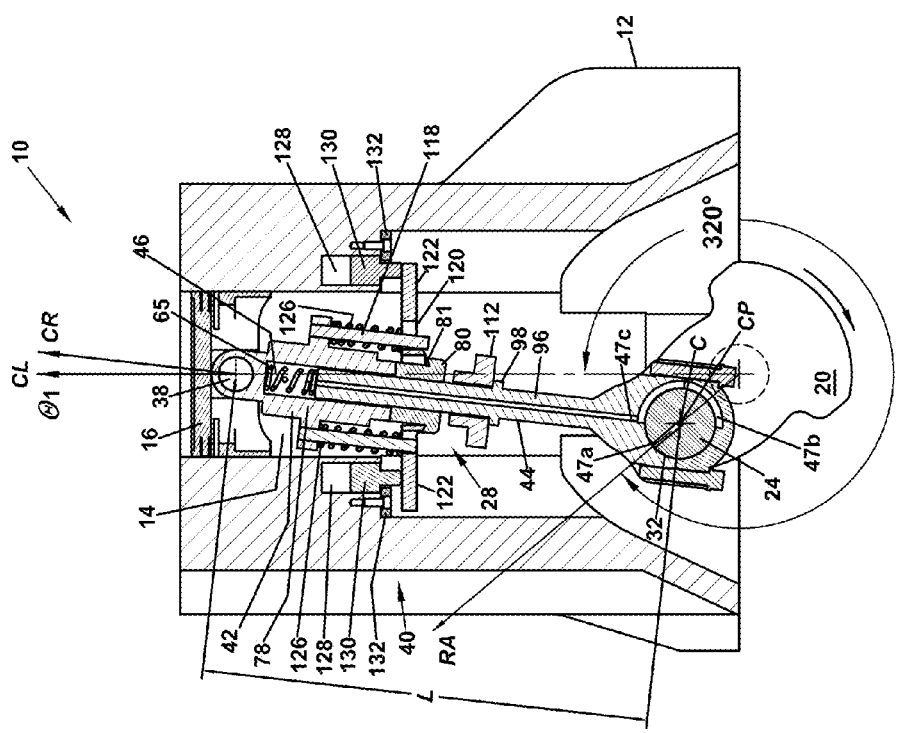
FIG. 60A is a schematic end section view taken along line A-A of FIG. 53 with the radial axis angle of the crankshaft shown at 320 degrees.

Referring to FIGS. 60A and 60B, radial axis RA has rotated 320 degrees past first stroke termination angle $\theta_1$. As this point, lateral extensions 122 of stop member 120 have begun to push against damping pistons 130. Passages 47*a*-47*c* and chamber 46 are still not in flow communication with one another. Thus, referring FIG. 60B, distal ends 106 of rockers 100 begin to extend farther into apertures 114 of stop collar 112, and the effective length L of connecting rod 28 begins to shorten. In other words, as stop member 120 abuts damping pistons 130, cylinder portion 42 of hydraulic cylinder 40 is forced down onto piston portion 44, with neither fluid in chamber 46 nor rockers 100 preventing the contraction of chamber 46. Springs 126 on respective guides 118 permit stop member 120 to pivot in radial seat 81 of bushing 80 while lateral extensions 122 begin to abut damping pistons 130.

Referring to FIGS. 61A and 61B, radial axis RA has rotated 335 degrees past first stroke termination angle $\theta_1$. As this point, lateral extensions 122 of stop member 120 have compressed respective damping pistons 130 and abut respective stop plates 132. Passages 47*a*-47*c* and chamber 46 are still not in flow communication with one another, and distal ends 106 of rockers 100 extend farther into apertures 114 of stop collar 112, as cylinder portion 42 of connecting rod 28 is forced down onto piston portion 44, further shortening the effective length L of connecting rod 28. More specifically, downward force on lateral extensions 122 is transferred to radial seat 81 of bushing 80. Radial bushing 80, by virtue of being coupled to upper cylinder 78, pulls upper cylinder 78 downward with respect to shaft 96 of connecting rod 28, thereby shortening the effective length L of connecting rod 28.

Figure 62B:
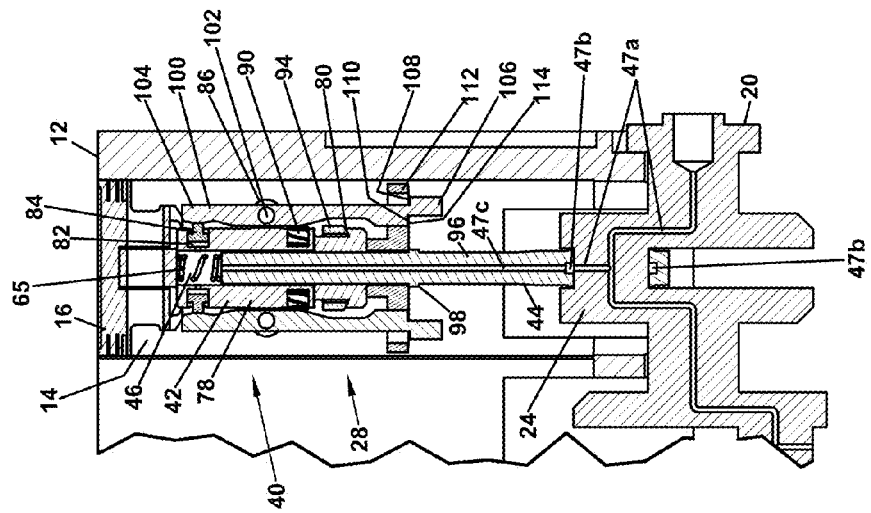
FIG. 62B is a schematic side section view taken along line B-B of FIG. 53 with the radial axis angle of the crankshaft shown at 0/360 degrees.
Figure 62A:
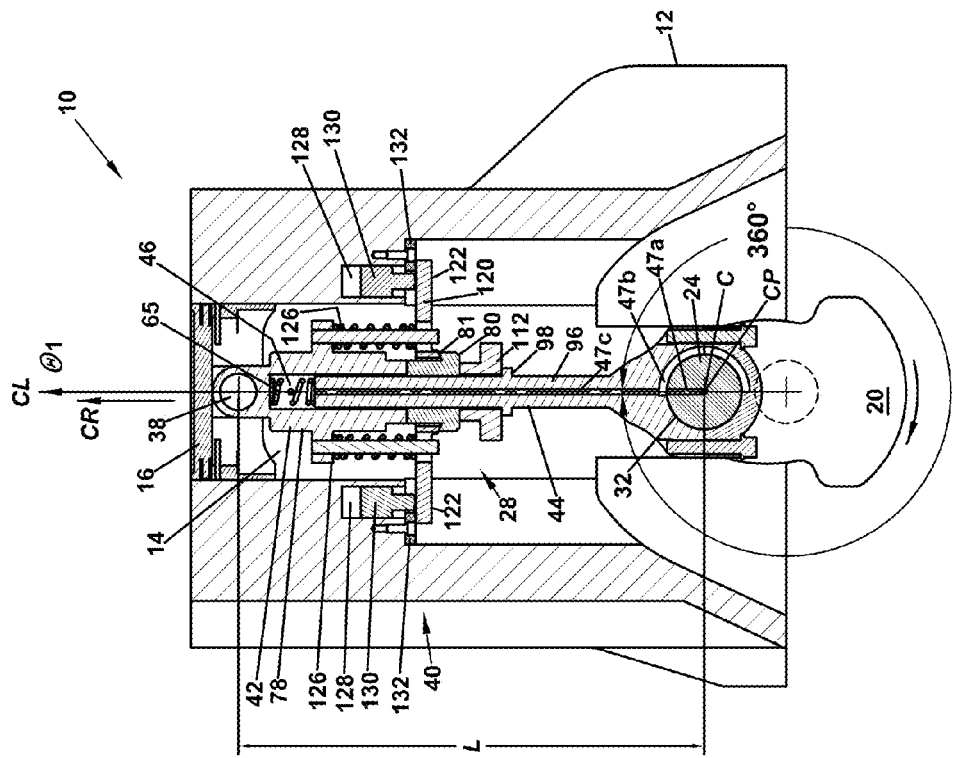
FIG. 62A is a schematic end section view taken along line A-A of FIG. 53 with the radial axis angle of the crankshaft shown at 0/360 degrees.

Referring to FIGS. 62A and 62B, radial axis RA has rotated 360 degrees past first stroke termination angle $\theta_1$, thus completing a full revolution, such that radial axis RA is aligned with cylinder axis CL in the exemplary embodiment shown. Lateral extensions 122 of stop member 120 continue to abut respective stop plates 132. Although passages 47a-47c and chamber 46 are just beginning to be in flow communication with one another, long shoulders 110 of rockers 100 continue to extend into apertures 114 of stop collar 112, as cylinder portion 42 of connecting rod 28 is forced down onto piston portion 44, completing the shortening the effective length L of connecting rod 28. However, as flow communication between passages 47a-47c and chamber 46 returns, pistons 84 will begin to extend from respective recesses 82 and act against proximate ends 104 of rockers 100. As crankpin 24 begins to move away from cylinder 14, fluid flowing into chamber 46 and biasing member 65 result in expansion of chamber 46, thereby lengthening the effective length L of connecting rod 28, as described in relation to FIGS. 53A, 53B, 55A, and 55B.

According to some embodiments, cylinder block 12 may have a greater distance d (e.g., see FIG. 48) between the bearings that support crankshaft 20 and the upper (or remote) end of cylinders 14 relative to a conventional cylinder block of corresponding configuration. As crankshaft 20 rotates through positions that result in crankpins 24 being laterally offset from the axes CL of cylinders 14, connecting rods 28 are subjected to increased bending stress. By increasing the distance d, the magnitude of the bending stress on connecting rods 28 may be reduced as crankshaft 20 rotates through positions resulting in bending stress in connecting rods 28. This may serve to increase the durability and/or service life of hydraulic cylinders 40.

In the exemplary manner described above, the effective length L of connecting rod 28 is variable, such that the distance between the center of pin 38, which operably couples connecting rod 28 to piston 16, and the center C of crankpin 24 is variable. More specifically, the distance between first aperture 32 and the center of second aperture 36 is variable, the variability of the effective length L being facilitated in the exemplary embodiment by virtue of controlled extension and retraction of piston portion 44 of hydraulic cylinder 40 relative to cylinder portion 42. As radial axis RA rotates between first stroke termination angle $\theta_1$ and 180 degrees past first stroke termination angle $\theta_1$ (i.e., to second stroke termination angle $\theta_2$), the effective length initially increases, thereby delaying initiation of the power stroke, for example, until radial axis RA reaches a point, for example, at least 40 degrees past first stroke termination angle $\theta_1$ in the exemplary embodiment shown. Thereafter, the effective length L remains substantially constant as radial axis RA continues to rotate toward an orientation 180 degrees past first stroke termination angle $\theta_1$. As the radial axis RA rotates between 180 and 360 degrees past first stroke termination angle $\theta_1$, the effective length L is reduced as piston portion 44 retracts into cylinder portion 42 of hydraulic cylinder 40.

According to some embodiments, the exemplary configuration and/or interaction can be tailored to achieve desired performance characteristics of exemplary engine 10, such as, for example, improved efficiency, improved power output, improved responsiveness, and/or improved torque. For example, the extension and retraction of piston portion 44 relative to cylinder portion 42 be controlled to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10.

According to some embodiments, engine 10 may be configured to selectively operate in at least two modes, for example, a fixed-length mode and a variable-length mode. For example, in a first mode of operation (i.e., a fixed-length mode), hydraulic cylinder 40 may be operated such that the effective length L is fixed regardless of the radial position of radial axis RA. More specifically, hydraulic cylinder 40 may be operated such that the minimum effective length L is fixed such that there is substantially no delay in the downward travel of piston 16 as radial axis RA travels from first stroke termination angle $\theta_1$ to 90 degrees, resulting in operation similar to a conventional engine of corresponding configuration. Effectively fixing the effective length L of connecting rod 28 may permit engine 10 to operate at relatively higher engine speeds when compared to operation in a mode in which the effective length L of connecting rod 28 is varied. Thus, operating according to the fixed-length mode may be desirable when it is anticipated that the rotational speed of crankshaft 20 will be relatively high and/or it is desirable to operate engine 10 at a higher power output than would be achievable in variable-length mode.

For example, referring to FIGS. 63A and 63B, rocker biasing members 90 hold rockers 100 in a position such that short shoulders 108 engage the underside of stop collar 112 adjacent apertures 114. So long as fluid is not supplied to chamber 46, pistons 84 will not extend and act against proximate ends 104 of rockers 100. Thus, biasing members 90 will hold connecting rod 28 in a configuration having a shortened effective length L.

This may be accomplished, for example, via controller 60, which may send signals to valve 58 and/or pump 56 of fluid circuit 50, such that fluid is not supplied to fluid passages 47a in crankshaft 20, regardless of whether passages 47a-47c and chamber 46 are in flow communication with one another. As a result, even as radial axis RA moves between 0 degrees and 40 degrees past first stroke termination angle angle $\theta_1$, fluid is not supplied to chamber 46. Chamber 46 contracts, and short shoulders 108 spring out under pressure from biasing members 90 and engage the underside of stop collar 112 adjacent apertures 114. Thus, regardless of the position of radial axis RA, fluid is not supplied to chamber 46, and connecting rod 28 maintains its shortened effective length L.

Operation according to this exemplary fixed-length mode may be switched to the variable-length mode by supplying fluid to chamber 46, for example, according to the process described above with respect to FIGS. 53A-62B. Controller 60 may be implemented or otherwise programmed to switch between these two modes according to, for example, preprogrammed operating conditions and/or via a switch, such as an operator-activated switch.

According to a second mode of operation, a variable-length mode of operation, the effective length L of connecting rod 28 may be varied, for example, as explained with respect to FIGS. 53A-62B above. It may be desirable to operate engine 10 according to the variable-length mode of operation to achieve greater efficiency relative to the fixed-length mode of operation.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:
1. An internal combustion engine comprising:
a cylinder block defining a cylinder;
a crankshaft having a crankpin, wherein the crankshaft is rotatably received by the cylinder block and rotates along a longitudinal axis, and the crankpin defines a longitudinal axis parallel to and offset by a distance with respect to the longitudinal axis along which the crankshaft rotates;
a piston configured to reciprocate within the cylinder; and
a connecting rod operably coupled to the piston and the crankpin,
wherein at least one of the piston and the connecting rod is configured such that a distance between a cross-sectional center of the crankpin and an upper surface of the piston is variable via hydraulic operation,
wherein the connecting rod comprises a hydraulic cylinder comprising a cylinder portion and a piston portion defining two fluid receiving chambers, and at least one of the cylinder portion and the piston portion of the hydraulic cylinder defines a port configured to provide selective flow communication between the two fluid receiving chambers,
wherein the piston portion of the hydraulic cylinder comprises a first disc having a first aperture and a second disc having a second aperture, and
wherein opening and closing of the port comprises rotating the first disc and the second disc relative to one another, thereby selectively aligning and misaligning the first aperture and the second aperture with respect to one another.

2. The engine of claim 1, wherein the engine further comprises at least one line for supplying fluid to at least one of the fluid receiving chambers.

3. The engine of claim 1, wherein at least one of the crankshaft, the crankpin, and the connecting rod has a fluid passage configured to supply fluid to at least one of the fluid receiving chambers.

4. The engine of claim 1, further comprising fluid configured to lubricate the engine during operation, wherein at least a portion of the fluid configured to lubricate the engine during operation is supplied to the hydraulic cylinder.

5. The engine of claim 1, further comprising fluid configured to lubricate the engine during operation, wherein fluid supplied to the hydraulic cylinder is separate from the fluid configured to lubricate the engine during operation.

6. The engine of claim 1, further comprising a fluid cooler configured to cool fluid supplied to the hydraulic cylinder.

7. The engine of claim 1, further comprising a cylinder head coupled to the cylinder block, wherein at least one of the piston and the cylinder head comprises a damper configured to absorb at least a portion of impact between the piston and the cylinder head.

8. The engine of claim 7, wherein the damper comprises at least one of a spring, a damping material, and a hydraulic damper.

9. The engine of claim 1, wherein the distance between the cross-sectional center of the crankpin and the upper surface of the piston is varied via operation of the hydraulic cylinder.

10. The engine of claim 1, wherein the distance between the cross-sectional center of the crankpin and the upper surface of the piston is varied via operation of the hydraulic cylinder and a biasing member associated with the hydraulic cylinder.

11. The engine of claim 10, wherein the biasing member is located in one of the two fluid receiving chambers and is configured to provide a biasing force to lengthen the connecting rod.

12. The engine of claim 1, wherein a line extending between the longitudinal axis along which the crankshaft rotates and the longitudinal axis of the crankpin defines a radial axis of the crankshaft, and wherein the port is configured to be opened and closed based on a radial position of the radial axis of the crankshaft.

13. The engine of claim 1, wherein the port is at least partially defined by the piston portion of the hydraulic cylinder.

14. The engine of claim 1, wherein the connecting rod comprises a port biasing member configured to provide a biasing force to at least one of the first disc and the second disc such that the first aperture is aligned with the second aperture.

15. The engine of claim 1, wherein a line extending between the longitudinal axis along which the crankshaft rotates and the longitudinal axis of the crankpin defines a radial axis of the crankshaft, and wherein the crankshaft comprises at least one actuating cam configured to open and close the port based on a radial position of the radial axis of the crankshaft.

16. The engine of claim 15, further comprising a follower coupled to one of the first disc and the second disc, wherein the follower, the first disc, and the second disc are configured such that movement of the follower opens and closes the port.

17. The engine of claim 16, wherein the actuating cam and the follower are configured such that engagement between the actuating cam and the follower act against the port biasing member and close the port.

18. The engine of claim 16, wherein the crankshaft comprises at least one counterbalance weight, wherein the at least one counterbalance weight defines a clearance passage configured such that the follower is not engaged by the counterbalance weight.

19. The engine of claim 15, wherein the at least one actuating cam comprises a wing extending radially from the crankpin.

20. The engine of claim 1,
wherein the connecting rod comprises a length control mechanism configured to selectively hold the connecting rod in at least one of an elongated configuration and a shortened configuration.

21. The engine of claim 20, wherein the length control mechanism comprises a rocker configured to be pivoted via hydraulic operation.

22. The engine of claim 21, wherein the rocker is configured to be pivoted between a first position in which the connecting rod is held in the elongated configuration and a second position in which the distance between the cross-sectional center of the crankpin and the upper surface of the piston is shortened.

23. The engine of claim 22, wherein the rocker is configured to be pivoted to a third position in which the connecting rod is held in the shortened configuration.

24. The engine of claim 23, wherein the rocker is configured to be pivoted between the third position and the first position.

25. The engine of claim 1, wherein the engine further comprises a damping mechanism configured to shorten the length of the connecting rod.

26. The engine of claim 25, wherein the damping mechanism is configured to soften impact between a portion of the connecting rod and the engine as the length of the connecting rod is shortened.

27. The engine of claim 25, wherein the damping mechanism comprises a piston.

28. The engine of claim 27, wherein the damping mechanism comprises a stop plate.

29. The engine of claim 25, further comprising a stop member coupled to the connecting rod and configured to shorten the connecting rod.

30. The engine of claim 29, wherein the damping mechanism comprises a piston and a stop plate, and the stop member is configured to contact the piston and then the stop plate, and shorten the connecting rod.

31. The internal combustion engine of claim 1,
wherein the crankshaft comprises at least one actuating cam configured to open and close the port based on a radial position of the radial axis of the crankshaft,
wherein the engine includes a follower associated with the port, wherein the follower is configured such that engagement between the actuating cam and the follower opens and closes the port, and
wherein the crankshaft comprises at least one counterbalance weight, and the at least one counterbalance weight defines a clearance passage configured such that the follower is not engaged by the counterbalance weight.

32. The internal combustion engine of claim 1,
wherein the piston is configured to reciprocate within the cylinder between spaced stroke termination points defining a stroke of the piston,
wherein a line extending between the longitudinal axis along which the crankshaft rotates and the longitudinal axis of the crankpin defines a radial axis of the crankshaft, and
wherein the engine is configured such that as the crankshaft rotates, reversal of the direction of travel of the piston within the cylinder is delayed via hydraulic operation after the piston reaches at least one of the stroke termination points.

33. The engine of claim 32, wherein the reversal of the direction of travel of the piston within the cylinder is delayed until the radial axis of the crankshaft has rotated at least about 10 degrees past a point corresponding to the at least one stroke termination point.

34. The engine of claim 32, wherein the reversal of the direction of travel of the piston within the cylinder is delayed until the radial axis of the crankshaft has rotated at least about 20 degrees past a point corresponding to the at least one stroke termination point.

35. The engine of claim 32, wherein the reversal of the direction of travel of the piston within the cylinder is delayed until the radial axis of the crankshaft has rotated at least about 30 degrees past a point corresponding to the at least one stroke termination point.

36. The engine of claim 32, wherein the reversal of the direction of travel of the piston within the cylinder is delayed until the radial axis of the crankshaft has rotated at least about 40 degrees past a point corresponding to the at least one stroke termination point.

37. The internal combustion engine of claim 1,
wherein the piston is configured to reciprocate within the cylinder between spaced stroke termination points defining a stroke of the piston,
wherein a line extending between the longitudinal axis along which the crankshaft rotates and the longitudinal axis of the crankpin defines a radial axis of the crankshaft,
wherein the engine is configured to selectively operate in two modes, comprising:
a first mode, wherein the distance between the cross-sectional center of the crankpin and the upper surface of the piston is fixed regardless of a radial position of the radial axis of the crankshaft, and
a second mode, wherein the distance between the cross-sectional center of the crankpin and the upper surface of the piston is varied based on the radial position of the radial axis of the crankshaft, and
wherein the engine is configured such that as the crankshaft rotates during operation in the second mode, reversal of the direction of travel of the piston within the cylinder is delayed via hydraulic operation after the piston reaches at least one of the stroke termination points.

38. A power train comprising:
the engine according to claim 1;
a transmission operably coupled to the engine; and
a drive member configured to perform work, the drive member being operably coupled to the transmission.

39. The power train of claim 38, wherein the drive member comprises a propulsion device.

40. The power train of claim 39, wherein the propulsion device comprises at least one of a wheel and a propeller.

41. The power train of claim 38, further comprising:
a generator configured to convert rotational power into electrical power, the generator being operably coupled to the engine; and
a power storage device configured to store electrical power, the power storage device being operably coupled to the generator,
wherein the transmission comprises an electric motor.

42. A vehicle comprising:
the engine according to claim 1;
a transmission operably coupled to the engine; and
a drive member configured to perform work, the drive member being operably coupled to the transmission.

43. The vehicle of claim 42, wherein the drive member comprises a propulsion device.

44. The vehicle of claim 43, wherein the propulsion device comprises at least one of a wheel and a propeller.

45. The vehicle of claim 42, further comprising:
a generator configured to convert rotational power into electrical power, the generator being operably coupled to the engine; and
a power storage device configured to store electrical power, the power storage device being operably coupled to the generator,
wherein the transmission comprises an electric motor.

46. The vehicle of claim 42, wherein the vehicle comprises one of a car, van, truck, boat, ship, train, and air vehicle.

47. A connecting rod for an engine, the connecting rod comprising:
a hydraulic cylinder comprising a piston portion and a cylinder portion,
wherein at least one of the piston portion and the cylinder portion comprises a first aperture configured to couple the hydraulic cylinder to a crankshaft,
wherein the other of the piston portion and the cylinder portion comprises a second aperture configured to couple the hydraulic cylinder to a piston,
wherein the hydraulic cylinder is configured to lengthen and shorten the connecting rod via operation of the hydraulic cylinder,
wherein the hydraulic cylinder defines two fluid receiving chambers, and at least one of the cylinder portion and the piston portion of the hydraulic cylinder defines a port configured to provide selective flow communication between the two fluid receiving chambers,
wherein the piston portion of the hydraulic cylinder comprises a first disc having a first aperture and a second disc having a second aperture, and
wherein opening and closing of the port comprises rotating the first disc and the second disc relative to one another, thereby selectively aligning and misaligning the first aperture and the second aperture with respect to one another.

* * * * *